US009660822B1

(12) United States Patent
Goldman et al.

(10) Patent No.: US 9,660,822 B1
(45) Date of Patent: *May 23, 2017

(54) REVEALING CONNECTIONS FOR PERSONS IN A SOCIAL GRAPH

(71) Applicant: Relationship Science LLC, New York, NY (US)

(72) Inventors: Neal Goldman, New York, NY (US); John C. Dingee, Bronxville, NY (US); Paul Ambas, New York, NY (US)

(73) Assignee: Relationship Science LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,399

(22) Filed: Nov. 7, 2014

Related U.S. Application Data

(63) Continuation of application No. 13/547,918, filed on Jul. 12, 2012, now Pat. No. 8,892,651.

(60) Provisional application No. 61/507,106, filed on Jul. 12, 2011.

(51) Int. Cl.
*G06F 15/16* (2006.01)
*H04L 12/18* (2006.01)
*G06F 17/30* (2006.01)
*G06Q 50/00* (2012.01)
*G06F 3/00* (2006.01)

(52) U.S. Cl.
CPC .... *H04L 12/1813* (2013.01); *G06F 17/30864* (2013.01); *G06F 17/30958* (2013.01); *G06Q 50/01* (2013.01)

(58) Field of Classification Search
CPC ........... H04L 12/1813; G06F 17/30864; G06F 17/30958; G06G 50/01
USPC .......................................... 709/204; 715/751
See application file for complete search history.

(56) References Cited

U.S. PATENT DOCUMENTS

| 7,707,122 | B2 | 4/2010 | Hull et al. |
| 7,890,871 | B2 | 2/2011 | Etkin |
| 7,970,712 | B2 | 6/2011 | Ruvolo et al. |
| 8,180,804 | B1 | 5/2012 | Narayanan et al. |
| 8,185,558 | B1 | 5/2012 | Narayanan et al. |
| 8,386,482 | B2 | 2/2013 | Gopalakrishnan |
| 2002/0091538 | A1 | 7/2002 | Schwartz et al. |
| 2008/0033744 | A1 | 2/2008 | Jones |
| 2009/0276377 | A1 | 11/2009 | Dutta et al. |
| 2011/0265011 | A1* | 10/2011 | Taylor ................... G06Q 50/01 715/751 |

(Continued)

OTHER PUBLICATIONS

U.S. Appl. No. 13/548,191, filed Jul. 12, 2012, (see file history incl. office action with notification date of Jan. 27, 2014).

(Continued)

*Primary Examiner* — Jungwon Chang
(74) *Attorney, Agent, or Firm* — Aka Chan LLP

(57) ABSTRACT

An on-line system utilizing a social graph allows users to establish an account with the system and establish connections to nodes in the system. The social graph uses system-provided nodes that are created and maintained by the system, so that users cannot edit the system-provided nodes. The system aggregates and analyzes the social graph to present information in ways useful to its users. For example, the system reveals connections between persons in the system, with a corresponding strength of each connection.

18 Claims, 44 Drawing Sheets

(56) References Cited

U.S. PATENT DOCUMENTS

| | | |
|---|---|---|
| 2011/0295626 A1 | 12/2011 | Chen et al. |
| 2012/0079023 A1 | 3/2012 | Tejada-Gamero et al. |
| 2012/0096002 A1 | 4/2012 | Sheehan et al. |
| 2012/0158733 A1 | 6/2012 | McGill et al. |
| 2012/0215865 A1* | 8/2012 | Sacks .................... G06Q 50/01 709/206 |
| 2012/0286170 A1 | 11/2012 | Van de Peut et al. |
| 2012/0311034 A1* | 12/2012 | Goldband .............. G06Q 50/01 709/204 |
| 2012/0324001 A1* | 12/2012 | Leacock ............... H04L 51/043 709/204 |
| 2013/0135314 A1 | 5/2013 | Hagarty et al. |
| 2013/0173344 A1 | 7/2013 | Kundagrami |
| 2013/0185220 A1 | 7/2013 | Good et al. |
| 2013/0282828 A1 | 10/2013 | Lawler et al. |

OTHER PUBLICATIONS

U.S. Appl. No. 13/547,851, filed Jul. 12, 2012, (see file history incl. office action with notification date of Jan. 27, 2014 and advisory action with notification date of Apr. 14, 2014).

U.S. Appl. No. 13/225,380, filed Sep. 2, 2011, (see file history incl. office action with notification date of Feb. 6, 2014).

U.S. Appl. No. 13/224,138, filed Sep. 1, 2011, (see file history incl. office action with notification date of Mar. 21, 2014).

\* cited by examiner

Primary Residence

Country

State/Region

City

Add

Primary Residence

Country
United States

State/Region
NY

City
New Y

New York City

REVEALING CONNECTIONS FOR PERSONS IN A SOCIAL GRAPH

CROSS-REFERENCE TO RELATED APPLICATIONS

This patent application is a continuation of U.S. patent application Ser. No. 13/547,918, filed Jul. 12, 2012, issued as U.S. Pat. No. 8,892,651 on Nov. 18, 2014, which claims the benefit of U.S. provisional patent application 61/507,106, filed Jul. 12, 2011. These applications are incorporated by reference along with all other references cited in this application.

BACKGROUND OF THE INVENTION

The present invention relates to the field of information management, and more specifically, to providing an information resource where the content is organized using a social graph.

In business, there is an adage: "the right ten minutes in front of the right person is worth more than a year at your desk." This is because it is people that make things happen, and connecting with the right person can give you the resources, access or credibility you may need to advance your business.

So, often the questions become who is the right person, how do I get in front of them, and how do I "emotionally connect" with them in the first few minutes so that they take a liking to me, listen to the rest of my presentation, and want to help me.

Most business people are constantly trying to advance their career by creating the "right" relationships. It is a complicated task figuring out who those people are, meeting them, and building a relationship. Each of these is a specific task.

Most executives try to "do their homework" in this regard. For instance: (1) I am going to a conference: who do I want to meet there and what should I say if I meet them? (2) I am going to a meeting: I know who the other people are going to be in attendance, but what can I know about them to make my meeting more successful? (3) I want to meet someone: who do I know who can introduce me? (4) I want to get someone as a client: how do I sound knowledgeable about their particular lives and issues to demonstrate sensitivity to their concerns? There are many more such use cases.

Some social networks include Facebook™ and LinkedIn™. Trademarks indicated in this patent application are the property of their respective owners. If the world is a pyramid of people, with the "most important" being at the top, Facebook is the masses at the bottom and LinkedIn is the middle-level managers in the middle. However, there is no social network that caters to the world's most "influential people," in large part because these people generally keep a low profile, do not promote themselves, and generally do not want the general public contacting through electronic means.

On-line services, libraries, and information resources are available to assist users to research people (often important and influential) that they want to make a connection to. The information is, however, typically presented in a flat format. Even if hyperlinked, the information is still not presented in a way to easily show connections between a targeted individual and other people, and how the targeted individual might be connected to the user.

Therefore, there is a need to provide an information resource where information is also organized according to a social graph or social network, which shows the connections between people, especially influential people.

BRIEF SUMMARY OF THE INVENTION

A system gathers information on important and influential people and builds a social graph. The information is organized based on this social graph and provided to users as a service. The system has an ontology and analytics to organize the people according to their overall power or influence (which can be called a influence index value) as well as their influence in a particular domain, relationships to other people or organizations, influence over others, indirect influences, and more. Users can enter as nodes in the social graph to explore potential relationships and commonalities with the influential people. Information in the social graph is continually updated as new news and information becomes available. Users can request and receive reports on people of interest as information is updated.

The system creates an extensive database and technology product that tracks the estimated one and a half million most important or influential people in the United States and in the world. In an implementation, the system is not a social network like Facebook or MySpace. Users or subscribers of the system are not asked to contribute any data, but the users can provide information about themselves so the system can determine any links they might have to the people being tracked. The system uses a vast array of publicly available data sources, both on-line and not on-line, to create deep and rich profiles on people—their business life, their personal life and who they know. This is not just who these people know in a business context, but who are their friends and others who have "real world" influence over them (and vice versa).

In additional to "important" people, there are some very key hubs of connectivity and influence. For instance, a well-respected divorce attorney who has developed very close relationships with his or her clients over the years, can potentially be a powerful connector in society. The information on who they know can be valuable to a user. In another example, relationships of a respected person running a well-respected nonprofit is tracked. This person may know large donors (who themselves are very important) to the nonprofit.

Additionally, the system allows subscribers (such as people who pay a monthly fee to access to the system through the Internet) to create their own profile. The system can include for example, where they went to school, where they worked, what types of nonprofit interests they have, clubs they belong to, where they grew up, and who they know. In an implementation, this profile is not seen by any other user or subscriber of the system. The profile may be protected and not shown to others unless explicitly granted permission, but allows the system to customize itself to the user. So, if a subscriber pulled up the profile of an important person they would immediately see "who do I know in common with this person" and "what other interests or facts do I share in common with this person." In essence, the system can do the work of telling a user how to get to anyone and what to say to them to bond with the person within a few minutes. There are many applications for the system and some examples are described below.

Most executives do some version of this work already. They do Google searches (or have their assistant do it), which returns a very verbose, spotty, incomplete, and unsynthesized view of a person. Then, they have to read it all to try and understand how they might relate to the person. This costs time and money and is very inefficient. The system makes this information available more easily.

In an implementation, a method provides allowing a user to select a first person and a second person tracked by a system, where the system includes a plurality of persons and a plurality of relationships, at least one of the plurality of relationships connected to each of the plurality of persons, aggregating a set of paths, where each path of the set of paths include a plurality of persons, the first person in a first position of the path, and the second person in a last position of the path. Formatting the set of paths by a strength of each path relative to each other path in the set of paths and displaying the formatted set of paths.

The method can include a strength of each path relative to each other path in the set of paths is based on a length of each path. The method can include where at least one path of the set of paths include at least four persons. A first path of the set of paths is associated with a higher strength than a second path of the set of paths. The method can include each person of at least one path for the set of paths is displayed on a single screen.

In various implementations, the method can include the plurality of persons are system-provided persons and the plurality of relationships are system-provided relationships. The method can include a first path of the set of paths includes a third person and a fourth person, where the third person and the fourth person are connected by a first relationship. The method can include the first relationship includes a familial relationship, an employment relationship, or a board member relationship. The method can include displaying the third person, the fourth person, and the first relationship. The method can include the plurality of persons and the plurality of relationships are tracked in a social graph. The method can include the plurality of persons are represented as nodes and the plurality of relationship are represented as edges. The method can include displaying an executive summary of the first person.

In an implementation, the system provides allowing a user to select a first person and a second person tracked by a system; aggregating a set of paths, where each path of the set of paths include a plurality of persons, the first person in a first position of the path, and the second person in a last position of the path; formatting the set of paths by a strength of each path relative to each other path in the set of paths; and displaying a first path of the formatted set of paths, where the first path includes a plurality of persons and a plurality of relationships, each relationship of the plurality of relationships includes an influence indicator based on the relationship.

In another implementation, the method can include displaying the plurality of relationships with a corresponding influence indicator for each of the plurality of relationships. The method can include the first path includes at least three relationships. The method can include the displaying a first path of the formatted set of paths includes an executive summary of the first person. The method can include displaying a second path of the formatted set of paths after the first path, where the second path includes a plurality of persons and a plurality of relationships and the first path is more relevant than the second path.

In an implementation, the system provides allowing a user to select a first person and a second person tracked by a system; aggregating a set of paths and determining a strength of each path of the set of paths; and displaying a plurality of persons associated with a first path of the formatted set of paths. The system optionally provides displaying a relationship between a third person and a fourth person of the first path. The method can include an influence indicator.

Other objects, features, and advantages of the invention will become apparent upon consideration of the following detailed description and the accompanying drawings, in which like reference designations represent like features throughout the figures.

BRIEF DESCRIPTION OF THE DRAWINGS

FIG. 13 shows a sample person profile page.

FIG. 24A shows a sample private school profile page of attendees/alumni.

FIG. 24B shows a sample private school profile page of donors.

FIG. 26 shows a sample politician donation page.

FIG. 32 shows a sample company transaction detail page.

FIGS. 37A-37E show five sample search criteria.

FIGS. 38A-38E show five sample search criteria.

DETAILED DESCRIPTION OF THE INVENTION

Figure 1:
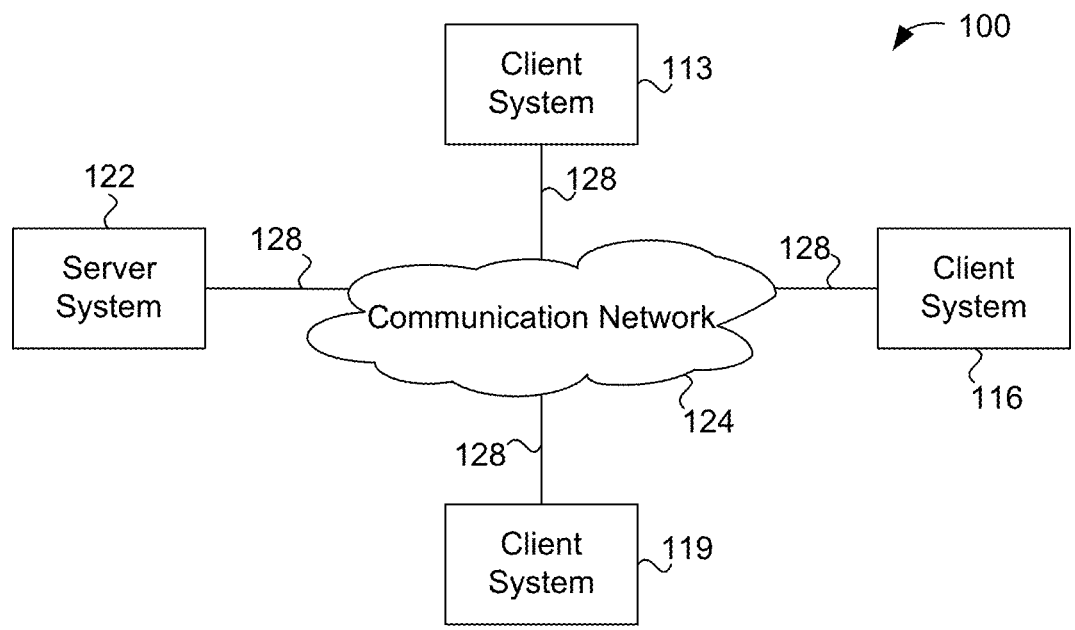
FIG. 1 shows a simplified block diagram of a distributed computer network within which a system of the invention can be implemented.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be included of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like. Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser by Microsoft Corporation, the Firefox® browser by Mozilla Foundation, Chrome by Google Inc., WebKit and its variants, or others.

Figure 2:
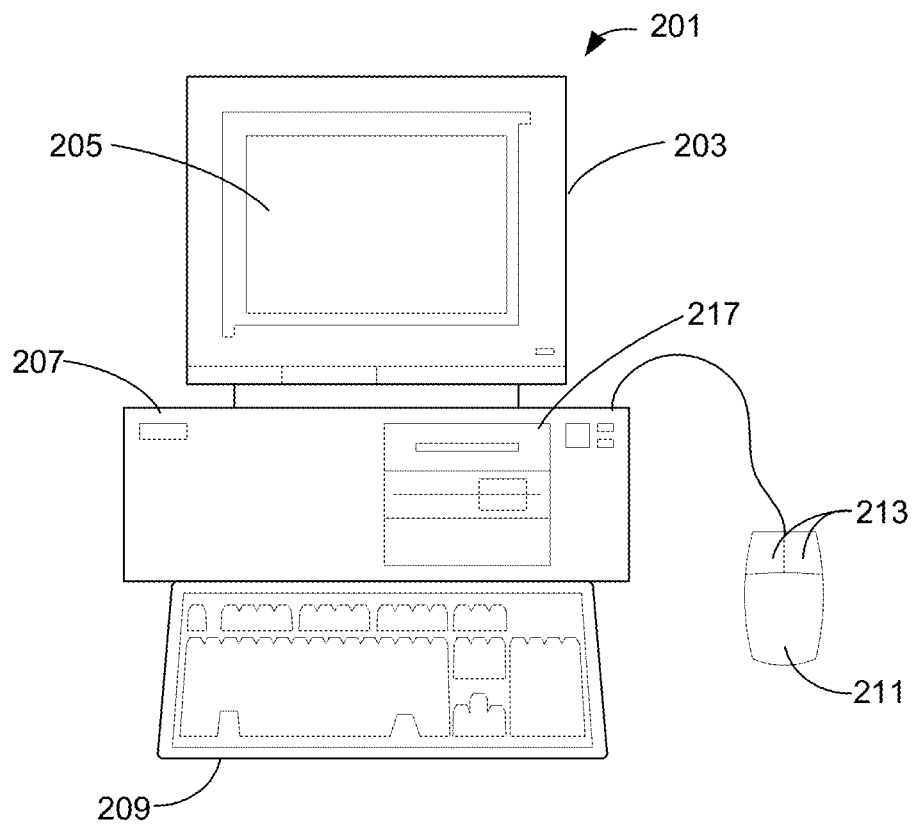
FIG. 2 shows a more detailed diagram of a computer system, client or server, which is used operate with the system.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

The computer system in FIG. 2 is representative of electronic computing systems with a computer processor or central processing unit (CPU). These include servers, desktop computers, workstations, notebook or laptop computers, tablets, nettops, netbooks, smartphones, set-top boxes, media players, and many others. These can also include iPads, iPhones, PDAs, or Android phones.

Figure 3:
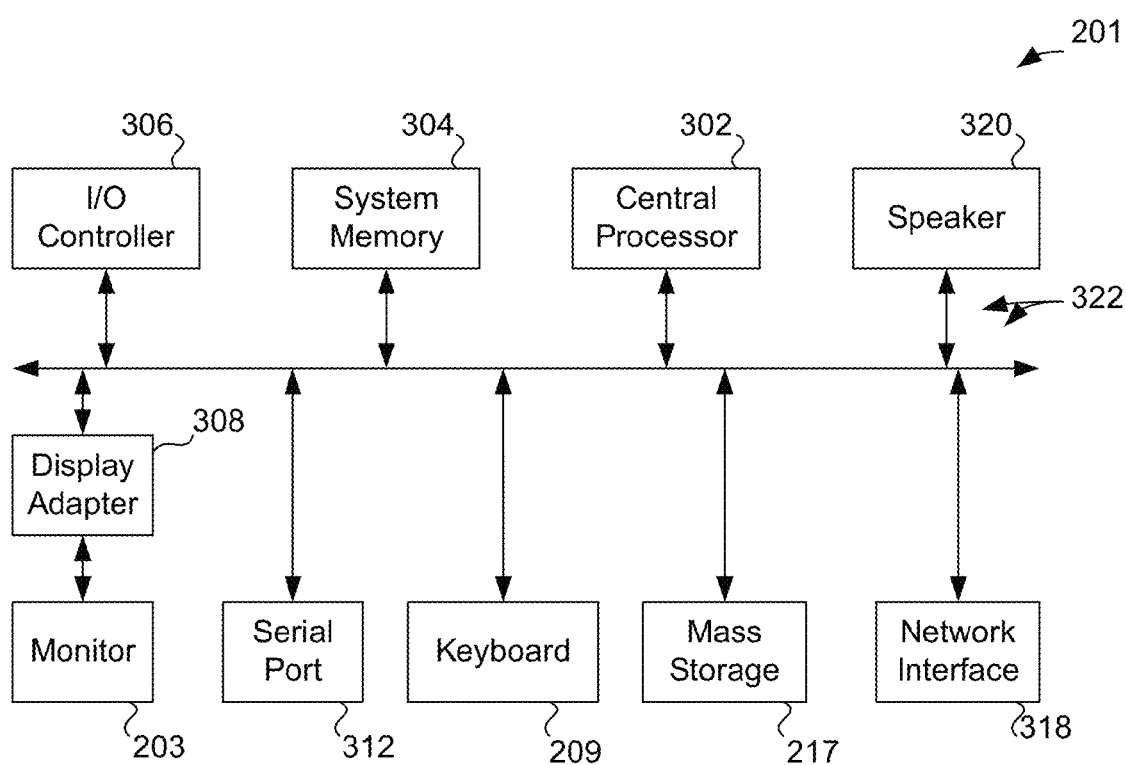
FIG. 3 shows a system block diagram of a computer system used to execute a software implementation of the invention.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64 X2 Dual-Core, AMD Phenom™, Microsoft Xbox 360 central processing unit (CPU), and ARM architecture based processors (e.g., Nvida Tegra2, Qualcomm Snapdragon, Apple A4).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, SQL, dBase, Gremlin, Blueprints, Python, PHP, or Closure. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). An operating system for the system may be one of the Microsoft Windows® family of operating systems (e.g., Windows 95, 98, Me, Windows NT, Windows 2000, Windows XP, Windows Vista, Windows 7, Windows 8, Windows CE), Linux, UNIX, Sun OS, Ubuntu, or Macintosh OS X. Microsoft Windows is a trademark of Microsoft Corporation. Some mobile operating systems that can be used with an implementation of the invention include: Google Android, Chrome OS; Apple iOS4 or iOS5; Blackberry OS; Windows Phone 7.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). Other information transmission standards that can be used in a system of the invention include: Bluetooth, wireless USB, WiMAX, EDGE, EV-DO, GPRS, HSPA, LTE, UMTS, Edge, 2G, 4G, LTE. For example, signals from a computer may be transferred, at least in part, wirelessly to components or other computers.

The system maps the world of influence through a large database, which can be stored in a variety of ways. A specific technique is through a combination of an entity graph and associated SQL database, but other database types may be used. The database is at its core a mapping of entities and relationships between those entities. Note that this can be done with an array of other technologies, all of which can be used to achieve the same result. A technique and implementation of the system scales nearly infinitely to handle all the real-world ways that people know each other and facts about them.

The system product allows the paid user or subscriber to step into the created world and see how they fit in. Moreover it provides them with information that allows them to move further in to this world of influence. The system can also be supported, in part or fully, by advertisements.

Note that the system captures certain types of relationship information (and many derivatives thereto) that have never been previously captured electronically. For example, there is no publicly available database in the world that has recorded who someone's best friend is. Or that two people were reported in page six of the news paper as having lunch together. Or what elementary school a particular executive sends his or her children, what grade they are in, what other powerful people have children in the same class, and which parents from that class donated the most money. In an implementation, the system can use the ontology, weighted path algorithms, and centrality algorithm to estimate the probability that two people know each other. The probability function is based on, amongst other things, how much influence these people have over one another, the difference of these two values, the sectors in which these two people have influence, and the influence they have in those sectors. In an implementation, given the default weight of a particular predicate, the probability is one-hundred percent that two people know each other. For example, if the relationship between person A and person B is "mother" the system determines that these two people know each other.

This idea of a person being "powerful" is to be described in more detail (e.g., see quantitative discussion below), but in a simple instance you can say President Barack Obama is the most important person in the world, and thus calculate every single person's importance by how well they know him and how many people removed they are (or how many people they know in common with him and how well). In practicality, several "sign posts" can be erected in each industry that allows for this type of sector power ranking to fall out. Also, this can be cut in a different way to show someone's overall power in the world (for instance).

In an implementation, a sign posts algorithm is used by human operators. These human operators can "bump up" a weight of a particular relationship, or entity in the graph.

In an implementation, the sign posts can alter the distribution of energy/influence in a graph based on a mathematical distribution (e.g., Bayesian distribution, Priors algorithm). Sign posts not only bias the centrality algorithm for influence amongst the entire graph, they can also be applied to effect centrality calculations for a particular domain.

Additionally, by means of the weighted path algorithm, the system can show how influential someone is over an organization, creative work, event, or a series of events. The system can calculate the weights between any two nodes in the graph, independent of their type. This can have to do with how closely they are (or have been) affiliated with an organization, but can also be more nuanced. For instance, a person who is very close to three board members (but himself is not a board member) may be (or possibly could be) a key influencer of that organization. Influence is also transitive, for example: (1) CEO X controls Company Y, which in term owns a controlling stake in company Z; (2) X has transitive power over the CEO of company Z; and (3) CEO W controls company X, which in term owns a controlling stake in Company Y. We can determine that CEO of Company Y, CEO Z is very influenced by CEO W.

The system uses technology to collect this data, including pioneering innovative collection techniques (e.g., Internet, crawling, and filtering). Additionally, there can be a large team of people who "clean" this data. Given that the system is serving a very high-end clientele, the service needs to have very clean and precise data, which the human factor helps achieve.

Figure 4:
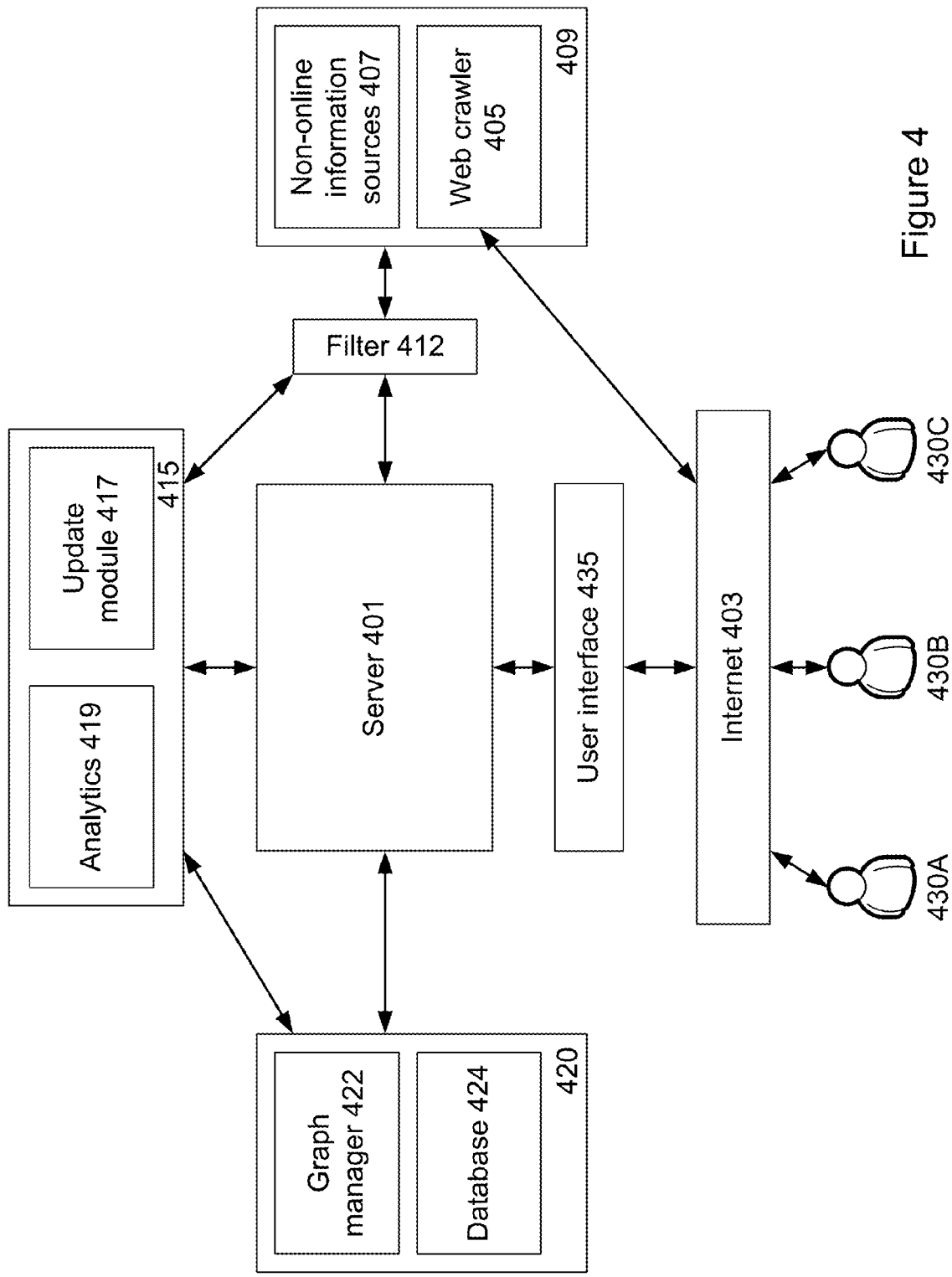
FIG. 4 shows a system diagram.

FIG. 4 shows a block diagram of an implementation of a system of the invention. The system gathers information on entities, people or organizations, from on-line and off-line sources. The information is organized using a social graph (having nodes and edges), so that social relationships between the information can be more easily determined. The system provides this information, organized by social graph, as an information resource service to users. Users can use the system as a tool to identify and make better connections to other people or organizations.

In an implementation, a server 401, having hardware such as described above, executes and stores software and data of the system. The server receives information from an information gathering module 409, which can be take information from on-line or non-on-line (or off-line) sources, or both.

For on-line sources, a crawler module can be used. Via the Internet 403, a crawler module 405 (e.g., Web crawler) gathers information for the system from on-line source and sends the collected information to the server. These on-line sources include Web pages and other unstructured information data sources.

The crawler module is a computer program that browses a network such as the Web or Internet in a methodical, automated manner in orderly fashion to gather desired information. The crawler can be embodied as ants, automatic indexers, Web crawlers, Web spiders, or Web robots. The sites the crawler retrieves information from can include public and closed sources. Some examples of closed sources include membership, closed-networks, and pay information services such as LexisNexis®, which is a registered trademark of LexisNexis.

For off-line sources 407, a research team can find relevant information and then put the information into electronic form for further handling by the system. Such off-line sources can include print (e.g., yellow pages, white pages, school yearbooks, old papers records that have not been put into electronic form) and other sources which are not available on-line. Some of these sources may be newspapers from countries other than the U.S. that do not have an on-line counterpart. Therefore, some of these sources may not be in English, and will be translated as needed (either by a translator (person) or by way of a machine translation) into English for inclusion into the system.

In an implementation, the information gathered (whether on-line or not on-line) is related to an entity, specific person or organization. The person or organization is one that the system tracks for its users. For example, the information may include all activities and news related to the specific person being tracked. These may include news about the person, stock purchases and sales, appearances as events, relationships with others, lawsuits, travel, identification of family members, new family members, contributions or donations to organizations, promotions, demotions, company changes, retirement, and others.

This information from information gathering module 409 is filtered by a filter module 412. The filter module 412 "cleans" the information by identifying the information relevant to the system, and discarding (e.g., removing or redacting) information that is not relevant or is of low relevance to the system. The filtering module may present a report of the proposed filtering to a person for approval or modification before being published live on the system.

After filtering, the information is transferred to an information processing block 415, which includes an update module 417 and analytics module 419. Update module 417 handles determining whether information in the system should be updated, since some of the information may be duplicative or not current. For information to be added to the system, the update module will handle performing updates (or request another module to do the update).

In the case the information is for a person already having a node in the social graph managed by the system, that node is updated. This node is a system-provided node because it is generated by the system, and not one which was created for or by a user or member of the system.

In the case the information is for a person that does not yet have a node, the update module will create the node (as a system-provided node) and create edges for the node as appropriate to link the new node to other system-provided nodes. Edges created by the system between the system-provided nodes are referred to as system-created edges.

Typically, the crawler module continually searches on-line sources for new information. It is desirable that an updates occur in real-time or soon as practicable, so that the information service offers timely information for its users or customers (e.g., 430A, 430B, and 430C). For any new information found, the update module updates the social graph of the system.

The analytics module 419 performs analytics on the information of the system, such as calculating influence index values for each node and other metrics based on the social graph. The analytics modules uses algorithms, and the resulting metrics (e.g., influence or power ranking) can be continually update as the nodes are updated. For example, analytics include calculating or updating a influence index value (or power ranking) for a person. Analytics is described further in U.S. provisional patent application 61/507,106, filed Jul. 12, 2011, which is incorporated by reference.

Another feature of the system is to allow users to set-up watches on people being tracked by the system. Then when users log into the system, their home page will show updates and new news on the watched people since they last time they logged in. E-mail or other messages (e.g., SMS) can be sent to the users to alert users of new news for the watched people.

The system stores information, including the social graph, in a storage block 420. This storage block may be implemented using hard drives of the server or across multiple servers (or network-attached storage (NAS) drives). Storage module 420 includes a graph manager 422 and a database 424 module.

The graph manager module manages the social graph of the system, adding, modifying, updating, or deleting information, nodes, and edges of the system. The social graph can be stored in a database structure. Each entry in the database can represent a node and include links, representing edges, to other entries or nodes. Other computer data structures can be used to implement a social graph of the system, including queues, stacks, pointers, arrays, linked lists, singly linked lists, doubly linked lists, and others, in any combination.

As example of graph manager operation, if a graph contains information about a person who is the chief executive officer (CEO) for a company A, but the person has resigned, the graph manager will update the CEO's system provided node to reflect the new information. The relationship of that person with company A may be removed or altered to show that the person is no longer company A's CEO. Also, information that was not previously in a graph can be added. For example, if the person from the previous example resigned from company A to take the CEO position for company B, the graph is updated to reflect this change. The system stores its information in the database, which can be access by the users of the system to see the updates.

The information of the system is provided as a service to users or subscribers 430A, 430B, and 430C. The users can pay a periodic charge (e.g., month, yearly, or other time period). The users can pay per use (e.g., a charge per search). The users can use the system for free, where the system is, e.g., ad supported or supported by revenue from other sources besides user fees. The system can have also have modules (not shown) for generating revenue by any one or combination of these revenue models.

In an implementation, the system has a Web interface so users can access the system via an Web browser at a client device. The client may be a mobile device such as a smartphone or tablet computer. Depending on what type of device the user 430A-430C is using, the user interface module 435 prepares and transmits a version (e.g., HTML or XML) suitable to the user's device. Also, the user interface module 435 prepares and selects what information to present. The system may have other interfaces, which can be used instead of or in combination with the Web interface, such as a dedicated application or app to connect to the service.

As discussed, the system organizes information about people or organizations using a social graph. By organizing information using a social graph, this can make it easier for viewers who access the information to determine the relationships and connections between the people (nodes) in the social graph. Using the social graph structure, a user can determine the degrees of separation between the nodes in the graph. A node can have any number of degrees of separation, one, two, three, four, five, six, seven, eight, nine, ten, or more. Generally, the more degrees of a separation one node is from another, the less strong the relationship is between those two nodes which represent two people. For example, the user can specify in a search term a number of degrees of separation in which to limit the search (e.g., search for two degrees or less) from a particular person, so that less strong connections can be omitted from the search results.

For a social graph, one degree of separation between two nodes means that the two nodes are connected via a single edge. Two degrees of separation between two nodes means that the two nodes are connected via two edges (passing through another node). Three degrees of separation between two nodes means that the two nodes are connected via three edges (passing through two other node). Therefore, n degrees of separation between two nodes means that the two nodes are connected via n edges (passing through n−1 other nodes).

Compared to, e.g., an HTML page or other data structure giving information on an individual, the social graph structure gives additional relationship information, which is very valuable in the context of a person trying to make relationship connections. With a social graph structure, an information page for a person of interest (person A), the user can see the people connected by a first-degree connection to person A. The person can connect via a link on person A's page to see another person, person B, who has a one-degree connection to person A. On the page for person B, the user will see all the one-degree connected people to person B, which includes person A.

With an HTML page, the relationship information is not inherent in the HTML structure. In fact, once one follows a link from one HTML page to another, the next HTML does not necessarily include a link back to the referring page. Information is lost when traversing from page to page. A social graph structure does not have this problem.

Although there can be any number of degrees of separation in a social graph, the system can allow the user to configure searches, calculations, and other operations to limit the numbers of degree of separate to a certain value m, an integer 1 or greater. By limiting the m, this can increase the speed of the system, since less information or nodes need to be considered. The user may want to leverage stronger relationships first, and such a user-configurable setting allows this.

As a further aspect of the system, after a user signs up and becomes a member or customer of the system. The system creates a node for the user, which is a ghost node in the system graph. This is in contrast to a system-provided node which is a node created by the system. Ghost nodes of the system are created for users of the system. Connections between ghost nodes and other nodes (e.g., system-provided nodes) are through ghost edges. A ghost node and its ghost edges is visible only to the user, and not others users of the system.

For the ghost node, the system allows the user to input information on the user. For example, this information can include people the users know, activities the user participates in, education of the user, and others information about the user. This user-input information can help the system identify connections to the system-provided nodes (people being tracked by the system).

The user can then tag people the user knows, organizations the user is affiliated with, and things the user likes. The more relationships the user adds the more they become plugged into the sphere of influence. Given the information provided by the user, the application runs weighted path algorithms in order to show the user to whom they are connected and how.

The system does not allow the activity of this ghost node to effect the way information is generated for other users. Since the information added by the user is applicable to that one person, this node is treated as a "ghost node." Any calculation that hits this part of the graph for any other user, realizes this is a ghost node, and the traversing at that part of the graph dies.

So, the system allows a person to enter ("virtually") into the graph for the user's own use, morphing and defining it for the user's own purpose without impacting other users, or the general makeup of the system's data. The ghost node will not interact or interfere with other ghost nodes for other users of the system.

In an implementation, a user interacts with the master graph in that as soon as the user signs up, there is a node created for the user. That user can then tag people the user knows, organizations the user is affiliated with, and things the user likes. The more relationships the user adds the more they become plugged into the sphere of influence. Given the information provided by the user, the application runs weighted path algorithms in order to show the user to whom they are connected and how. However, the system does not allow the activity of this node to effect the way information is generated for other users.

Since the information added by the user is applicable to that one person, this node is treated as a "ghost node." Any calculation that hits this part of the graph for any other user, realizes this is a ghost node, and the transversal at that part of the graph dies.

This allows us to create a system where the user can enter into the graph for the user's own use, morphing and defining it for the user's own purpose without impacting other users, or the general makeup of the system's data.

In an implementation, a user interacts with the master graph in that as soon as the user signs up, there is a node created for the user. That user can then tag people the user knows, organizations the user is affiliated with, and things the user likes. With each relationship the user adds the more they become plugged into the sphere of influence. Given the information provided, the application can create shortest path algorithms showing the user to whom the user is connected and how. Since the information the system gets by traversing the graph for this particular node, this can be limited to this particular user, the system does not allow this node to effect the way information is generated for other users.

In an implementation, each entity can have [n] number of classifications. Entity classifications describe and categorize entities at a granular level. For example, Bill Gates is an {Entrepreneur}, {Technologist} and {Philanthropist}. Entity classifications are stored in a tree structure, the root of the tree converges at the master entity types, as discussed above.

In an implementation, entities will have entity attributes. These are pieces of information that describe an entity without respect to another entity. This data is stored in an entity attributes table that will have an "Entity Attribute Type" (e.g., birthday, revenue, interest). Attached to that piece of data is a quantitative or qualitative piece of information that is the 'value' or the 'info' for the entity attribute.

In an implementation, entity attribute values are attached to entities. For each entity attribute there is a corresponding value. If that value is structured, that is it is defined in the [Entity Attribute Value Types] Table, that piece of information is attached to the Value Type defined in the type system.

In an implementation, some nodes of the system are system-provided nodes. These nodes and their connections are created and updated by the system. Other persons (e.g., users or subscribers) do not create these nodes. In an implementation, administrators of the system update and provide the nodes. These administrators are persons trusted by the system to create and curate the data, so that there is a high level of quality (e.g., accuracy of data, timeliness of data) for information stored in the system. In an implementation, none of the administrators of the system are represented as a system-provided node. In an implementation, the user is denied access to editing a system-provided node.

In another implementation, a system-provided node is a node created by a person other than the person represented by the node. For example, if Person A is a person represented by a system-provided node, a person other than Person A creates the node. In another example, where an Organization A is represented by a system-provided node, a person who is not a member of Organization A creates the node.

In an implementation, a person who is represented by a system-provided node is prevented from editing the system-provided node representing themselves. In another implementation, a person who is represented by a system-provided node is allowed to edit a user node representing themselves.

In an implementation, each system-provided node has at least one connection (or edge). For example, each person node will be connected to at least one other node (e.g., another person, organization, entity). This is because system-provided nodes represent persons or entities with influence, and influence is determined in reference to two things (e.g., influence of one person over another person, influence of one person over an organization). So, a system-provided node without any connections would have very low influence, and would not be tracked by the system.

Some specific flows for determining a technique of the invention are presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

This application incorporates by reference U.S. patent application Ser. Nos. 13/224,110, 13/224,117, 13/224,119, 13/224,138, and 13/224,149, all filed Sep. 1, 2011; Ser. Nos. 13/225,377 and 13/225,380, both filed Sep. 2, 2011; U.S. patent application Ser. Nos. 13/236,602, 13/236,606, and 13/236,617, all filed Sep. 19, 2011; and U.S. patent application Ser. Nos. 13/532,653, 13/532,663, and 13/532,672, all filed Jun. 25, 2012.

Figures 5A, 5B:
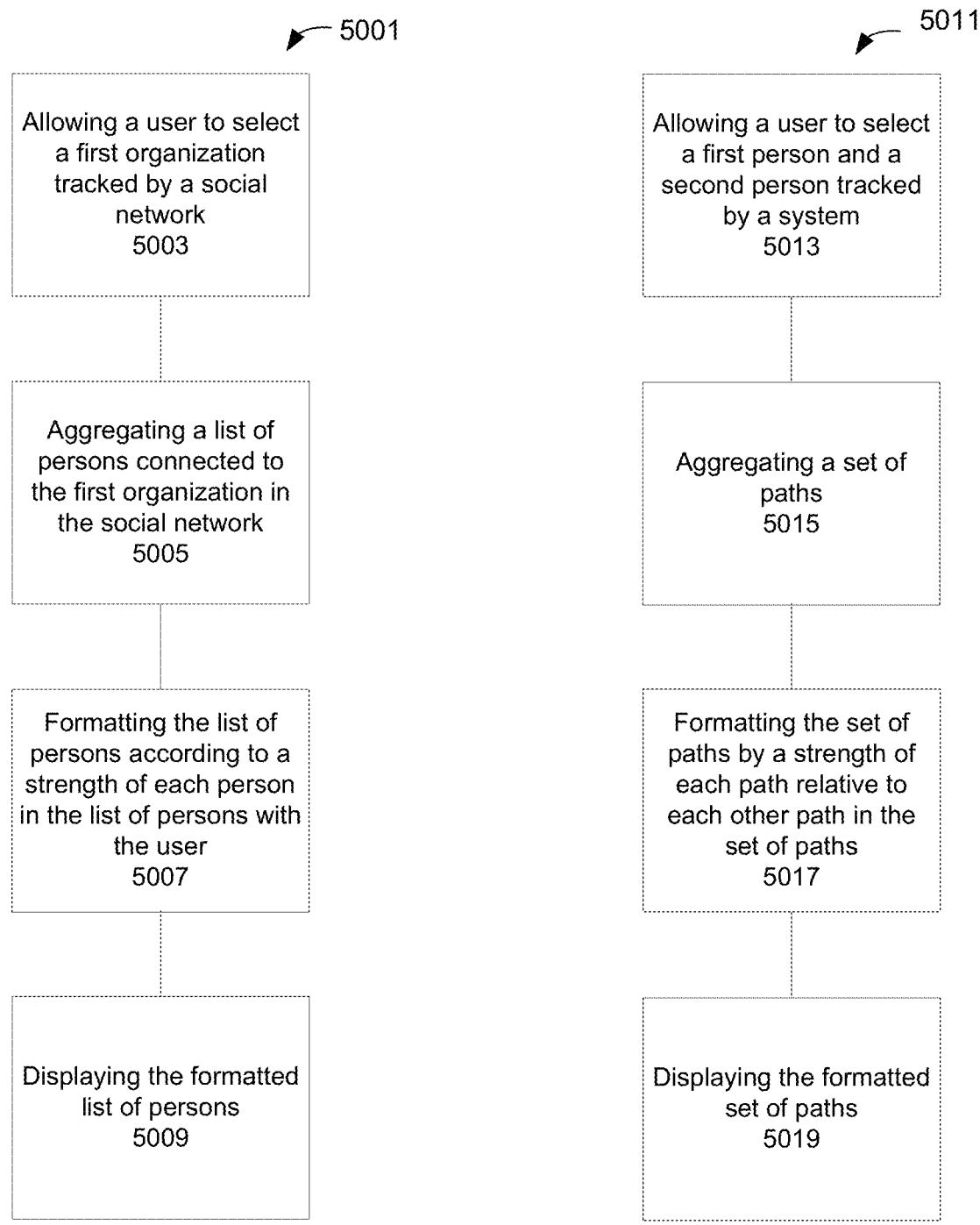
FIG. 5A shows a general flow of the system.
FIG. 5B shows a system flow.
Figures 5C, 5E:
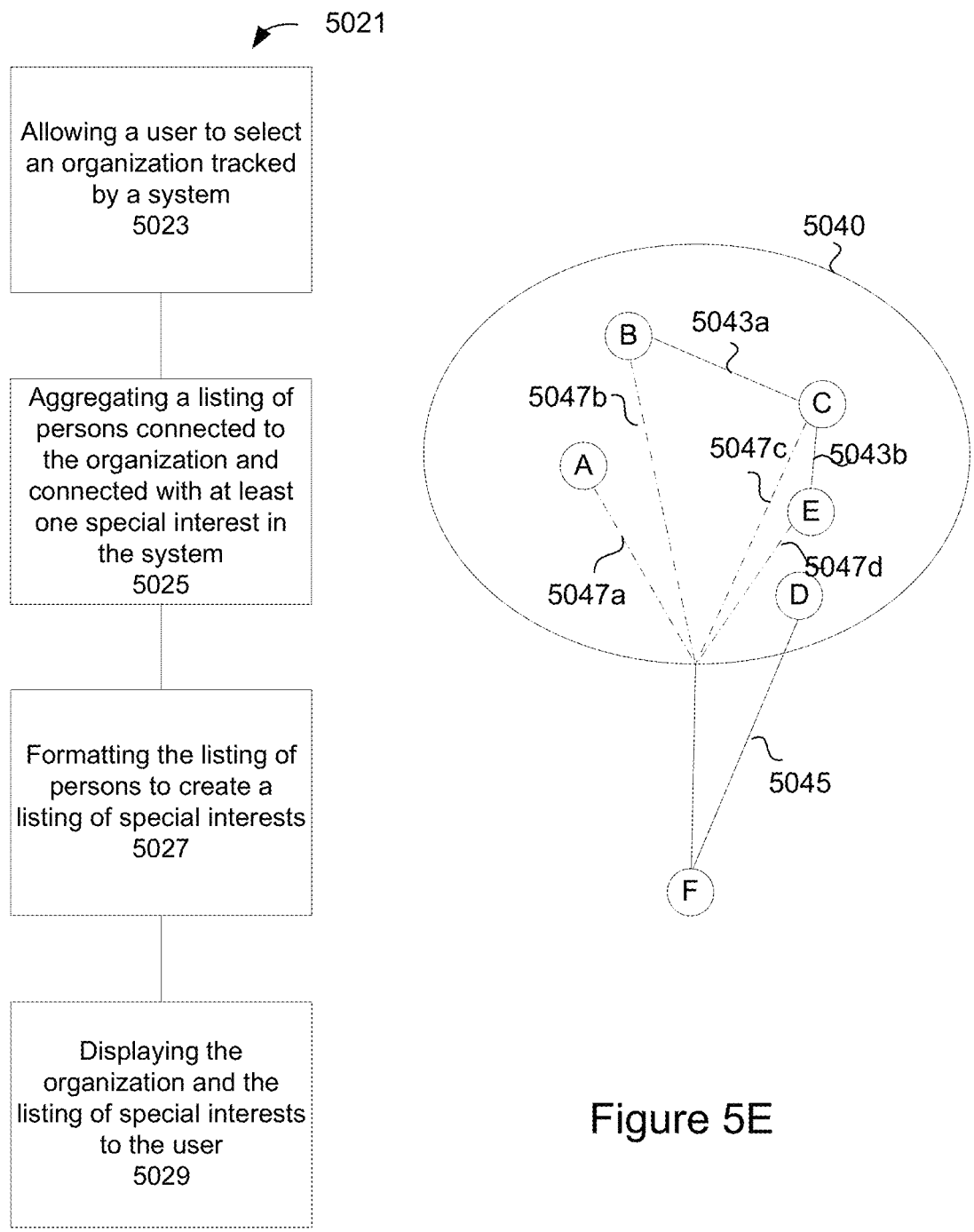
FIG. 5C shows another system flow.
FIG. 5E shows sharing links in a sample organization.

FIGS. 5A-5C show sample flows of the system. FIG. 5A shows a flow 5001 for facilitating user relationships to organizations. In a step 5003, the system allows a user to select a first organization tracked by a social network. The user can select any of the types of organizations tracked by the system. The system stores a variety of organizations, such as clubs, companies, businesses, non-profit organizations, and others. In a step 5005, the system aggregates a list of persons connected to the first organization in the social network. These persons are not directly connected to the user (e.g., no one-degree connection in the system). Persons that are connected to the first organization includes persons such as those who are employed by the organization, serve on the board of the organization, have a family member who works at the organization, volunteers with the organization, served as an advisor (e.g., for an initial public offering, legal, or other type of advisor) to the organization. In a step 5007, the system formats the list of persons. This is done according to a strength of each person in the list of persons with the user. For example, the system can determine which persons in the list of persons have a relationship with the user in the system. These can be based on categories of strength determined by the system. This relationship or category can be an interest in common (e.g., a business interest, a personal interest, or social interest, or other interest). Another relationship type is having a person in common between the user and persons in the list of persons. Another type can be organizations the user has in common with a person in the list of persons. In a step 5009, the system displays the formatted list of persons. This can include all the persons in the formatted list or just a portion of the persons in the formatted list (e.g., all those who fit on one screen, a maximum of five or other number of persons, or only those that have a high relevance as determined by the system).

FIG. 5B shows a flow 5011 for revealing connections between persons in a social graph. In a step 5013, the system allows a user to select a first person and a second person tracked by a system. For example, when the user navigates to the first person's profile page in the system, the system selects the second person based on a previous selection made by the user (e.g., the user selected the second person as a connection to the user in the system). In another example, the user enters information on the first and second persons into the system on a single page. In a step 5015, the system aggregates a set of paths. These set of paths traverse nodes of the social graph, starting with the first person in the first position and ending with the second person in the last position. The path can contain at least four persons tracked by the system (e.g., the first and second persons as well as two other persons). Persons in these paths can be connected to each other in numerous ways (e.g., familial, employment, same interest, board members, friendships, co-investors, and many other relationships). In an implementation, the system displays an influence indicator for connections. For example, a person who works in a large company has a lower influence with another person working in a company than if they both worked for a same but smaller company. The influence indicator can be shown in the system using descriptors (e.g., low, medium, or high), percentages, or other method.

In a step 5017, the system formats the set of paths by a strength of each path relative to each other path in the set of paths. In an implementation, the system uses the influence indicators to determine the strength of the paths. In another implementation, the system uses the number of persons in each path to determine the strength of the paths. The system can also use a hybrid method to format the paths (e.g., mix the two methods discussed above). In a step 5019, the system displays the formatted set of paths.

FIG. 5C shows a flow 5021 for facilitating a user to make relationships to an organization tracked by the system. In a step 5023, the system allows a user to select an organization tracked by a system. In a step 5025, the system aggregates a listing of persons connected to the organization and connected with at least one special interest in the system. In the system, a special interest can be many things. For example, some special interests are non-profit organizations, a social cause, a political cause, a political action committee, a charitable cause, an industry sector, or other special interests. In a step 5027, the system formats the listing of persons to create a listing of special interests. This is to sort the listing of persons, by a particular special interest. This means that persons with the same special interest would be connected in the listing. For example, if two or more persons donated to a particular political campaign (e.g., Barrack Obama or Mitt Romney for president in 2012), they are grouped together by their donation in the listing of persons. If a person has made multiple donations to more than one special interest, they are grouped to each special interest in the listing of persons. In an implementation, at least one person in the listing of persons is not connected to any special interest, so the system does not need to further consider this person. In a step 5029, the system displays the organization and the listing of special interests to the user. The system can optionally display the cause of the special interest, a description of the special interest, and the total amount made by persons in the listing of persons to the special interest. This can optionally hide the identities of the persons in the listing of persons.

Figure 5D:
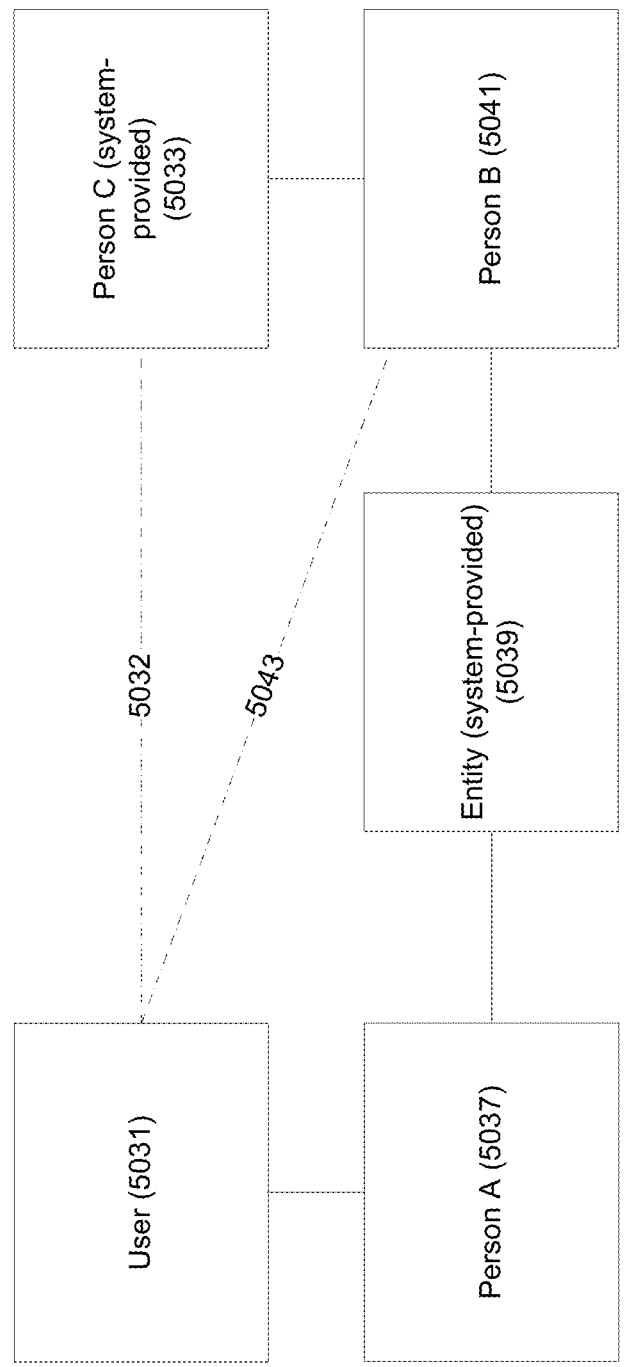
FIG. 5D shows a diagram of a use case of the system.

FIG. 5D shows a diagram of a use case of the system. For example, this use case can occur if a user 5031 wants to know how they are connected or linked 5032 to a person (e.g., person C whom is a system-provided node) 5033. The system starts by analyzing what connections the user has and selecting a person A 5037 that the user is connected to. The system checks what entities person A 5037 is connected to and determines person A is connected to a system-provided entity (or node) 5039. This system-provided node can be of any of the types that the system supports (e.g., person, organization, creative work). The system then determines another person, person B 5041, which is connected to the system-provided entity 5039. Person B 5041 is connected to person C 5033. So the user understands the connection (or path) they have with person C, the system can display to the user person B 5043.

A real-life example of the use case in FIG. 5D can be a user wanting to know the CEO of a major company (person C). The user enters into the system when they are signing up that they know person A who is, although an important personal connection to the user, does not know person C and is not a system-provided node. However, person A is a member of a non-profit organization (or the system-provided entity 5039). The system will have the information that person B 5041, whom is a board member of the non-profit organization. For example, person B does not have to be a person node in the system-provided nodes. Finally, person B is the spouse of person C 5033, the person the user was interested in.

In an implementation, the system indicates to the user at least one person in the path from the user to the first system-provided node. This is so that the user will know how they are connected to the first system-provided node, and to contact the person in the path to arrange an introduction to the first system-provided node.

In an implementation, every piece of information (or node) is attributed with a "type." The type system is our ontology as information is broken down into a few major categories that organize different types of data. Entity Types classify each entity, or node in the graph at the top level. In an implementation, entity types include: People, Organizations, Creative Works, Events, Products, Awards, Places, and Transactions. Each Entity in the system can be categorized at very granular levels, and have multiple classifications, however, each entity must have exactly one top level type. Further information on these entity types follow:

(1) People. These are the natural persons in the system. Many of the other entities relate to one or more people in the system.

(2) Organization. For example, these are companies, nonprofits, associations, fraternities, or others.

(3) Events. The system can track event such as business transactions, conferences, parties, award ceremonies, or others. These events can have influential or important persons in attendance.

(4) Creative Works. Creative works are films, TV shows, paintings, books, or others. These entities are important because they create additional connections between entities.

(5) Awards. Awards can be creative work awards, ranked lists, hall of fame memberships, Honorary Degrees, or others. Awards can be given to people, organizations, and creative works. These are usually given (or granted) by an organization.

(6) Products. Products are produced by companies. Products can be dealt with both on an abstract level (where one entity represents the product), or on a per instance level. Stocks issued by a company, both public and private types of stock, are dealt with as products.

(7) Places. Places are a special type of entity in that these entities must be defined in geo-spatial terms. Places can be both administrative regions (e.g., cities, states, countries) as well as points or physical places (e.g., restaurants, museums, offices).

(8) Transactions. Transactions are ownership events that involve two or more companies, and any number of people.

In an implementation, the system has aspects of a social network, which profiles entities and creates connections between the entities. As discussed elsewhere, entities can be people, organizations, events, awards, creative works, or other.

In an implementation, an organization is a collection of multiple people. These people can be also be represented as nodes, separate from the organization. For example, company A has a CEO who is person B. Company A can be represented as a company node, while person B can be represented as a person node. Person B will also be connected to company A. A benefit of using organizations is that it helps the system arrange its data and possibly decrease the amount of nodes in the system. For example, some organization can have many members or people. Using the example given previously, if there is a person C who is an entry-level associate at company A, the system does not need to create a person node to represent them. Instead, person C can be associated with the organization without a separate person node. This simplifies and reduces the information the system needs to store. Also, grouping by organizations assists a user of the system in making searches by allowing powerful queries based on an organization. For example, the system can tell a user not only who is in an organization, but whether another person is associated with the organization. For example, for a popular golf club (an organization), the user can find out not only who is a member of the club, but others associated with the club (e.g., people who make donations to the club, is a spouse of a member of the club). This allows the user to quickly expand their connections, by asking who is connected to an organization.

FIG. 5E shows sharing links in a sample organization (or group). The organization 5040 has members A, B, C, D, and E. In the organization 5040, member C is connected to member B by link 5043*a* and member E by link 5043*b*. Although part of the same organization 5040, member A and D and not connected to the other members of the organization (e.g., B, C, E). However, member D is connected to an entity F by link 5045. This entity F is not a member of the organization 5040. Thus, members A, B, C, and E gain a connection to F by links 5047*a*, 5047*b*, 5047*c*, and 5047*d*. These can be first or second degree connections. For example, link 5047*a* is a first connection from A to F or a second degree connection from A to the organization 5040 to F.

Figure 6:
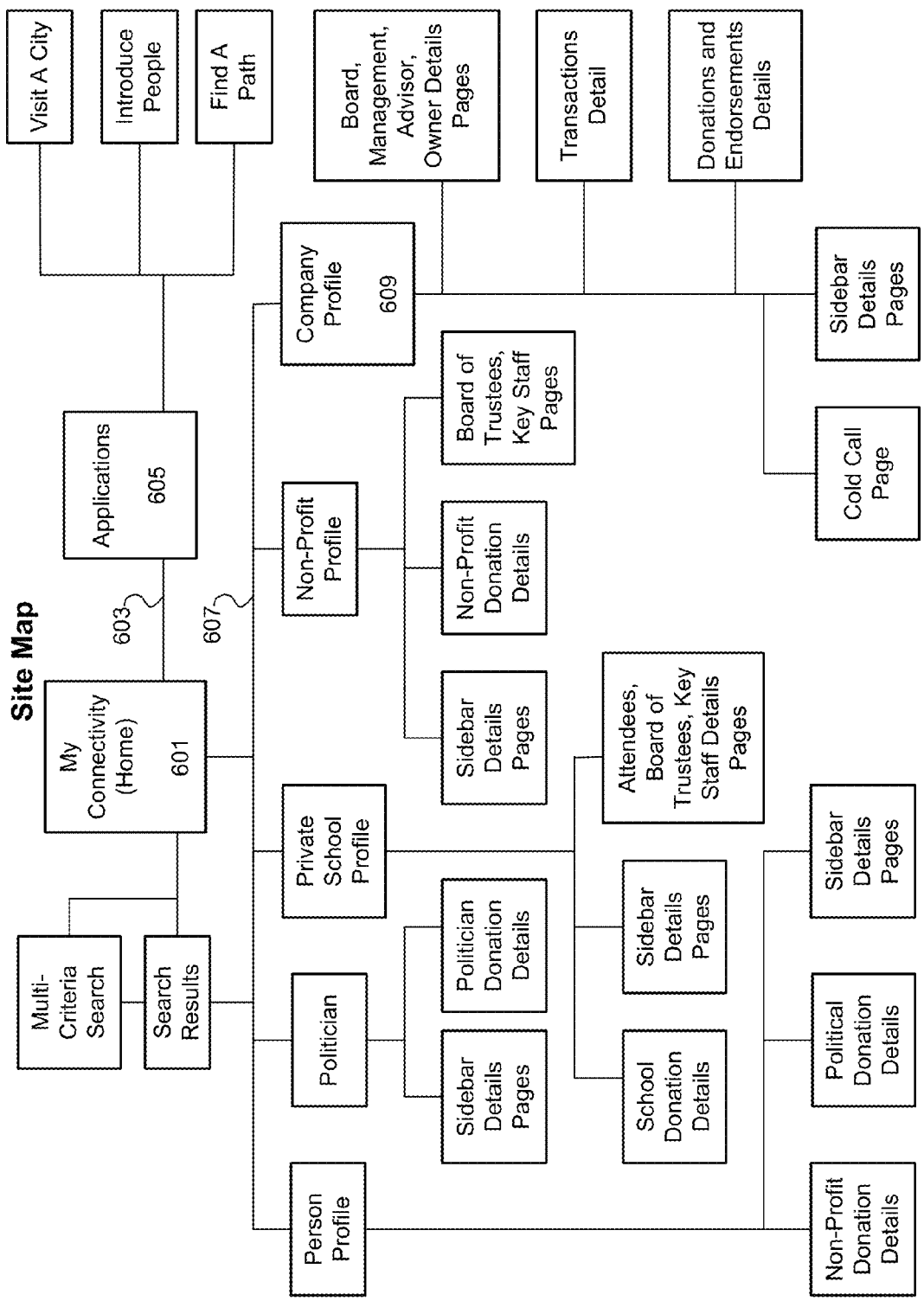
FIG. 6 shows a site map of an implementation of the system on-line.

FIG. 6 shows a site map of the system in an implementation accessible on-line. The site map shows pages and connections between the pages of the system. For example, when a user signs into the system with an account, they are bought to a My Connectivity page 601, which is a home or start page for this user. From this page, the user can navigate through link or connection 603 to reach an Applications page 605. Alternatively, from the My Connectivity page 601, the user can navigate using link or connection 607 to reach a Company Profile page. More details on the types of different pages of that system are discussed elsewhere in this document.

In an implementation, pages of the system are divided into three types: profiles, details pages, and applications. Notable entities, such as entities with many connections, high influence rankings, or the like, can have their own profile page. In yet another implementation, all entities of the system have a corresponding profile page.

In an implementation, profile pages have a similar structure. Basic information about the entity (e.g., their name, power ranking) is displayed at the top of the page. Tabs near the top of the screen display information about the entity and a default view of the profile can be a 'View All' tab that shows all the information. Different entities have different kinds of tabs on their profile pages, as discussed further elsewhere in this document. A right side of the profile page consists of boxes that show the various kinds of connections the profiled entity has between the user and other entities on the site.

In an implementation, a details page provides data and views about information that could appear on but does not completely fit on profile pages.

In an implementation, an application page provides useful ways for the user to leverage the information in the system by providing unique and interesting views about the relationships and connections between entities of the system (or system-provided node) and the user.

Figure 7:
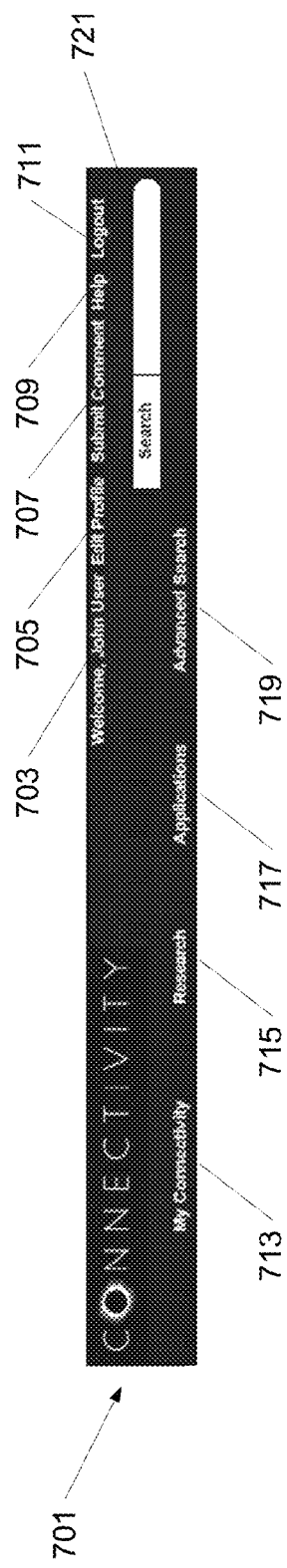
FIG. 7 shows a sample header of the system.

FIG. 7 shows a sample header of the system. The site header 701 can be included at the top position of pages of the system. The header allows a user (or paid subscriber) of the system interact with the system. For example, the user name of the person logged in is "John." This header gives the user consistent navigation and interface options. A site logo (such as "Connectivity") is displayed at the top left, and is also a hyperlink to a default page (e.g., the My Connectivity page). Additional information in the header includes:

703: "Welcome, [user name]": indicates to the user which account is being used by user name.

705: "Edit Profile": takes the user to the edit profile page, as discussed in greater detail elsewhere in this document.

707: "Submit Comment": takes the user to a submission page that allows them to submit comments or corrections to the site administrators. When clicking the Submit Comment link, the system remembers which page the user is on when the link is clicked. This allows the system's administrators to view and diagnose the potential problem. For example, a comment can be how the site is performing (e.g., whether all the functions are fully operating for the user, or other) or whether information in the system is correct (e.g., a name of a person in the system is spelled incorrectly, the system does not show a familial relationship between two persons, or other information about entities in the system). In an implementation, the system remembers the page the user is viewing when they make the comment. For instance, if a page has a broken link and the user submits a comment with that information, the comment will include the page the user was on when they made the comment.

709: "Help": takes the user to the help and account management section of the system. This can link to tutorials in various formats (e.g., frequently asked questions, videos, or other formats) that help or train the user in how to use the system.

711: "Logout": logs the user out of the system and takes them back to a landing page of the system.

In an implementation, across the bottom of the header are the following options (only some of these are shown in FIG. 7):

713: My Connectivity: take the user to the home page. Profiles.

715: Research: take the user to system resources that show information about the persons tracked in the system.

717: Applications: when a user hovers with their mouse over this option, a dropbox (or drop-down menu) displays links to various applications of the system (e.g., 'Visit a City', 'Find a Path', and 'Introduce People' pages). This is described in greater detail elsewhere in this document.

My Connections: shows the user entities that they are connected to in the system.

719: Advanced Search: takes the user an advanced search page.

721: Search Box: allows the user to do simple searches for people, organizations and other entities in the graph. This box can auto-complete. For example, the system can generate suggested searches based on what the user has already typed. This can be displayed by the system using an updating drop-down list, by completing the partially typed search by the user, or other.

In an implementation, other functions accessible through the header are available through a drop box (or drop-down) menu when the user interacts with the header. For example, a user can click or hover over an item in the header (e.g., Home, Profiles, My Connections), and additional functions will appear in a drop box menu.

In an implementation, a user of the system can add connections to entities stored in the system easily. For example when a person entity appears in a display of the system, a "+" icon can appear next to or below that person's name. This allows the user to quickly add a relationship to that person. There are no confirmation dialogues or boxes after selecting the icon. This encourages users to create relationships with as many profiles as possible. In another implementation, relationships are added by clicking 'add relationship' on the entity's profile page, as described further elsewhere.

In an implementation, the system uses an influence ranking. This can also be called a power number, power ranking, influence index value, or other. The influence ranking is the system's estimate of how influential a node of the system is in the world, and is displayed next to the name of the node on their profile page. This metric is generated from a centrality algorithm that is designed to find the nodes with the highest influence in a directed graph based on how many relationships that node has to other nodes in the graph, and how influential those nodes are. Additionally the power number takes into account bias factors that we assign to certain people to whom the algorithm created an estimate that seems to be off. A purpose of the power number is to give the user an idea as to how influential this particular person is in the world.

Figure 8:
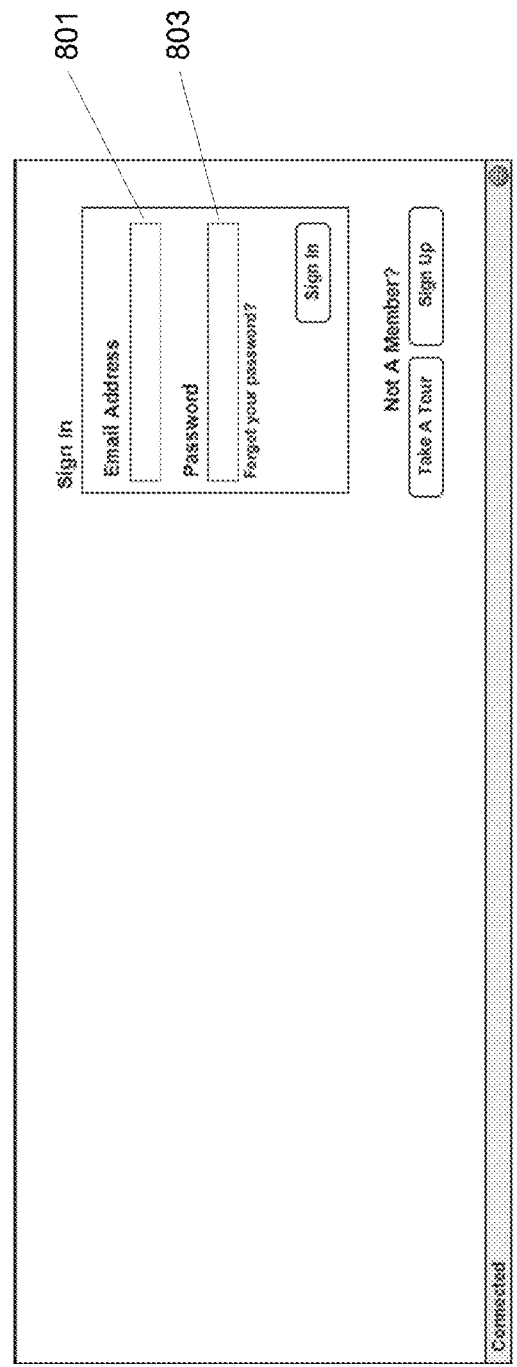
FIG. 8 shows a login screen in an implementation of the system.

FIG. 8 shows a login screen in an implementation of the system. When a user navigates to the site, the user is presented with the login screen. The user is prompted to log into the system using their email address 801 and password 803. If the user has forgotten their password, the system presents an option for password recovery. If the user is not already a member, the system allows the user to sign up for the site, or take a tour of the site's features so that they can decide whether to sign up and become a member.

Figure 9:
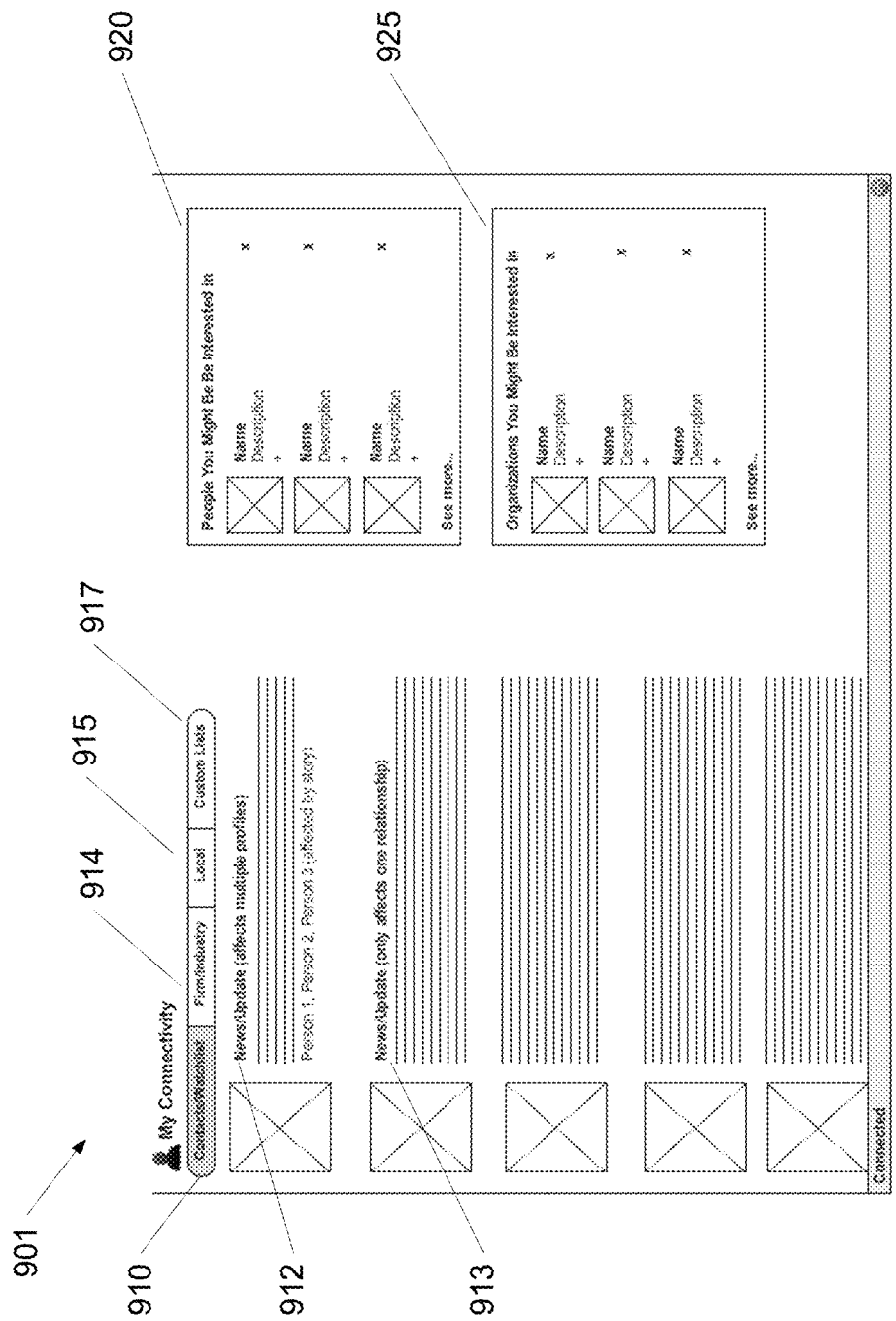
FIG. 9 shows a home page screen in an implementation of the system.

FIG. 9 shows a home page screen in an implementation of the system. This screen is also known in the system as the "My Connectivity" page 901. The left side of this page contains a stream or feed of information including updates and news stories about people, organizations, and entities the user has a relationship with or has added to their watch list (as explained in greater detail below). These news stories could be a new piece of data entered into the system since the last time the user has accessed their account. For example, a piece of news can be a large non-profit donation from a person the user has on their watch list. More news stories, such as news stories that are older or are too numerous for the system to display on one screen can be accessed by selecting a "Show More Stories" link.

In an implementation, the user can use the system to filter the news stream by categories. These categories can include:

910: Contacts/Watch list. A first stream is the News/Update stream 912. This stream displays updates and stories that affect one or more people in the user's network (e.g., in the user's contacts or watch list). If the update affects one person, the stream displays the picture of the relevant person with a summary of the news update. The person's profile picture and news story is hyperlinked to lead to that person's profile page. For example, this can be when one of the persons tracked by the system marries another person who is not tracked by the system. A second stream is a second News/Update stream 913. If a story (or event) affects multiple people in the user's network, the picture included with the story is either of an organization related to the news story, or the most influential person the story affects. The summary of the story appears next to the picture, and the names/thumbnails of the affected persons appear below the summary. All the names/thumbnails of people and organizations are linked to their respective profiles. The site filters and orders these stories based on relevance, which may take into account one or more of the following factors: how recent the update (news story) is, proximity of the person in the story is in the user's network generated from our weighted path algorithm, and number of people affected.

914: Firm/Industry. This stream is similar to the Contacts/Watch list stream, but presents information and stories directly related to the user's current company (or firm) or industry. For example, the system can determine that someone working for Oracle Corporation is in the hardware and software technology industry and present news events to the user related to the hardware and software industry.

915: Local. This stream presents updates and news related to or occurring in a specific geographical area, such as the user's present city, town, or other location specified by the user.

917: Custom Lists. This stream is customizable by the user, and displays updated and news related to entities or areas (e.g., industries, geographies) that the user has expressed interest in. For example, if the user is a Hollywood film investor, they may specify that they want to view all updates on the film industry in Los Angeles. In another example, the user can create a custom list on all conferences in manufacturing, or fundraisers in New York City. These lists are created in the "Manage Custom Lists" section of the "My Connections" page. The system can then perform a search using on these search criteria whenever specified by the system (e.g., every time the user logs on, every interval of time, or other measure of time).

In an implementation, the system can display people and organizations that the user may have a relationship with or that they might be interested in. These are represented as boxes 920 and 925 on the right. These people and organizations are determined by the system based on their proximity in the user's network, overall influence, and influence on sectors or domains that are important to the user. In an implementation, if the user has not entered any information or relationships, this space will prompt the user to add their career/personal information into the system. This allows the user to begin storing their relationships by linking to the Edit Profile. In an implementation, the system also includes reminders to the user about features of the system they are not taking advantage of by not entering in their relationship data.

Figure 10:
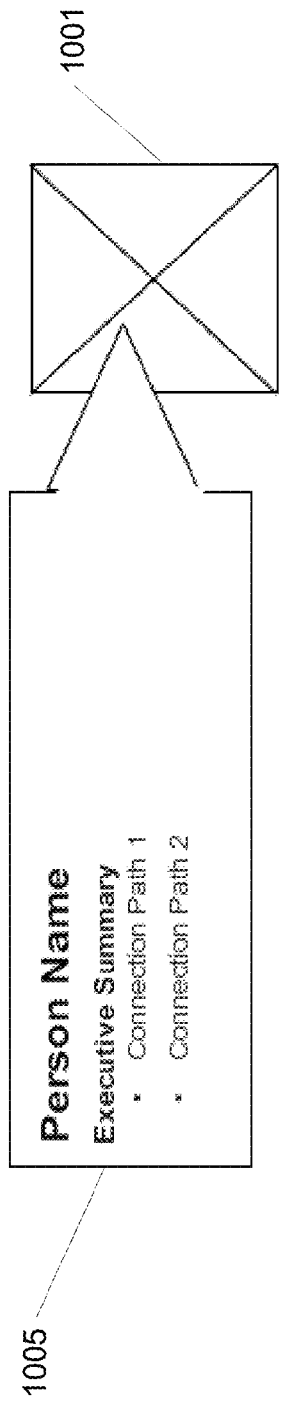
FIG. 10 shows a sample suggestion for a user.

In an implementation, the system includes suggestions on people that the user may want to know more about. FIG. 10 shows a sample suggestion for a user. These can be suggestions of people that the user does not have a relationship with, but are close to the user in the system or with other relationship to the user such as a number of common relationships, and common entities or organizations.

In an implementation, the system displays suggestions when the user hovers over an object representing a system-provided node. A box 1001 represents an entity of the system. A system-provided node can be represented in the system by the box by many different objects such as a picture (e.g., head shot of a person, logo from an organization, or other graphic that is representative of the company), a text link (e.g., a person's name), or parts of an object (e.g., a portion of a pie chart). Additional information on how to connect to the system-provided node appears as a pop-up 1005. Hovering over an object is when the user brings their mouse cursor to an object in the system. A pop-up is a window within the main window, with the contents of the pop-up window showing above the contents of the main window. There can be overlap between the pop-up window and the main window. In the pop-up, relevant information of the system-provided node appears. For example, in FIG. 10 where the system-provided node is a person node, the pop-up window 1005 shows the person's name, executive summary (or a management summary) providing a brief outline of the person, and outlines the paths of connectivity between the user and that person.

In an implementation, if a suggestion provided to a user is interesting to the user, the user may click on the object representing the system-provided node. For example, the user can left-click the object, press the enter key on the keyboard, or use other similar methods.

In an implementation, a user can directly add the system-provided node (e.g., a person) from the pop-up. The user can do this, for example, by clicking an "Add Relationship" or similar link shown with the pop-up. In yet another implementation, a user does not want the system-provided node added to their relationships. This can happen when the suggestion is false (such as when there is an error by the user that caused the system to believe the suggestion was valuable to the user) or misguided (such as when the user does not want to be connected because they believe the connection is not valuable). In an implementation, the system provides the user an "x" icon to indicate that the suggestion is not valuable to the user. The system can then replace the system-provided node object displayed with another system-provided node object. For example, if a user decides a connection with person A is not valuable, the system receives an indication that the user wants person A to be removed from their suggestions. The suggestion is then replaced by the system with a new one. Only a small number of suggestions may appear to the user, but the user can click on the 'See More' link to be taken to a page that has a full list of all the suggestions.

In an implementation, the system gives the end user different suggestions each time they visit a page. The user does not have to click "x" in order to see another suggestion, rather when refreshing the page, the system's suggestions can be regenerated with a new list of people.

In an implementation, the system displays suggestions to a user of organizations they may be interested in. Similar to FIG. 10, the system can present to the user a summary of the organization when the object on the display representing the organization is hovered over.

Figure 11:
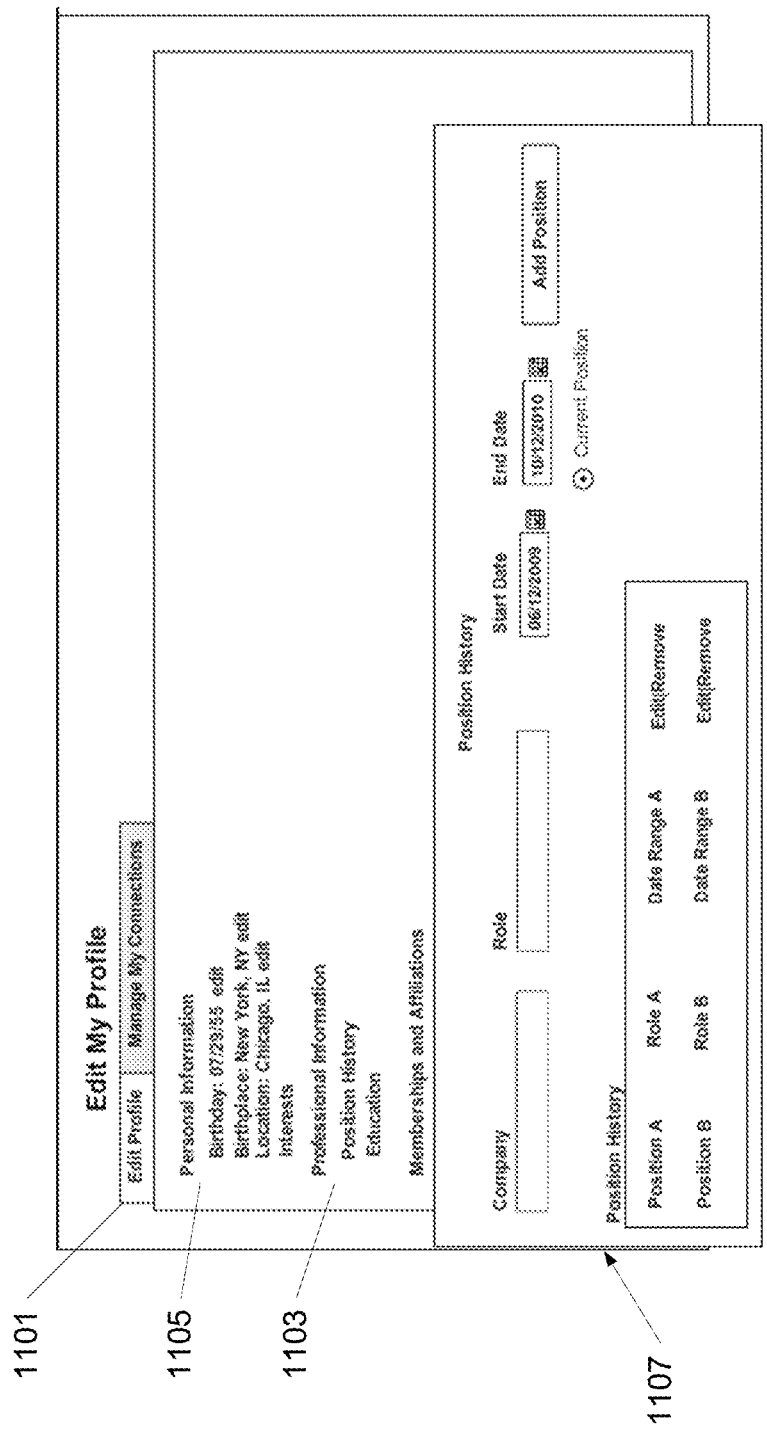
FIG. 11 shows an edit profile page in an implementation of the system.

In an implementation, the system allows a user to edit their own profile page. A profile page is a page displaying a relevant entity's information. FIG. 11 shows an edit profile page in an implementation of the system. This page can be reach, for example, by clicking the "edit profile" link from the banner as shown in FIG. 7. This page allows the user to enter data about themselves that can be used to create connections between the user and other entities in the system. For example, the user can input details about: (1) Personal Information—birthday, birthplace, current location, interests; (2) Professional Information—work history, education; or (3) Memberships and Affiliations—clubs, non-profits, political organizations, events. The user can edit each field by clicking the 'edit' link next to them. For fields that can have multiple entries (e.g., interests, professional information, memberships, affiliations) a popup box appears that shows all the information the user has previously entered and allows the user to add new items, delete items, or edit existing items.

For example, the system can present to the user a page to manage their relationships with companies, organizations, and other groups, as shown in FIG. 11. By adding to their position history, the user can include additional information related to the position, such as their specific role or relationship with that company. Other relationships can be added through education, and memberships and affiliations, which can also include related information on the relationships such as the specific roles they had. This page displays a list of the user's relationships as well as details about the relationship. These details can be the name, executive summary 1105, and relationship level (or strength) of the person and the user. This is accessible through the edit profile item 1101. The edit profile item also shows basic personal information of the user such as their professional information 1103 and allows the user to make corrections to this information if necessary. For example, the user can add their employment information through a pop-up window 1107.

Figure 12:
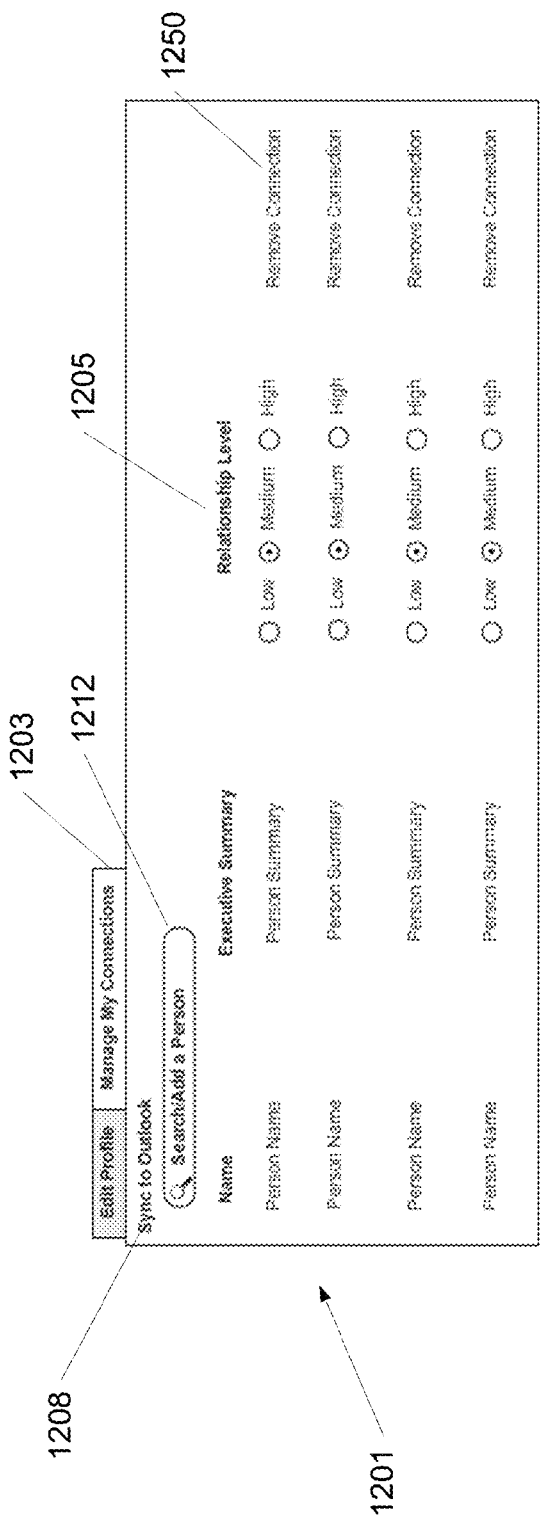
FIG. 12 shows an implementation of the manage relationships page.

In an implementation, the system contains a manage relationships page. FIG. 12 shows an implementation of the manage relationships page 1201. The page can be reached by clicking the "Manage My Connections" tab 1203 next to the "Edit Profile" 1101 tab as shown in FIG. 11. The page can also be accessed by clicking on the "Manage Relationships" at the header of the system. On this page a user can view and edit the relationships they have established with other people.

The user can also have a relationship with companies and groups, these are managed through the "Edit Profile" page as discussed previously. The user can add connections to additional organizations by using a pop-up window 1201. The user does not have to add all their real-life connections into the system if they do not want to. The system may provide more accurate results if it contains all of the user's real-world connections, but sometimes some relationships are not so valuable that the user would want to add them into the system. For example, a relationship can be redundant where the user already has listed in the system many relationships with entities linked an entity, or where the user believes the relationship strength is so tenuous that it does not need to be tracked.

The system uses a default relationship strength of medium, but allows the user to include greater specificity on the strength of their relationship. However, the user is allowed to adjust their strength of relationship by using radio buttons 1205 associated with each relationship. Higher relationship levels reflect a higher levels of influence and connectivity between the user and the person. This can have various affects in the system. For example, is the user is connected to a person A and B, but person A is relationship level high and person B is relationship level low, the system will display objects based on relationships that the user has with person A before those with person B.

The people profiled in the system co-exist in a weighted graph where connectivity between two entities has a weight, so that for example, a link between two people of "acquaintance" is not as strong as a link between two people that is "sibling." Using relationship levels is one way the system uses to understand the difference in strength of the two different relationships.

This allows the system to provide to a user paths of connectivity that are not only short, but that have high significance. Allowing the user to select low, medium or high relationship level to the people whom they've indicated they have a relationships helps the system assign a weight on an edge connecting the user and their connections. This means that when the application selects paths of connectivity for a particular user, the application is likely to first suggest paths that go through people to whom a high relationship strength has been established by the user.

An option to "Remove Connection" 1250 can also be included. This removes the person associated with the Remove Connection object from the user's relationships. A search box 1212 at this page allows the user to quickly filter through the list of relationships the user has with persons in the system. It can also be used to find persons in the system that the user is not connected to, and add them if the user believes the relationship is valuable.

In an implementation, the system allows a user to sync listings of entities the user knows to their account in the system by using link 1208. For example, Microsoft Outlook's® address book can have its information extracted and imported to the account of the user, or the contact of the system can be exported to the user's Outlook address book. However, the system can also sync listings of entities the user knows from other sources located on the user's computer (e.g., a Thunderbird address book, an Apple Address Book) or from on-line sources (e.g., a Facebook® account, LinkedIn account).

Figure 13:
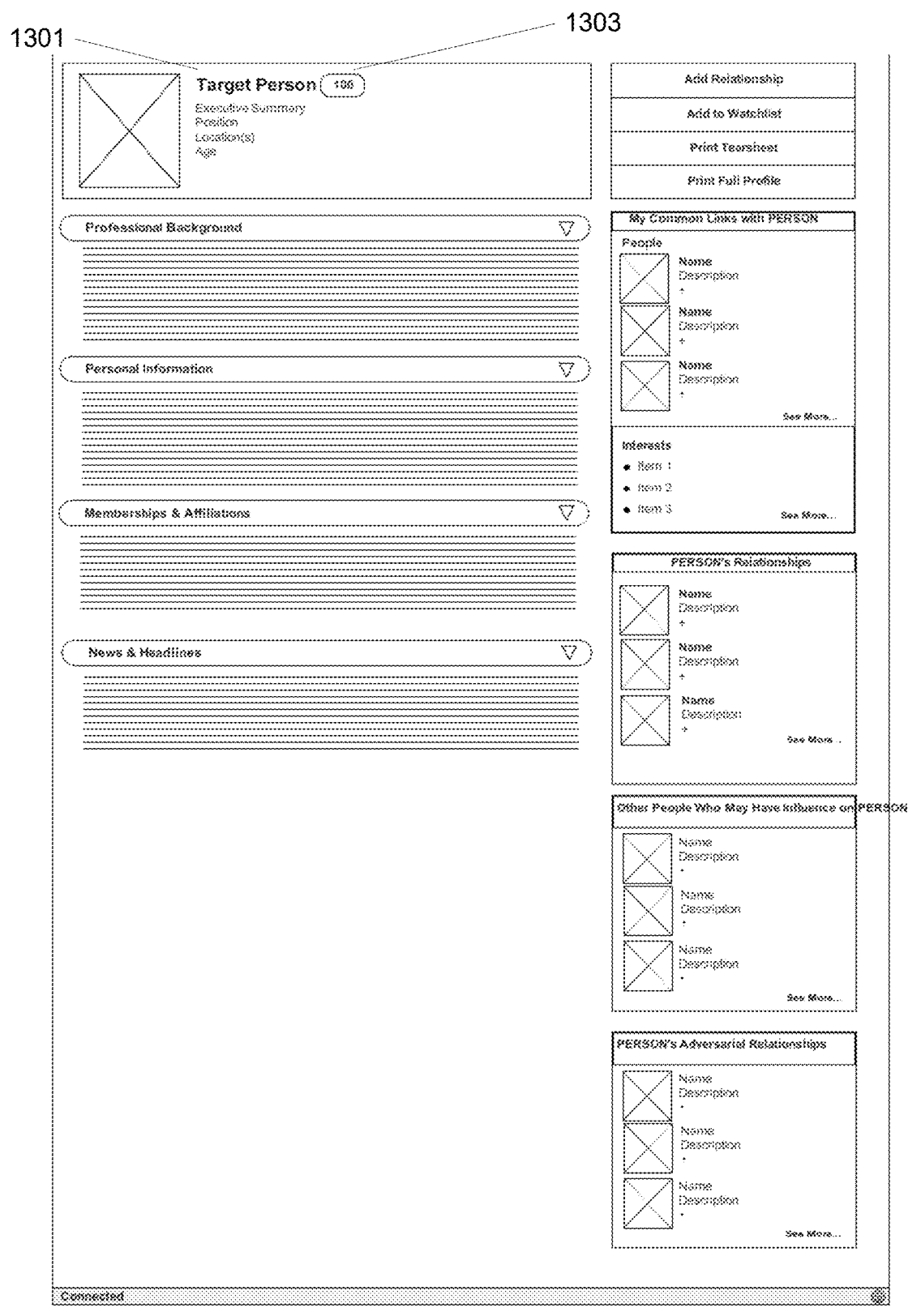

In an implementation, the system can display a person profile page for person entities of the system. FIGS. 13-21 show person profile pages in an implementation. FIG. 13 shows a sample person profile page. This page appears when a user clicks through to a person linked object in the system. For example, a person linked object can be the name of the person in text or a photo of the person. There are shared elements in the person profile page but some person profile pages may differ depending on a type of that person as well as the information that is available about that person. For example, a lawyer would have a section for "Major Cases" whereas an athlete would not.

The top of each profile page contains a box that summarizes the profile 1301. This includes the name of the person and includes an 'at-a-glance' summary of the profile person, helping the user quickly determine whose profile they are viewing.

For a person, this can include:

(1) The person's name. A common way of referring to the person may be used here instead of their formal name (e.g., "Bill Clinton" and not "William Clinton").

(2) An "Executive Summary." A short description of the profile person, usually focusing on the person's "best known for" attribute.

(3) Current location.

(4) Age.

(5) Power Number. In this example, the power number 1303 is represented as a number from 0-100 in a pill shaped enclosure. In an implementation, the power number reflected here is the power number of the person in the system. In other implementations, the power number reflected here will be the power number of the person over a specific domain. The domain can correspond to things the user is currently interested in. For example, if the user has been searching for persons in the art world, the power number here will reflect the person's importance in the art world.

In an implementation, a person's profile uses collapsible lists (or tabs) to hide or show information on the person. These tabs group together information and data about the person or entity profiled. The user can switch between expanding the list or collapsing the list by clicking on the tab, and any tab that has no data in it will be grayed out. When an item is grayed out, this means that the system has provided a placeholder for the item, but will not allow the user to interact with the item (e.g., the user can view but cannot change). The person template can have the following tabs, with information in each tab displayed in summarized format (such as by using bullets):

(1) View All: Displays all information on one tab.

(2) Professional Background.

(3) Position History: List of jobs and positions that this person has held.

(4) Career Highlights: Expository information about this person's career.

(5) Personal Accolades: Expository information about this person's achievements.

(6) Investments: Personal investments that this person has made (e.g., companies, films, theatre productions, real estate).

(7) Areas of Influence.

Figure 14:
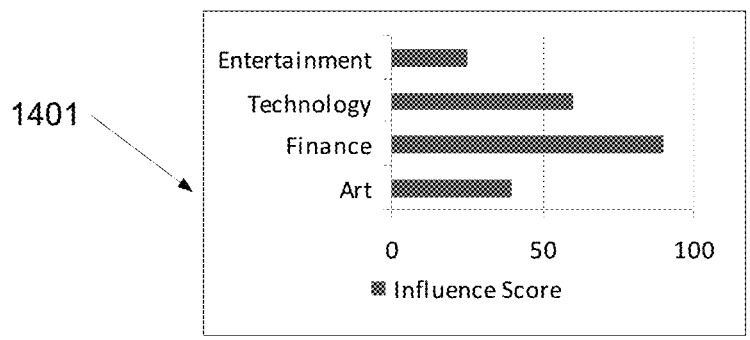
FIG. 14 shows a sample power in a sector chart of a person.

(8) Power in a Sector: This gives rankings as to how influential a person is in a domain or an industry relative to the rest of the world. This is also shown at the top in the profile header. This will be accompanied by a chart shown below that shows relative influence over specific areas. FIG. 14 shows a sample power in a sector chart. A bar chart 1401 is shown here, but other formats can be used (e.g., pie chart, line chart, area chart, or other formats).

In an implementation, a person's profile contains personal information of the person. This may include the person's:

(1) Background: General information about this person.

(2) Birthday/Birthplace.

(3) Childhood: Expository information about this person's childhood.

(4) Education: Academic institutions this person attended; including degree, subject, honors, fraternities, teams and activities.

(5) Financial Resources: Estimated net worth, major assets owned.

(6) Biography (or Bio): Generalized one paragraph description about this person.

(7) Family Members: Structured information on this person's family members (both immediate and indirect). If the family member also has a profile, these will be hyperlinked.

(8) Interests: Activities, hobbies, creative works, artistic genres or areas of activism/philanthropy this person has publicly expressed interest in.

(9) Quotes: Major quotes from or about this person, as well as recent tweets (for twitter users).

In an implementation, a person's profile contains the groups and associations of the person. This may include the person's:

(1) Social and business clubs: Country clubs, yacht clubs, associations, and unions.

(2) Conferences: Conferences this person has attended.

(3) Events: Fundraisers, parties, shows, or other similar events that this person has attended.

(4) Non Profit Association: Board memberships, positions at non-profits.

(5) Political Associations: Volunteer positions on campaigns, positions on special interests groups.

Figure 15:
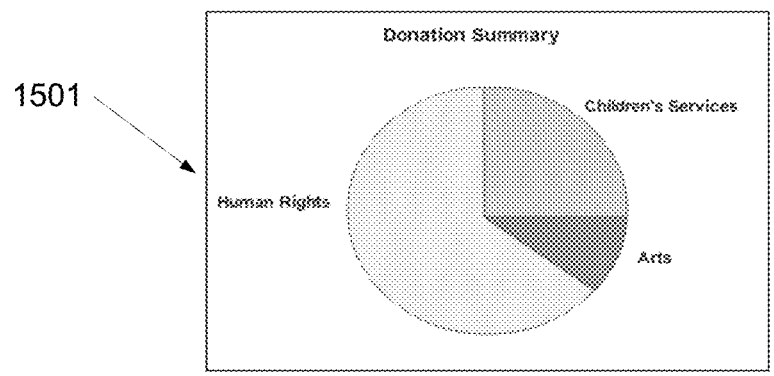
FIG. 15 shows a chart of donations to non-profits by a person.

(6) Non Profit Donations: Significant donations to non-profits, along with an analysis. FIG. 15 shows a chart of donations to non-profits by a person. The example represents this information as a pie chart 1501.

(7) Political Donations: Significant donations to political candidates and PACs (or SuperPACs, along with pie chart similar to the one for non-profit donations.

In an implementation, a person's profile contains the news and headlines of the person. This may include recent updates and news related to this person from the media or system updates to the person.

Figure 16:
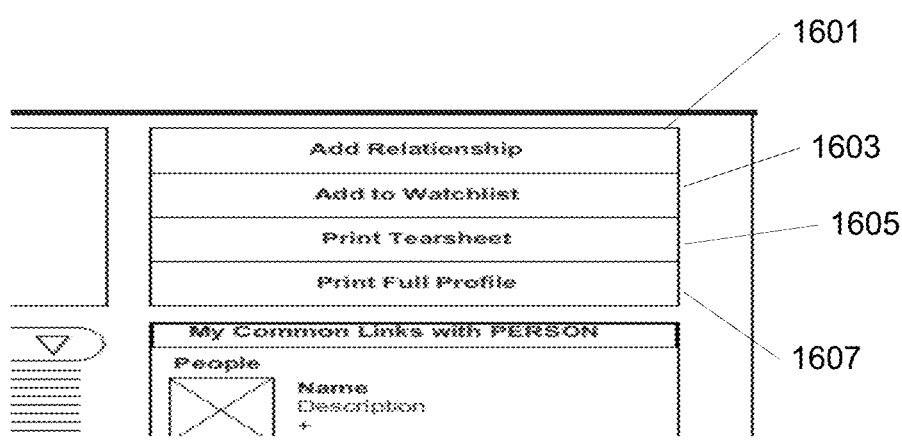
FIG. 16 shows a sample sidebar for a person.

In an implementation, screens of the system include a sidebar. The sidebar is used to present useful information or functions to a user. FIG. 16 shows a sample sidebar. In this implementation, there are four buttons:

1601: Add Relationship: Allows the user to quickly add this person as a relationship. In an implementation, the relationship is added to the user without leaving the screen with the sidebar (e.g., adding a relationship does not cause the system to navigate to another page). When the user clicks "Add Relationship", the person targeted becomes a part of the user's network and a relationship is established between the user and the person. The button changes to "Remove Relationship" to indicate that a relationship already exists between the user and that person. This accomplishes the same thing as clicking on a '+' icon, but does it from within that profile. Adding relationships is how the user expands their network, and through these relationships the user becomes connected to a wider web of other people and organizations. The strength of a relationship can be low, medium, or high, but defaults to medium when a relationship is first added. The user can curate and customize relationship strengths on their 'Edit Profile' page, but to encourage adding relationships the user does not need to specify relationship details upon first making the connection.

1603: Add to Watch List: For specific entities that the user is interested in, the user can add them to a watch list. The system monitors the entity for any changes, and includes the changes in a report to the user. Adding a person or organization to their Watch List indicates that a user is interested in receiving news and updates about that entity, but does not necessarily have a relationship with them. When a user clicks on the 'Add to Watch List' button, the button becomes 'Remove from Watch List', and news and updates about the entity appear in the user's news feed, but a relationship is not established between the user and the target.

1605: Print Tear sheet: The system generates a summary of the information and formats the information so that it is reduced to provide essential information only. This information can be stored in a print optimized PDF version. This page is useful as a quick reference and research guide.

1607: Print Full Profile: The system prints the entity information, formatted in a printer-friendly page.

Figure 17:
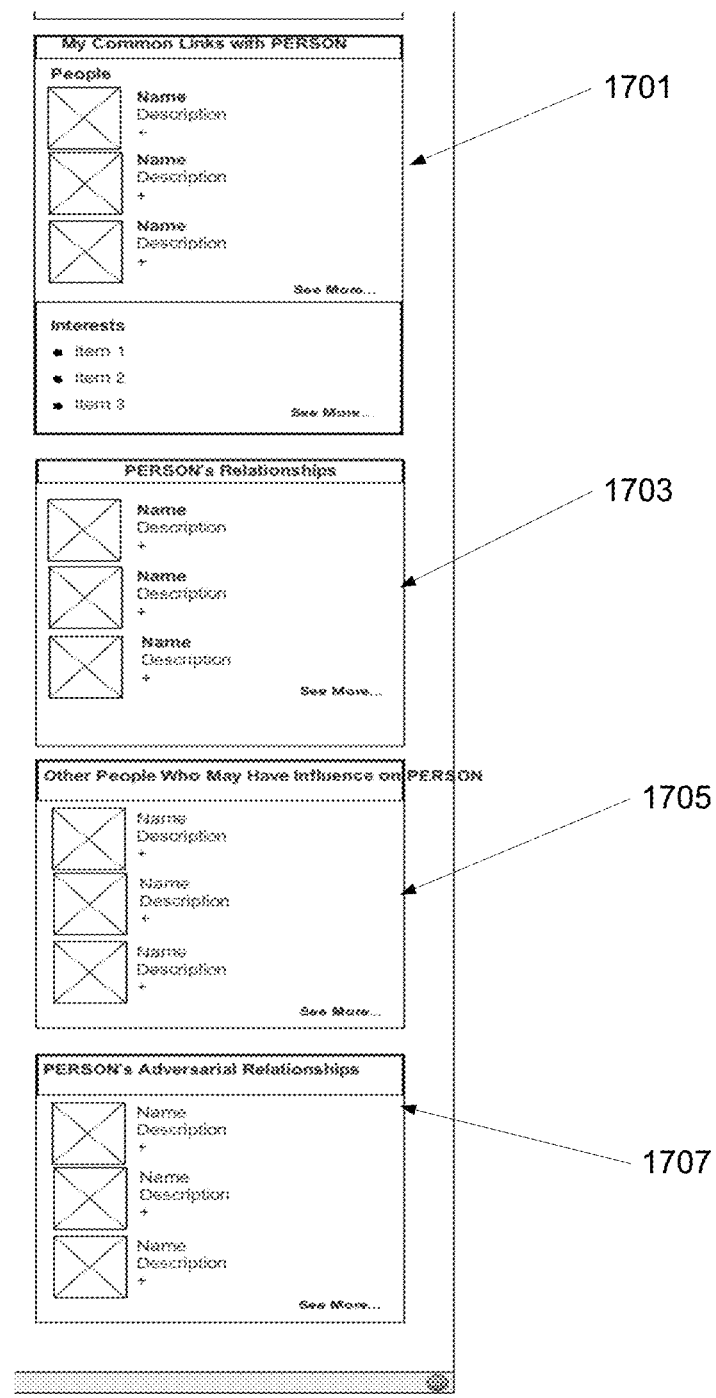
FIG. 17 shows a sample links for a person.

In an implementation, a person's profile contains common links between a user and the person. FIG. 17 shows a sample links for a person. Some sample information in the common links portion include:

1701: Common Links for People: A list of the top relationships that the user and the target person has in common. These common relationships are populated by means of our weighted path algorithm. Similar to FIG. 10, a popup can appear when the user hovers over the information here. The popup contains details on how the common person is connected with the person whose profile page the user is on. Clicking on the 'See More' link takes the user to a page that displays all of their common relationships. This includes a common links or interests portion. This shows the top interests that the user and the profiled person have in common. The application derives a list of interests shared between the two from a list of the profiled person's interests (from the system) and a list of the user's interests (entered by that user when setting up their profile). Clicking on the "See More" link takes the user to a page that displays all their shared interests. This, combined with the common people section, allows the user to find out what topics and people might be of common interest when trying to network or communicate with the target person.

1703: Person's Relationships: This lists the top most influential relationships that the profiled person has. These relationships are determined by the system that takes into account the types of relationships and common connections of persons. Hovering over a picture or relationship displays a popup that describes how the two people (person profiled and person who is being hovered over) are connected. Clicking on the "See More" link goes to a page that displays all the profiled person's relationships.

1705: Other People Who May Influence Person: These are persons that may have power over the person, but their power is not through a direct relationship but inferred by the system.

1707: Person's Adversarial Relationships: If a person has adversarial relationships in the system, these will appear here. Adversarial relationships can be where persons come into conflict (e.g., in a lawsuit, on boards of opposing companies, competing divisions within an organization, or the like).

Figure 18:
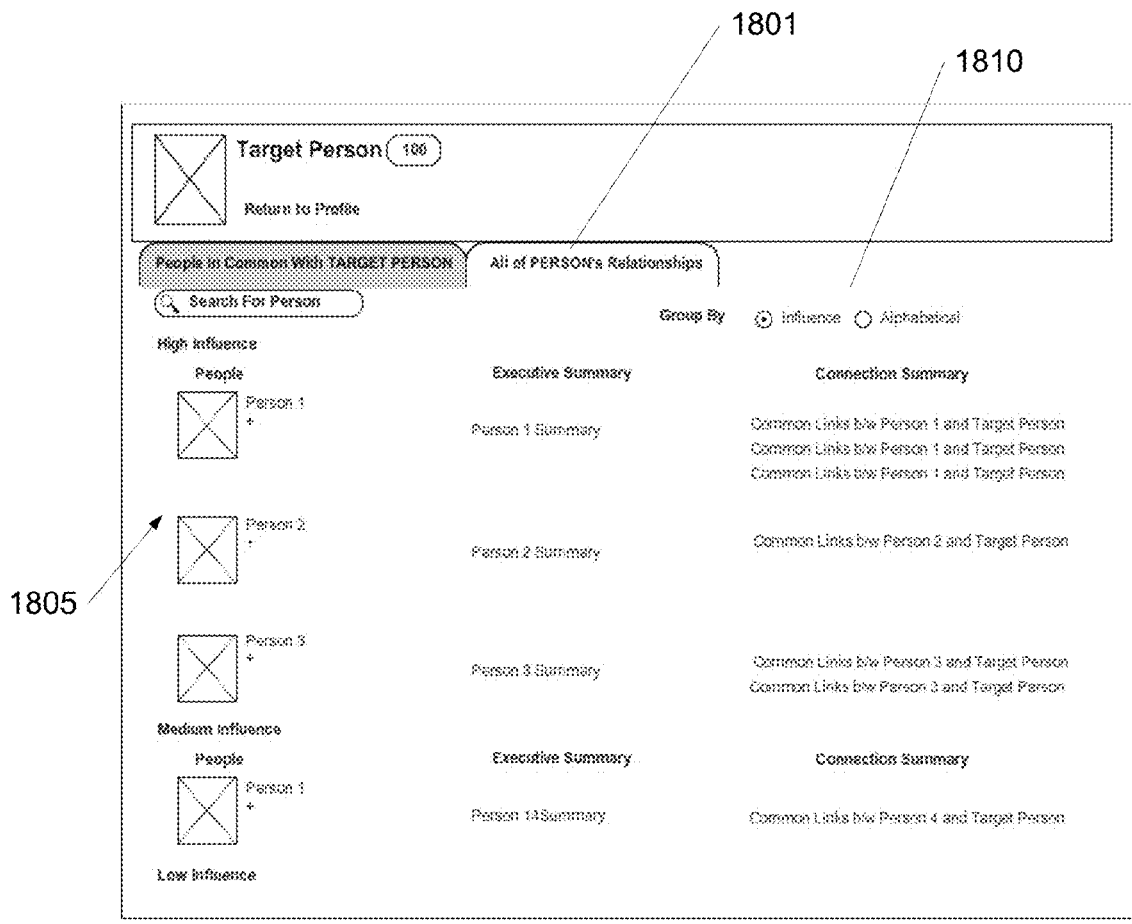
FIG. 18 shows a sample list of all a target person's relationships.
Figure 19:
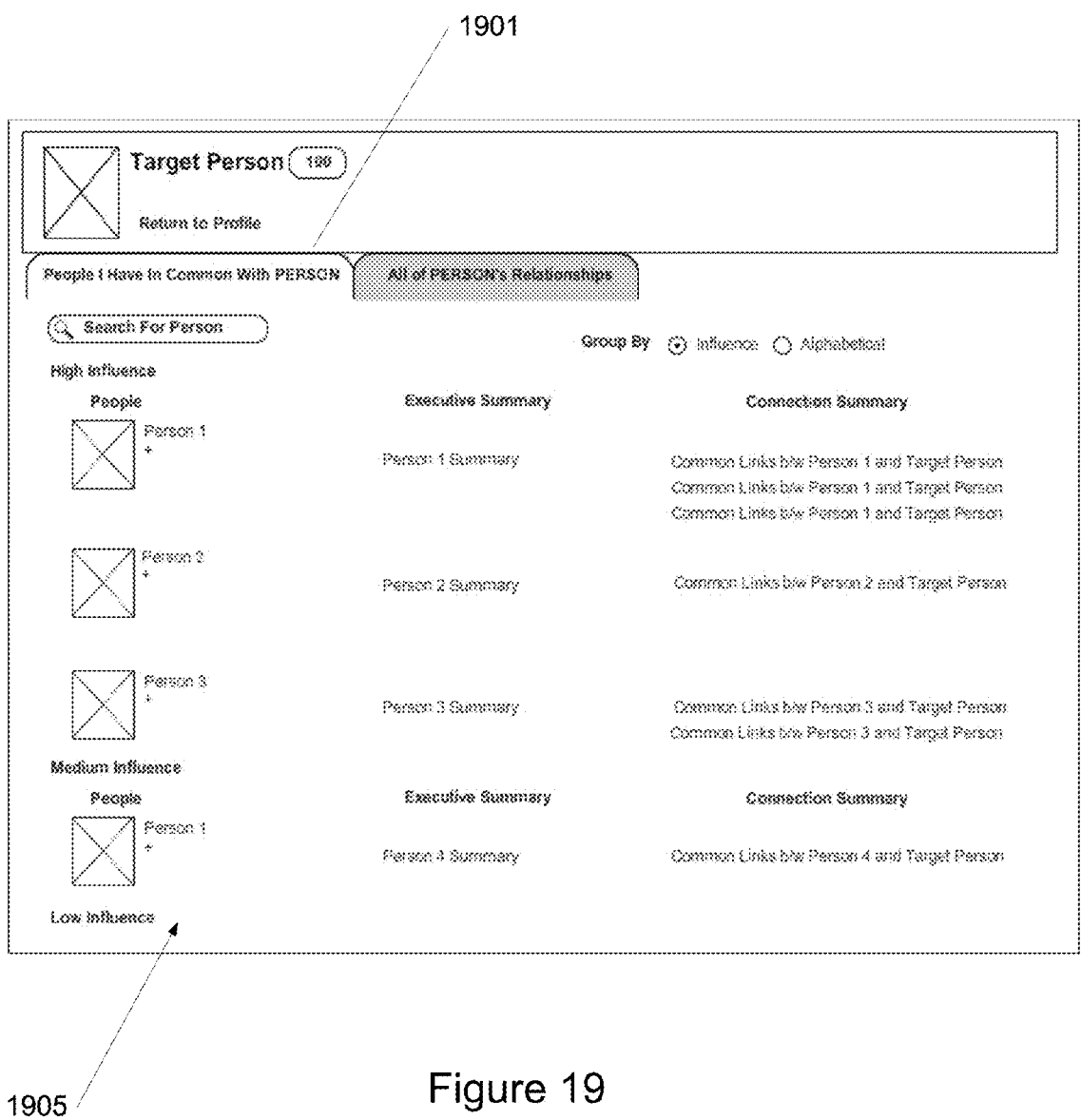
FIG. 19 shows a sample list of all a target person's in common with a user.

In an implementation, the system has person details pages. This page can be navigated to by "See More" links in person profile pages. FIGS. 18-19 shows a sample person details page. In a first tab 1801 "All of PERSON'S Relationships," this page is navigated to by clicking on "See More" from the persons' relationship box in the sidebar of a person profile. This page displays a sortable and searchable list of all the profiled person's relationships. The main body of the page 1805 consists of rows of people that the person has a relationship with. The system generates a page with a profile picture, name, executive summary, and a connection summary (how that person and the profiled person are connected). By default, the list is sorted in order of descending influence over the profile person (determined by the system), and grouped into High, Medium, and Low influence. The user can change the grouping by using radio buttons 1810. The user can also switch to an alphabetical sort by either clicking on the 'Name' header or selecting 'Alphabetical' from a radio button. The user can also click on the 'Name' heading to change the sort from descending to ascending. The page also has a search box that live-filters the list of people based on user input.

The page also includes a tab 1901 that switches to the "People in Common with PERSON" page, which is also accessible from the main profile page, as shown in FIG. 19. This page 1905 is structured similar to the "All Relationships" page, but instead only shows relationships that the user has in common with the profiled person. This page is navigated to by either the tabs at the detailed person profile page, or by clicking on "See More" from the people in common box on the main profile page.

Figure 20:
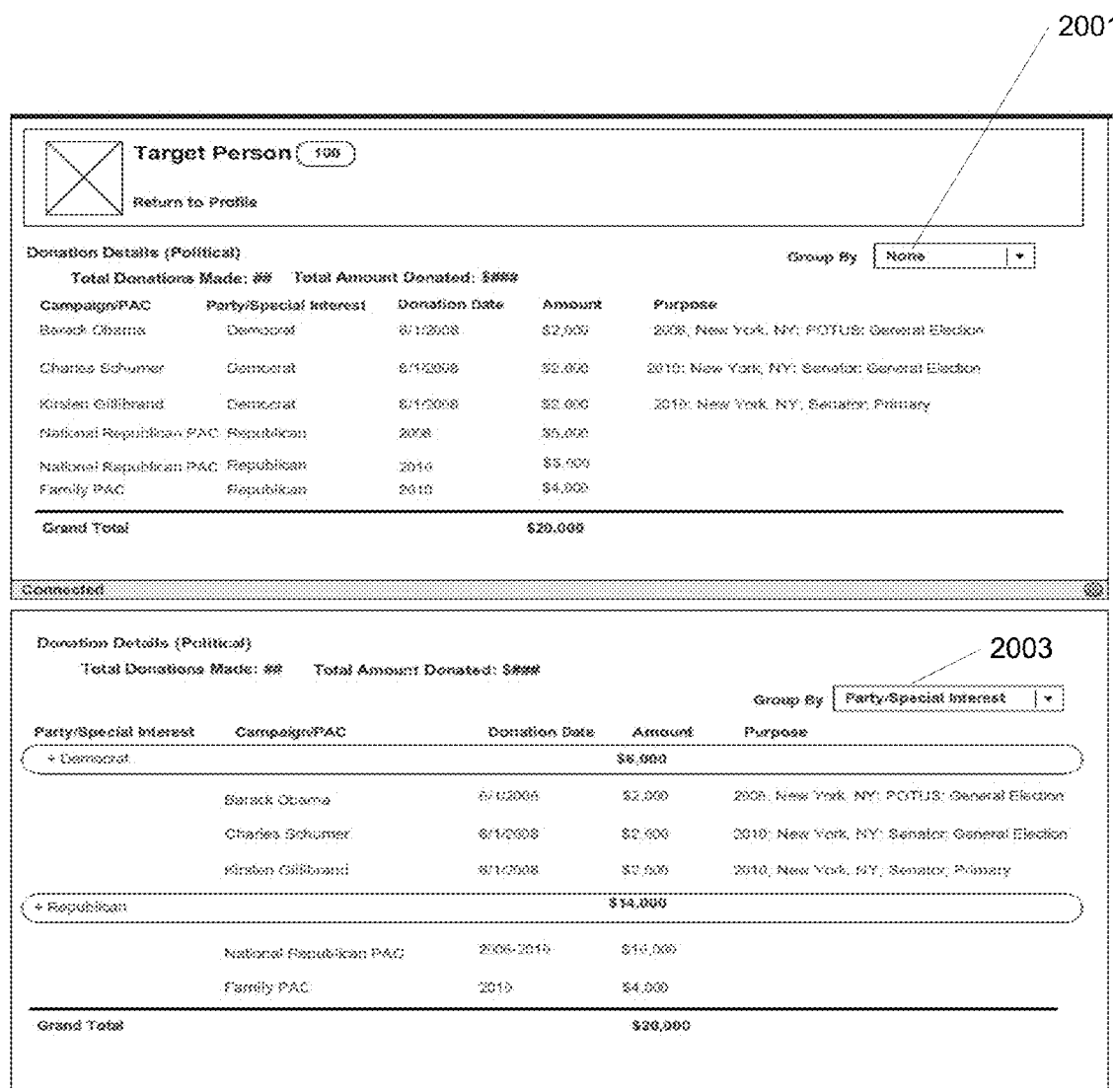
FIG. 20 shows a sample political donation details screen.

In an implementation, the system can generate a political donation details screen on a person. FIG. 20 shows a sample political donation details screen. This page can be accessed by clicking on the "See More" link in the political donations section of a person profile. It shows all the donations and contributions that the profiled person has made to political campaigns, causes, and PACs. The page also displays the total number of contributions made and total dollar amount of contributions at the very top.

Further information can include: party/special interest, campaign/PAC, donation date, amount, and purpose of the donation. A default view is the group by none option 2001 that shows a detailed list of individual donations arranged in reverse chronological order. Each of the column headers can be clicked to sort the information in different order. The user can further group the results by selecting a "group by" option from a dropdown box on the right. The group by options include: party/special interest, campaign/PAC, and purpose. When a group by is selected, the page displays the data grouped by that specific field. For example, a group by party/special interest would group all democratic contributions into one line, and republican contributions into another. The page would display the sum totals of these grouped contributions, as well as a date range. These "group by" fields are also expandable via a small plus icon next to the group by category. Expanding these fields show individual donation details, but still maintains the group by heading above the details.

The donations details page allows the user to manipulate the data into other useful views, such as being able to see which candidates or causes the person has donated to. The system can display to the user tendencies of the person by looking for patterns in donation frequency, political affiliation shifts, and related family donors. Another view is a group by party/special interest option 2003.

Figure 21:
FIG. 21 shows a sample screen of non-donation information.

In an implementation, the system can generate a person page not based on donation information. FIG. 21 shows a sample screen of non-donation information. This can be accessed by clicking on the "See More" link in the non-profit donations section of a person profile. The page shows all the donations and contributions that the profiled person has made to non-profit organizations 2101. The page displays the total number of contributions made and total dollar amount of contributions at the very top. The donation details are divided into two groups: Personal and Family Foundation Donations (donations made personally and through family foundations) 2103 and Donations Made Through Other Affiliated Foundations 2105 (donations made through organizations the person has a large amount of influence over). The donation details displayed include: recipient, cause, amount, date, notes/comments (includes indication when the gift was made with a spouse) and controlled organization (family foundations or influenced organizations).

In a default view of the non-donation information, the system shows a detailed list of individual donations arranged in reverse chronological order. Each of the column headers 2107 and 2109 are clickable to sort by that field. The user can further group the results by selecting a "group by" option from a dropdown box on the right. The group by options include: recipient, cause, and affiliated/controlled organization.

When a group by is selected, the page displays the data grouped by that category. For example, a group by cause would lump all donations to educational organizations in one line, and all donations to health organizations in another. The page would display the sum totals of these grouped contributions, as well as a date range. These group by fields are expandable via a small plus icon next to the group by category. Expanding these fields shows individual donation details, but still maintains the group by heading above the details.

The non-profit donations details page provides much of the same functionality as the political donation details page, allowing the user to view a person's donation patterns and history. A user could look into what causes a particular person is passionate about, what organizations they have influenced to donate, and how their donation amounts and patterns have changed over time.

Figure 22:
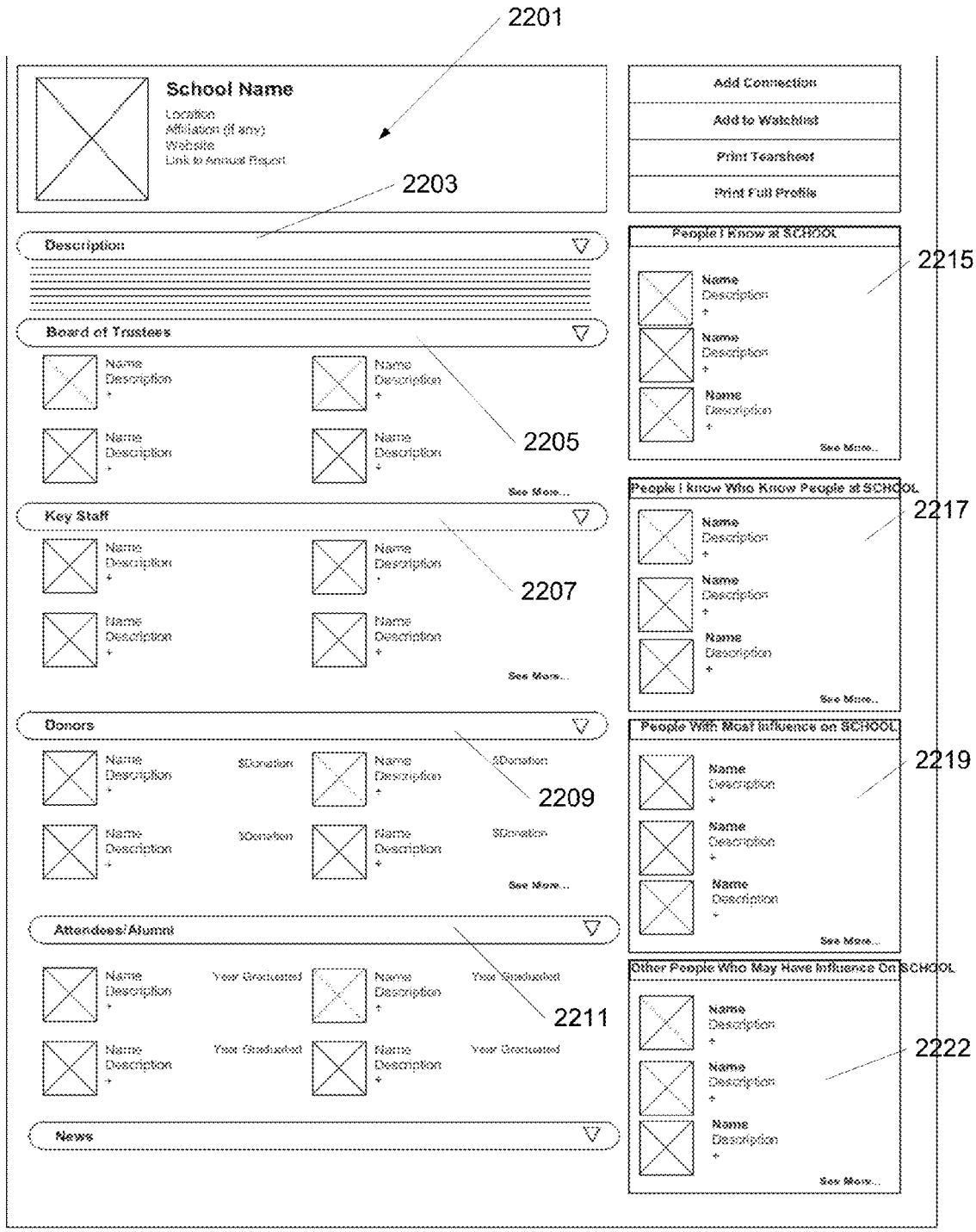
FIG. 22 shows a sample private school profile page.

In an implementation, the system generates a private school profile page. FIGS. 22-24 show private school profile pages in an implementation. FIG. 22 shows a sample private school profile page. The private school page can be structured similarly to other profile pages of the system. The box at the top of the page 2201 includes the following information: School Name, Location, Affiliation (if any), Web site, and Link to annual report. The tabs available on this page can include:

2203: Description: History, founders, description, school affiliations.

2205: Board of Trustees: Displays the top four most influential members of the Board of Trustees of the school. Their names, executive summaries, and profile pictures are displayed. The user can click on the "See More" link to view a detailed page that lists all board members.

2207: Key Staff: This is similar to the Board of Trustees tab, but displays staff.

2209: Donors: This tab is similar to the second and third tabs discussed directly above, but displays the top donors. Additionally, these donors donation amounts are displayed to the right of their name.

2211: Attendees/Alumni: This tab is similar to the donors tab, but shows the top attendees/alumni, and instead of donation amounts, graduation years are displayed next to their names.

In an implementation, a sidebar is included with the private school profile. The sidebar for a private school consists of boxes that contain various types of relationships between people and the school. These can include:

2215: People the User Knows at School: Lists the people that both the user and the school have a relationship with. Clicking on "see more" leads to a detailed page that fully lists all the common people.

2217: People the User Knows Who Know People at School: Lists the second degree connections that the user has with the school. These are people who the user has a relationship with. These people in turn have relationships with key people who are directly associated with the school. This box has a "see more" detailed page as well.

2219: People With Most Influence on School: Lists the people with the most influence on the school. This box has many of the same people listed on the main body of the page. Also has a "see more" details page ranked by influence.

2222: Other People Who May Have Influence on School: Lists people who may have influence on the school by way of connections and relationships, but are not directly connected to the school itself. This box also has a "see more" detailed page.

Figure 23A:
FIG. 23A shows a sample private school profile page of a board of trustees.
Figure 23B:
FIG. 23B shows a sample private school profile page of key staff.

In an implementation, the system generates a details page for a private school. FIGS. 23A and 23B show two screens of samples of a details page for a private school. These are similar to the details pages for person relationships. Each of the column headers is clickable to sort, and the search box enables the user to search for a specific person in this list. The Board of Trustees page 2301 is divided into current and past board members. Each person on this list includes a name, profile picture, executive summary, and their role on the board. The staff page 2305 in an implementation is simpler than the person profile page, and only includes fields for name/picture and executive summary.

Figures 24A, 24B:
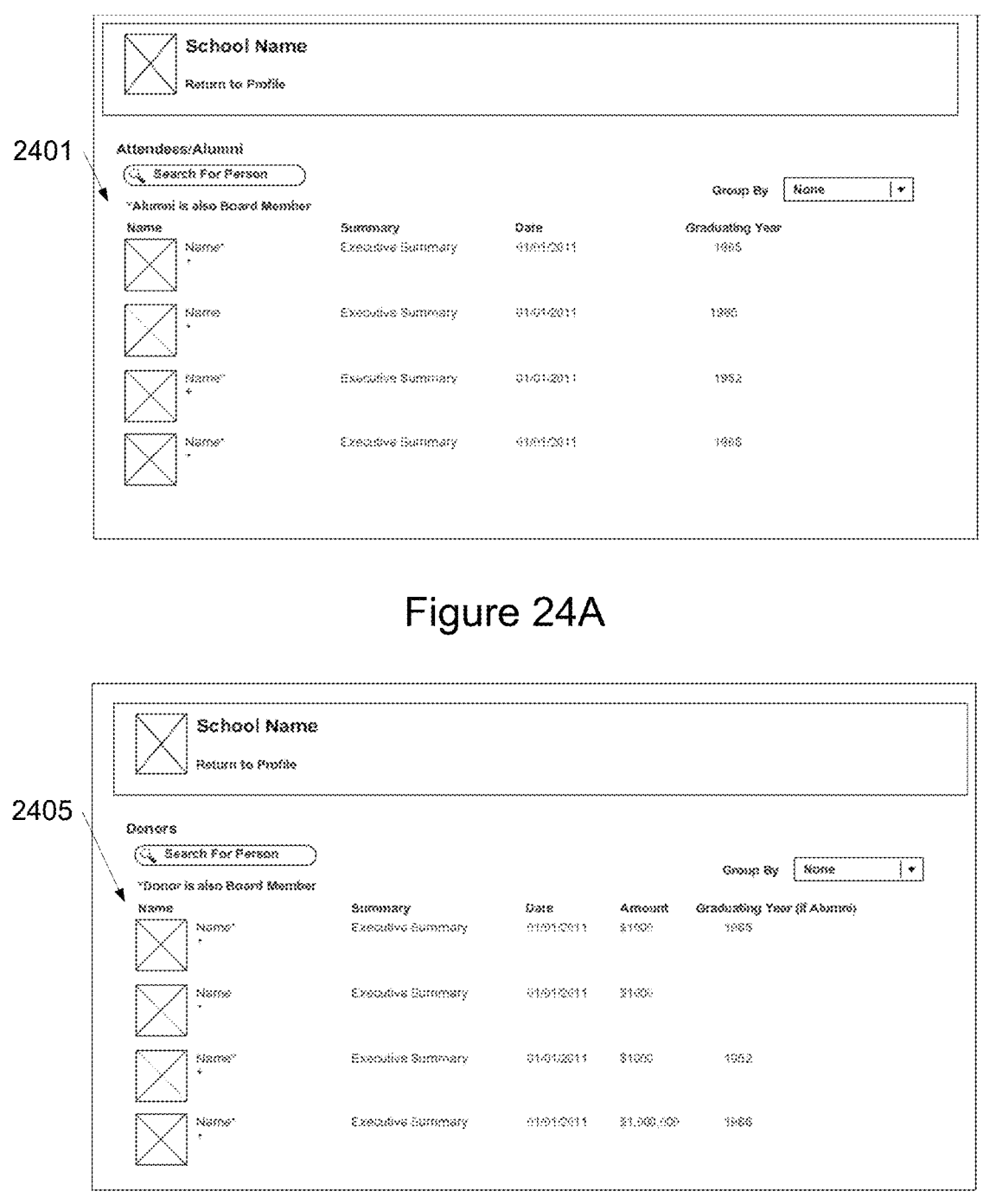

FIGS. 24A and 24B show two screens of details pages for attendees/alumni and donors for a school. The attendees/alumni page 2401 has fields for name/picture, executive summary, date (started board tenure), and graduating year. The names have an asterisks (*) next to them if they are also board members. The donors page 2405 contains fields for name/picture, executive summary, date of donation, and graduating year if the donor is also alumni. The names have asterisks' next to them if the donor is a board member. All the fields are clickable to sort, and the search box allows the user to quickly search the list of people. These details can also able to be grouped by graduating year so as to see which class has donated the most money or has the most alumni.

Figure 25A:
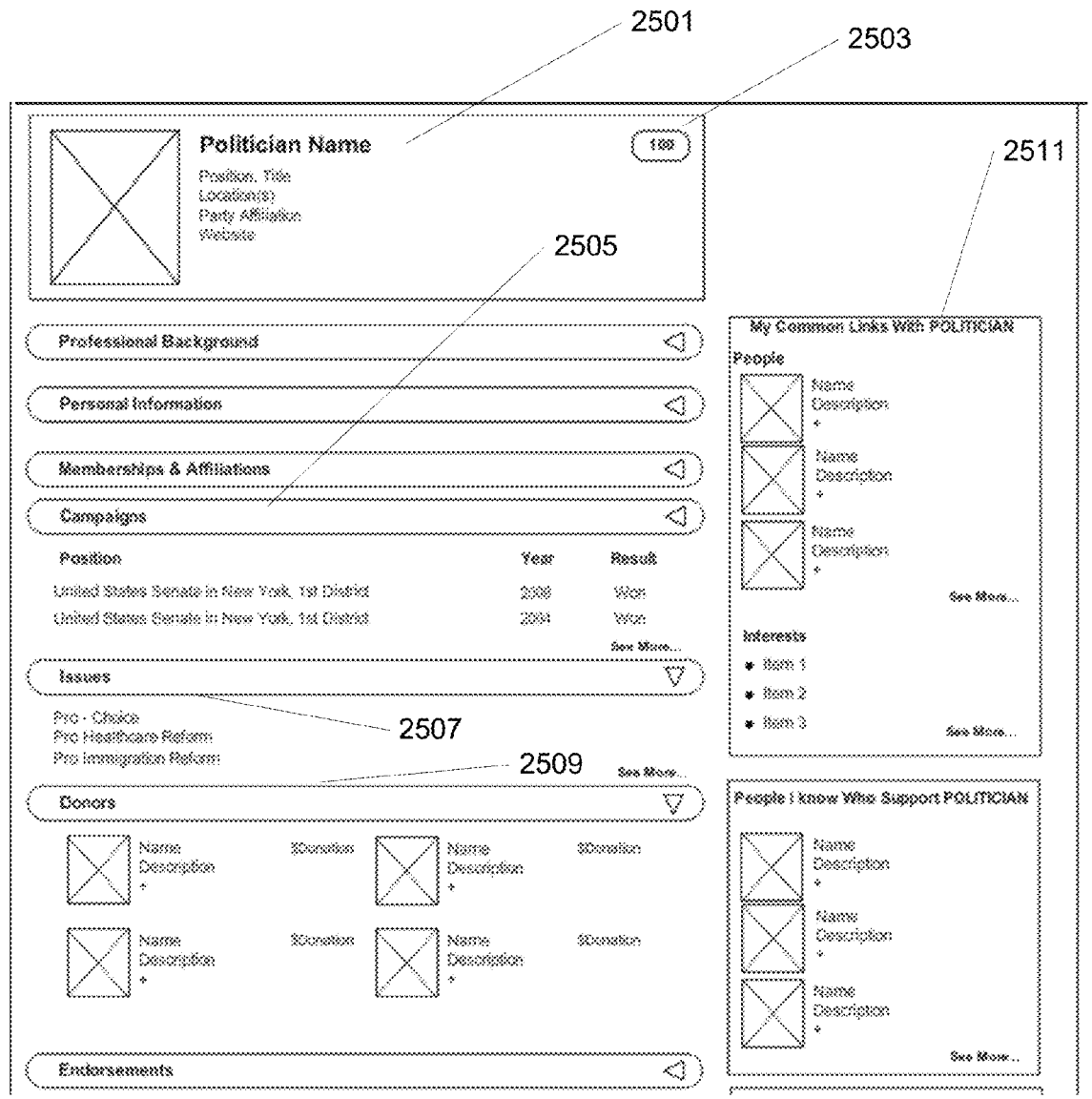
FIGS. 25A-25B show a sample politician profile page.
Figure 25B:
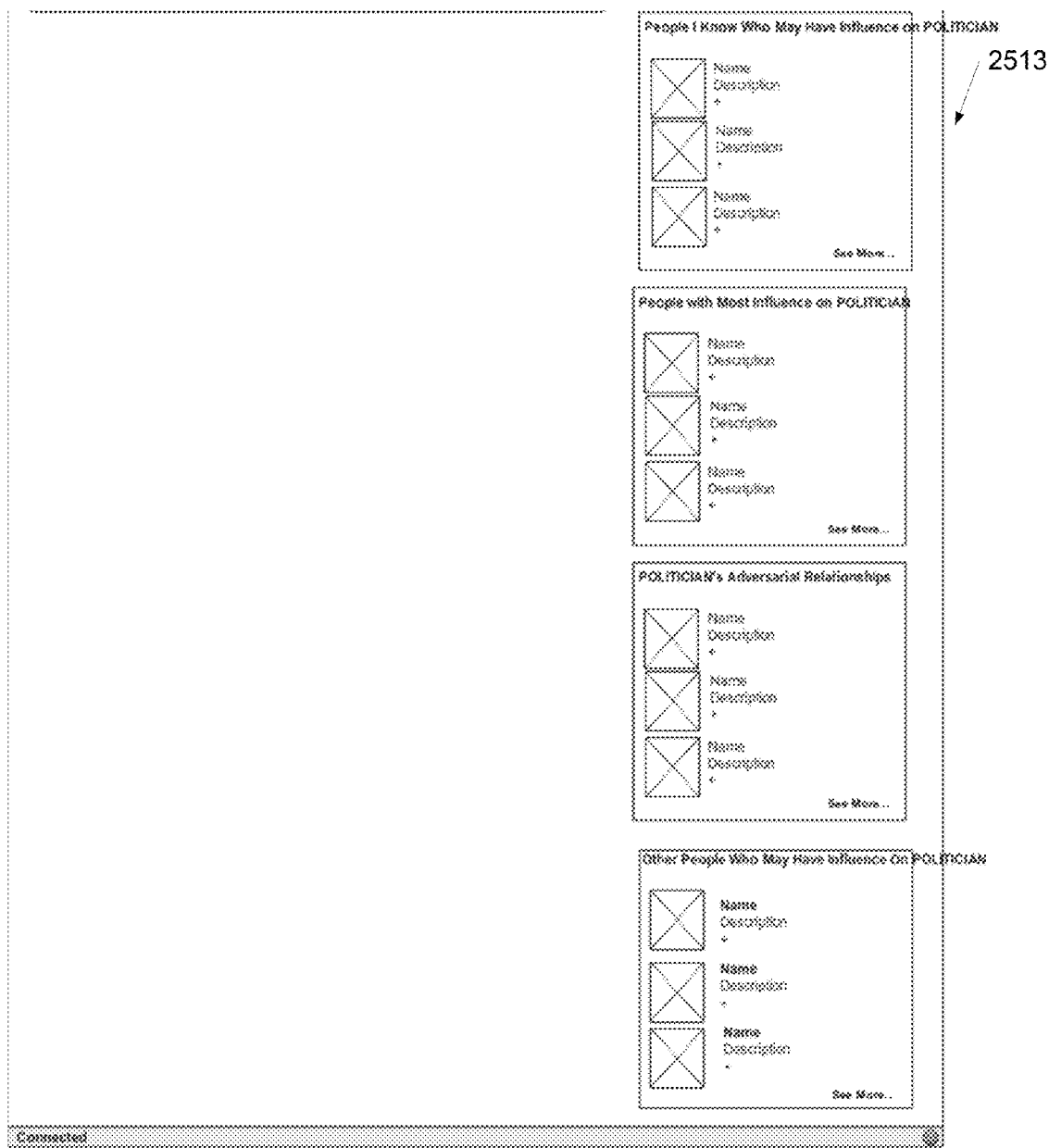
Figure 26:
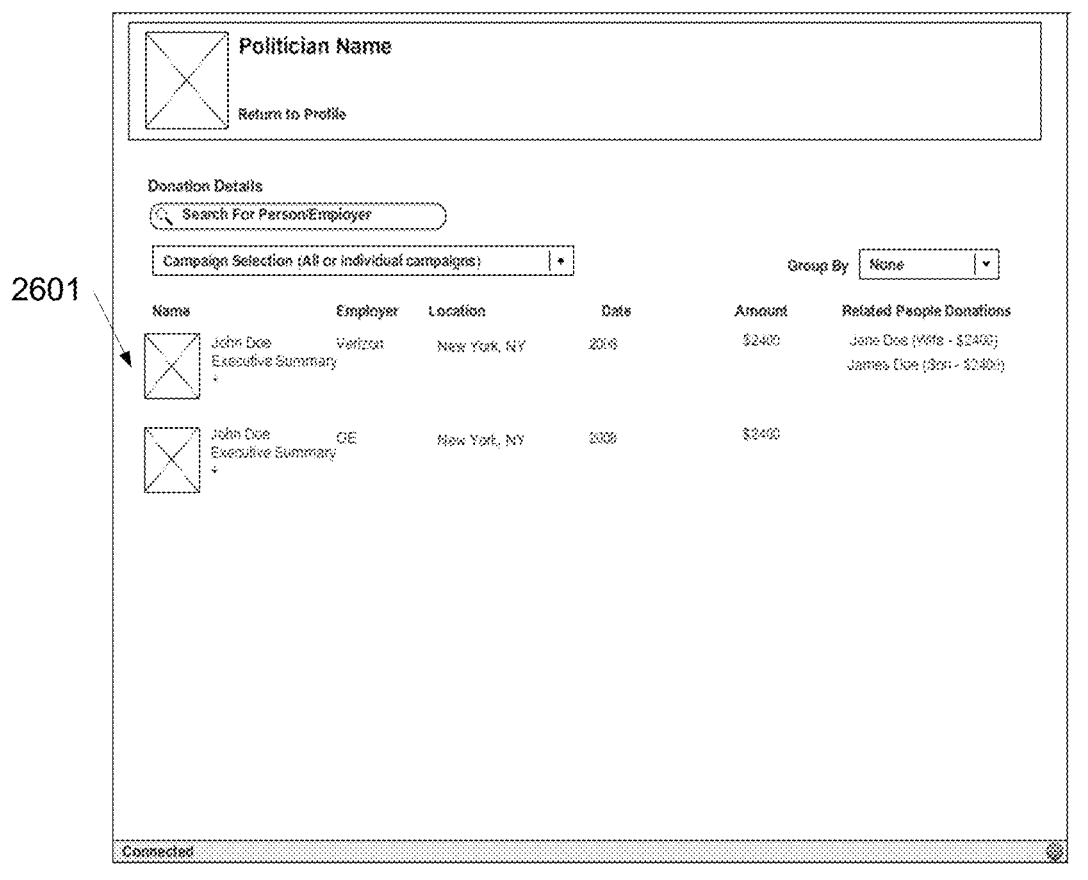

In an implementation, the system generates a politician page. FIGS. 25A-25B and 26 show screens of a sample politician page. The politician profile page can be structured similarly to the person profile page. Information in the header bar 2501 includes: Position, Title; Location; Party Affiliation; and Web site. An associated power ranking for the politician 2503 is included. The politician profile page can contain additional tabs than a person profile page including:

2505: Campaigns: A list of the most recent campaigns that the politician has run, including year and result. Clicking on the "see more" link leads to a page that lists all their campaigns.

2507: Issues: A list of the top most important stances the politician takes on issues. Clicking on "see more" leads to a page that lists all of their issues. In an implementation, clicking on the issues page provides a details page related to the issue.

2509: Donors: Similar to the donor tab of a private school, lists the top donors with their donation amount listed next to the name.

In an implementation, the politician profile includes a sidebar 2511 and continued as 2513. The sidebar for a politician profile page contains boxes that contain people with various types of relationships with the user and politician. All these boxes have a link to a "see more" page that lists all of the relevant people. These can include:

(1) My Common Links With Politician: This box works exactly the same as the one from the person profile page; shows people the user and politician both have a relationship with, as well as shared interests.

(2) People the User Knows Who Support Politician. Lists people the user is directly connected to that have supported the politician by making donations to a political campaign.

(3) People the User Knows Who May Have Influence On Politician. Lists people who the user has a relationship with and may have influence on the politician by way of connections and relationships (whether direct or indirect), but are not directly connected to the politician.

(4) People with The Most Influence on Politician: Lists the people with the most influence on the politician. This box has many of the same donors listed on the main body of the page.

(5) Politician's Adversarial Relationships. lists people who are adversaries, such as those determined by the system, of the politician.

(6) Other People Who May Have Influence on Politician: Lists people who may have influence on the politician by way of connections and relationships, but are not directly connected to the politician.

In an implementation, the system can generate a politician donation details page. FIG. 26 shows a sample politician donation details page. The page 2601 displays all of the donations that individuals have made to a politician's campaigns. It is accessed by clicking on the "see more" link in the donors tab. The information displayed includes: name of donor, employer, location, date, donation amount, and donations to the same candidate from related people (family members). These fields are all clickable to sort the information displayed. The default view of this page lists individual donations in reverse chronological order. The user can elect to view combined donations from all campaigns, or individual campaigns using a dropdown box. The user can also group donations by: donor, employer, and location. These grouped views allow the user to view donors, companies, and regions that have made the most donations. These grouped totals are also expandable like the other group details pages.

The ability to group and sort donation details by all these criteria is very powerful because it draws data from several disparate sources and allows the system to present them in an intuitive and novel way. One example is the ability to group donors by employer, showing which company had the largest number of employees donate to a specific candidate or campaign, or which company collectively donated the most money based on the donation of all of its employees. This can suggest a strong political leaning embedded in the culture of a company. In an implementation, the application can also reveal "highly encouraged support" that is, given inferences on our data on donation trends for a particular company, what organizations or candidate the senior most management encouraged more junior people to support in order to create a stronger allegiance to their company.

Figure 27:
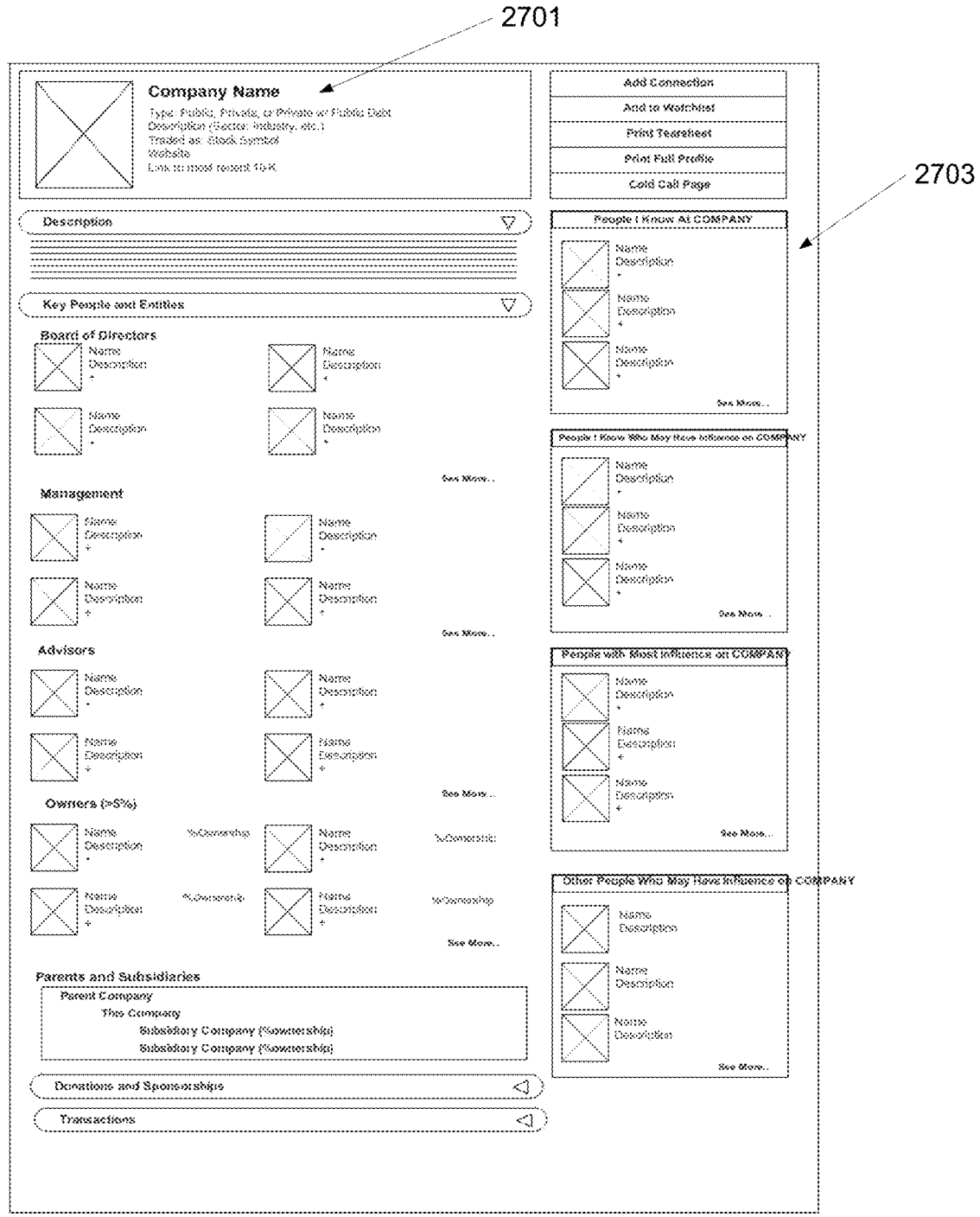
FIG. 27 shows a sample company profile page.

In an implementation, the system can generate a company page. FIGS. 27-33 show screens of a company page in an implementation. FIG. 27 shows a sample company profile page. The company profile page can be structured like other profile pages. Information in the header 2701 includes: Company Name; Company Type (Private/Public/Private with Public Debt); if the company is public, ticker symbol; Web site; Link to the company's most recent 10-K (securities filing).

The tabs of a company profile page can include:

(1) Description: Brief background information about the company, including industry, history, and financial information (revenue, market cap, number of employees).

(2) Key People and Entities: This is divided into sections containing the top relevant results for each category. Each of these sections has a "see more" link leading to a complete and more detailed list.

(3) Board of Directors.

(4) Management.

(5) Advisors: Shows advising firms or individuals who frequently provide services to the company. If a company is shown, their logo is displayed in the thumbnail. If there is information about the specific individuals that advised the company they will be displayed upon a mouse over (or hover).

(6) Owners: The actual ownership percentage of an entity is displayed next to the owners name.

(7) Parents and Subsidiaries: This is structured in tree format to display all the subsidiaries and parent companies of the company. For example, Microsoft Studios (a division of Microsoft Corp.) is the parent of the subsidiary Xbox Live Productions. There can be multiple subsidiaries and for any given parent, and subsidiaries can have their own subsidiaries.

(8) Donations and Sponsorships: Displays the most recent donations made by the company to non-profit and political organizations.

(9) Transactions: Shows the most recent transactions the company has been involved in, clicking "see more" leads to the detailed transactions page (as described in more detail below).

(10) News: Recent news items and updates related to the company.

In an implementation, the system can generate a company sidebar 2703. The sidebar for a company profile page contains boxes that contain people with various types of relationships with the user and company. All these boxes have a link to a see more page that lists all of the relevant people. These can include:

(1) People the User Knows At Company: This box displays people that the user has a relationship with and who are directly associated (e.g., employee, board member) with that company.

(2) People the User Who May Have Influence On Company: Lists people who the user has a relationship with and may have influence on the company by way of connections and relationships, but are not directly connected to the company.

(3) People with The Most Influence on Company: Lists the people with the most influence on the company. This box has many of the same key people listed on the main body of the page.

(4) Other People Who May Have Influence on Company: Lists people who may have influence on the company by way of connections and relationships, but are not directly connected to the company.

Figure 28:
FIG. 28 shows a sample company details page.

In an implementation, the system can generate company details page. FIG. 28 shows a sample company details page. This can include donations and endorsements of the company, as well as political donations made by people who are employed at the company. This page is navigated to by clicking on "see all" under the Donations and Endorsements tab on the main company profile page.

In a first section of the detailed view of non-profit donations a header 2801 includes: recipient, cause, amount, date, and note. This functions very similarly to the non-profit donations detail page for a person, but instead focuses on a company. These details can be grouped by recipient and cause, and these grouped details can be expanded and collapsed.

In a second section, the page provides a detailed view of political donations and is also divided into two parts. The first part of this section is political donations made directly by the company 2803, and includes details about: campaign/PAC, party/special interest/donation date, amount, and purpose (election details). These details can also be grouped by campaign/PAC, party/special interest, and purpose. The second part of the political donations section details political donations made by people who list the company as their employer 2805. This section has the same fields as the first one, with the same group by capabilities.

The system gives the user the ability to manipulate and view data about how much a company spends on political and philanthropic efforts. One could view how many employees at a company donate to a specific cause or candidate, and surmise whether the company is indirectly supporting them through its employees. The user can also view a company's donation habits and history, seeing whether they are consistent with the ideologies of its leaders and employees, and which causes and platforms they are supporting.

Figure 29:
FIG. 29 shows a sample company advisor details page.

In an implementation, the system can generate a advisor details page. FIG. 29 shows a sample advisor details page. The advisors detail page can be navigated to by clicking on "see more" link on the advisors section of the main company profile page. This page 2901 displays a list of advising companies that the company has used, divided into the following groups: banks, law firms, auditors, and public relations (or PR) firms. The column headings on this page are: Name (of advising firm), persons involved with the transaction or company, transaction (name of transaction), date, and value (of transaction). If we have information about the specific people that worked with the company they are displayed under the person column. Likewise, any information about the relevant transactions is displayed. If there is no information about transactions or people, those fields will be blank, but the name of the advising firm appears. The page can also be grouped by person, with people who have advised the company the most times appearing higher up on the list, allowing the user to see which advisors may have the best relationship with the company.

Figure 30:
FIG. 30 shows a sample company board details page.

In an implementation, the system can generate a board details page. FIG. 30 shows a sample board details page. The Board of Directors details page can be navigated to by clicking on the "see more" link in the Board of Directors section of the company profile page. While the tabs on the main page only list the most relevant board members, this page lists all present board members, as well as past ones. The page is divided into two sections: present board members 3001 and past board members 3003. The headings on this page are name, age, current professional affiliation, board role, and board tenure. Each person on this page has all of these details, and all the headers are sortable by clicking on the field name. This can be useful by allowing the user to see which board members have had the longest tenure, and what the age range of the board is.

Figure 31:
FIG. 31 shows a sample company management page.

In an implementation, the system can generate a manager details page for a company. FIG. 31 shows a sample management page. The manager details page is navigated to by clicking on the "see more" link in the managers section of the company profile page. The tab on the main page 3101 only lists the most relevant managers this page lists all relevant managers, both current and past. The headings on this page can include: name, age, title (at company), total compensation with year compensation information comes from, and employment date. All these fields are clickable to sort, allowing the user to see what the compensation range is for managers at the company, as well as how long they have held these positions. The page is divided into two halves: current management and past managers. People who have held management positions before will be listed below the current ones, with available information about compensation and tenure displayed.

Figure 32:
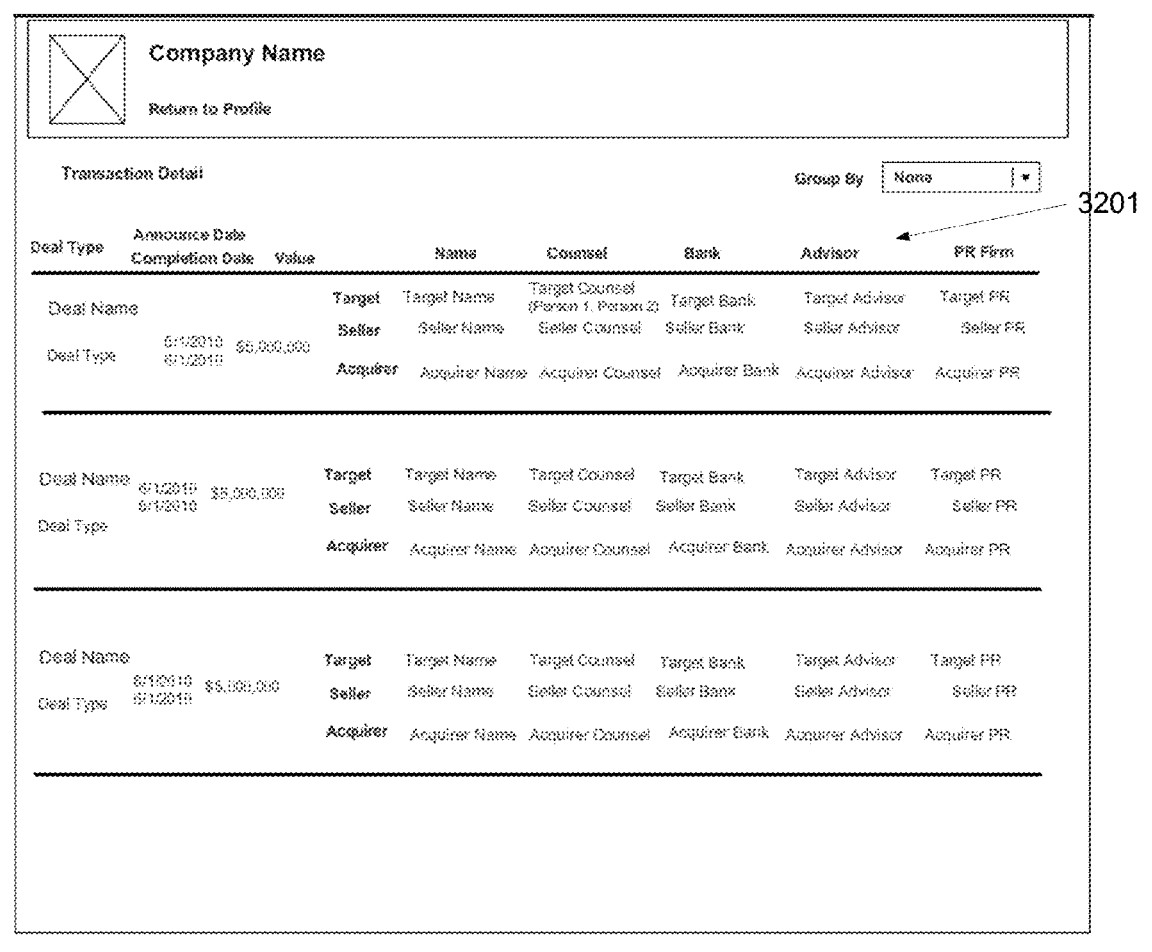

In an implementation, the system can generate a transaction details page. FIG. 32 shows a sample transaction detail page. This page can be navigated to be clicking on the "see more" link from the transactions tab on the main company profile page. This page displays a first company transaction details 3201, and the default view groups the transactions by deal name. The page also displays information about: deal type, announce and completion date and value. If available, the service providers (counsel, bank, advisor, and PR firm) are named for the target, seller, and acquirer. If information is available about specific persons from each of these entities, those names are displayed in parentheses below the entity name.

This page is groupable by deal type, and any of the named entities (name, counsel, bank, advisor, PR firm). When the "group by" is selected, the page arranges the information to have the group by field on the far left, and lists the deals that the selected entity are associated with on the right. The list can also be aggregated by service providers, showing a list on how many times a firm has provided services to the company, or on specific persons, showing a list of individuals who have advised the company the most.

Figure 33:
FIG. 33 shows a sample cold call page to persons in a company.

In an implementation, the system can generate a cold call page. FIG. 33 shows a sample cold call page. The cold call page can be navigated to by clicking on "Cold Call Page" from the sidebar of the main company profile page or by clicking on the "Cold Call" option from the applications menu and selecting the targeted company. This page displays people the user may want to contact at a given company 3301. The system generates this list by first displaying people that the user has a relationship with who can make introductions to individuals that work (or have influence) at said company. This list includes further degrees of separation (e.g., second degree or more) organizational connections (e.g., people who work with another company that does business with the target company). The page then lists people that the user does not know that work at the company, and may be receptive to a cold call from the user due to common relationships, organizations, and interests 3303. The people with the most connections are listed first in descending order. This part of the page has headings for person name/description, people in common, organizations in common, and interests in common.

Figure 34:
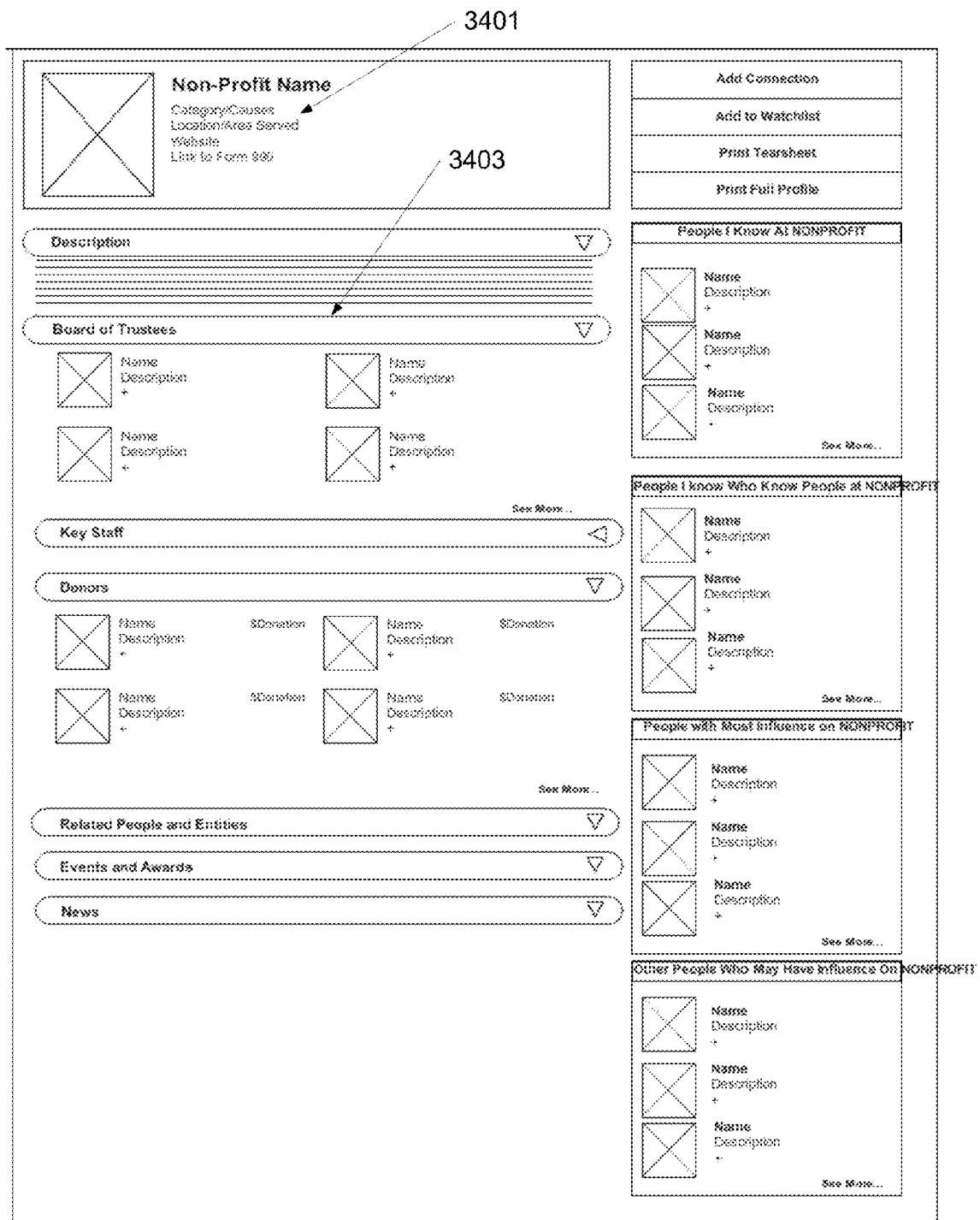
FIG. 34 shows a sample non-profit profile page.
Figure 35:
FIG. 35 shows a sample non-profit detail page.

In an implementation, the system can generate a non-profit page. FIGS. 34-35 show screens of a non-profit page in an implementation. FIG. 34 shows a sample non-profit profile page. The non-profit profile page can be structured like the other profile pages. The header 3401 includes: Non-Profit Name; Category/Causes; Location/Area Served; Website; and Link to Form 990 (filed with the IRS for Return of Organization Exempt From Income Tax).

In an implementation, the tabs 3403 of a non-profit profile page are:

(1) Description: History, details, financial information (total assets, receipts, expenditures).

(2) Board of Trustees: Display the top most influential members of the Board of Trustees of the school. their names, executive summaries, and profile pictures are displayed. The user can click on the "See More" link to view a detailed page that lists all board members.

(3) Key Staff: Similar to the Board of Trustees tab, but displays most influential staff.

(4) Donors: Similar to the two tabs discussed directly above, but displays most influential donors. Additionally the donation amount is displayed next to the donor name.

(5) Related People and Entities: Lists other entities and people related to the organization (subsidiaries, partners, affiliates, etc.).

(6) Events and Awards: Lists events and awards that the non-profit receives or bestows.

(7) News: Recent news articles and updates about the non-profit.

In an implementation, the system can generate a non-profit details page. FIG. 35 shows a sample non-profit detail page. The non-profit donation details page lists all the donations that people and organizations have made to the non-profit. It can be accessed by clicking on the "see more" link through the donor's tab on the main profile page. The fields displayed on this page 3501 are: name, donation date, amount, notes (with spouse, through organization, for specific campaign, etc.), and related people donations. The "Related People Donations" section 3503 searches the database for people related to the donor who have also made donations to the same non-profit, and lists them here. All these headers are clickable to sort.

The non-profit details page is split into two sections, people and organizations (not shown in the figure). The top part of the page lists people who have made donations while the bottom portion shows organizational donations, and omits the "Related People Donations" field. There is also a search box that allows the user to quickly search and filter search results. This page can also be grouped by donors, showing which organizations or people have made the biggest cumulative donations, or which families have cumulatively made the largest donations.

As seen in FIG. 7, at the header of a page the system generate, there is a search box. This box allows the user to do basic text search for a person or organization. A string typed into this box will be processed by the system and then pressing enter takes the user to the search results page with the most relevant results listed first. This box will also have predictive search, showing possible matches that are clickable below the search box before the user hits enter. In an implementation, the search results will also show an executive summary so that a user can disambiguate the results.

Figure 36:
FIG. 36 shows a sample advanced people search of the system.

In yet another implementation, the system allows advanced searches to be performed on the system. FIG. 36 shows a sample advanced people search of the system. The advanced people (multi-criteria) search page allows the user to select several criteria and perform a person search based on them. It can be navigated to by clicking on "advanced search" link from any page. The advanced search page lays out all the sections of a person profile that the user will be able to search by.

To execute an advanced search, the user clicks on the link under the header of a particular attribute (or section) to search on. All of the fields for that section expand and show the user the fields they can search by. Criteria that have already been added display a check mark next to them. Selected criteria also appear in a box to the right. Examples of what sections are available are given later in this document.

Next to each of the selected parameters is a clickable number that indicates the number or search results for that specific criterion. The search filters the results in descending order (results for criteria #2 is a subset of criteria #1). Clicking on the results number next to each criterion takes the user to the search results page for that level of search. Clicking the "Search" button takes the user to the search results for all criteria. The box also allows the user to limit results to people within one, two, three, or other number of degrees of separation from them.

Some examples of sections (e.g., personal background, memberships and affiliations, professional background) and criteria under each section the user can search under are given in the table below.

TABLE

| Personal Background | Memberships and Affiliations | Professional Background |
| --- | --- | --- |
| Personal Information | Non-Profit Affiliations | Career |
| Name | Type of Non-Profit | Organization Name |
| People Type | Name of Non-Profit | Position |
| Executive Summary | Location | Industry |
| Age | Donations (Amount, Date) | Location |
| Marital Status | | Career Highlights |
| Childhood & Additional Background | | |
| Biography | | |
| Interests | | |
| Education | Political Affiliations | Creative Works |
| Schools Attended | Party Affiliation | Type |
| Degree | Candidate/PAC Name | Name |
| Major | Location | Role |
| Graduation Year | Donations Amount (Amount, Date) | Date |
| Location | Clubs/Associations | Award |
| Primary Residence | Type | Type |
| Vacation Residence | Name | Name |
| Office | Location | Relationship |
| | | Date |
| Financial Resources | Conference | Investments |
| Net Worth | Type/Topic | Type |
| Luxury Ownerships | Name | Industry |
| | Location | Organization Name |
| | Date | Amount |
| | Role | (Amount, Date) |
| News and Headlines | | |
| Quotes/Quotes About | | |

When a criterion is selected, the system presents a popup box on the page that allows the user to select the search parameters. For example, in FIG. 36, the user has selected to search under the attribute personal background for people type criteria 3601. An indication is shown to the user of the criteria the user is currently searching under (e.g., a check box, highlighting, or other). When the user selects "People Type" a pop-up box 3603 appears that lists all the people types and lets the user select the ones they want to search for. The pop-up box will list the elements of the criterion the user can search under. For people type, some elements are whether the person is an academic, an artist, a business person, or other. in the example, the user has selected the elements athlete and journalist. This will limit results in the advanced search to entities (in this case persons) that meet either of the criteria. In another implementation, elements that the user chooses will limit results in the advanced search to entities that meet all the elements of the criterion. In an implementation, the user is restricted to selecting only one element for a criterion. For example, the user can only search for person type artist and an indication preventing the user from selecting a second element will appear.

Furthermore, the system will show to the user criteria that they are searching under. In this example, this information is shown in a box 3605 near the search criteria options. Next to each user criteria, there is a number. This number reflects the amount of entities in the system that meet the given criteria. For example, for the Person Type is Athlete or Journalist, there are 1,500 results. The user can further use radio buttons 3607 to further limit the results. When the user selects the two degree radio button, the results are limited to those that are two or fewer degrees of freedom from the user.

Figure 37A:
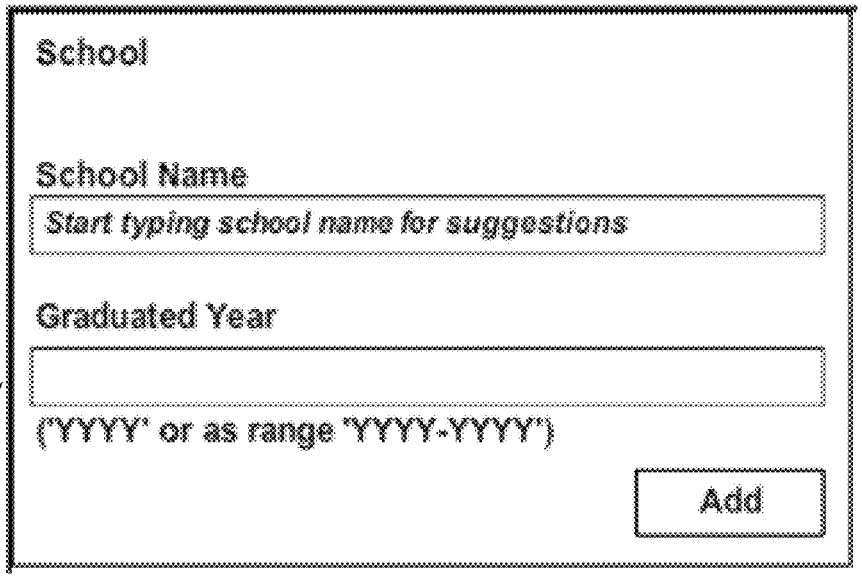
Figure 37B:
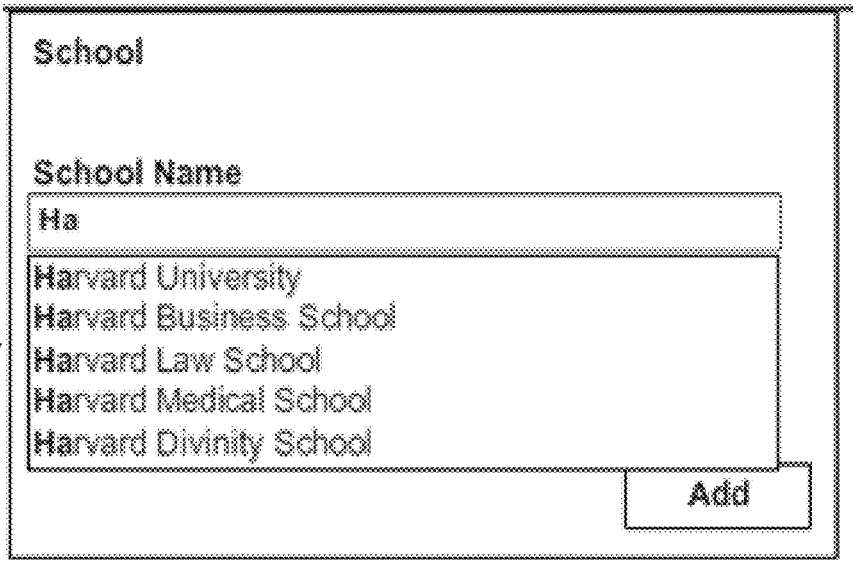

FIGS. 37A-38E show ten sample criteria selected and the search parameters available for the criteria. FIGS. 37A and 37B shows a pop-up 3701 for searching by a school. This search can be further limited by the graduation year of a person. When the user enters the name of the school, the system can assist the user by offering automatic complete suggestions 3703. These automatic complete suggestions can be generated from the listing of the names of entities of school in the system. Auto complete suggestions of the system can appear when the user starts typing. The system receives what the user has partially typed, and offers suggestions based on what they have already typed to what they may mean. For example, for a geographical location, typing the letters "ne" will show an auto complete suggestion for "New York."

FIGS. 37C and 37D show a pop-up 3705 for searching by a geographic location by a primary residence. This includes fields for country, state/region, and city. The user is not required to enter information in all the fields. When the user is entering information into the fields, the system generates auto complete suggestions. For example 3707 are auto complete suggestions in the city field.

Figures 37E, 38A:
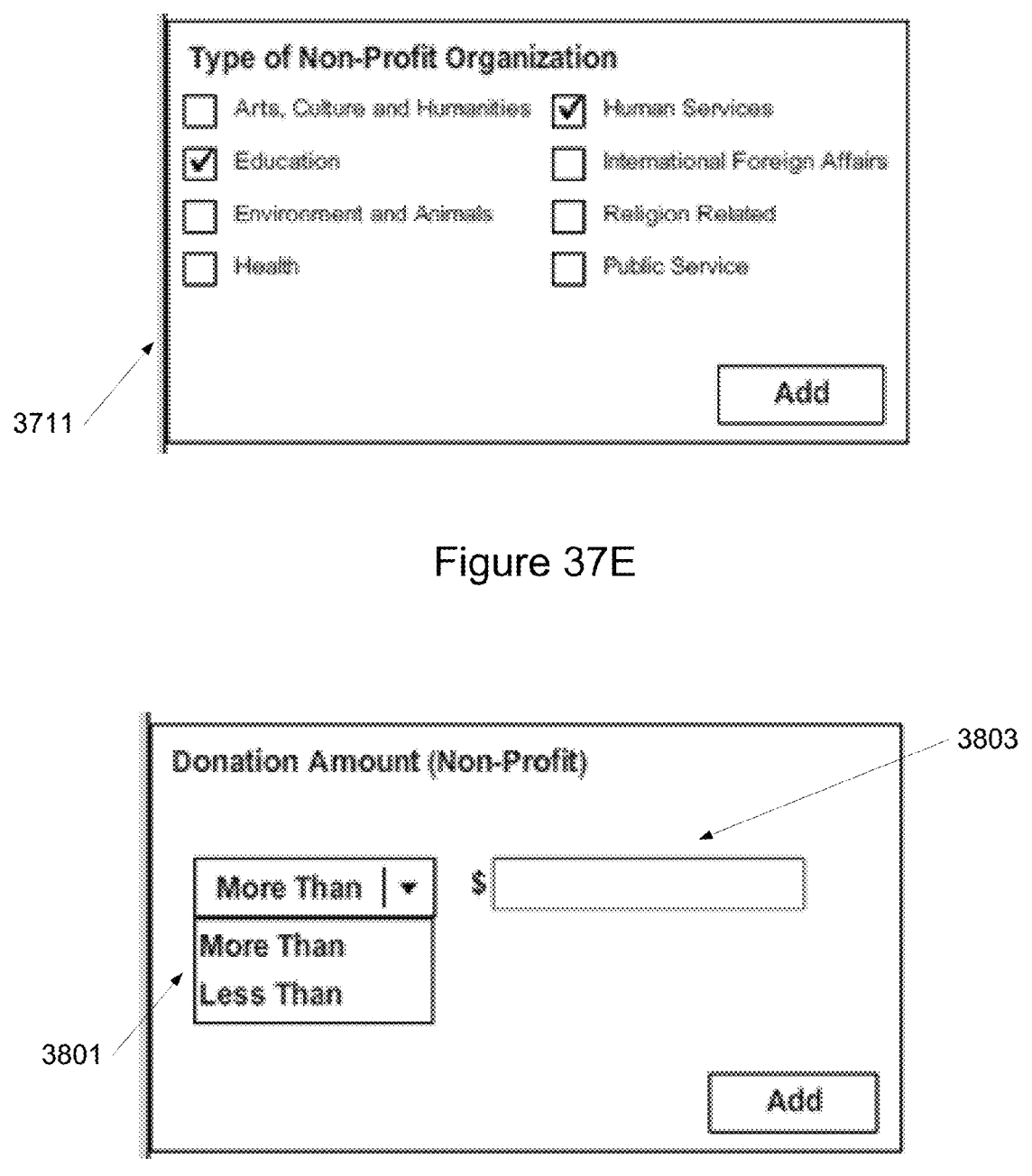

FIG. 37E shows a pop-up 3711 for searching by a type of non-profit organization. Some examples of non-profits are education, human services, public service, and others.

FIG. 38A shows a pop-up for searching by donation amount. The system allows the user to search on the criteria "Donation Amount (Political)." This allows the user to enter in an amount of money donated 3803 and filter their search results for only those persons that have donated that amount of money. The user can choose 3801 whether to search for people who have donated more than the specified amount or less than the specified amount. In an implementation, the system can generate a search results page.

Figure 38B:
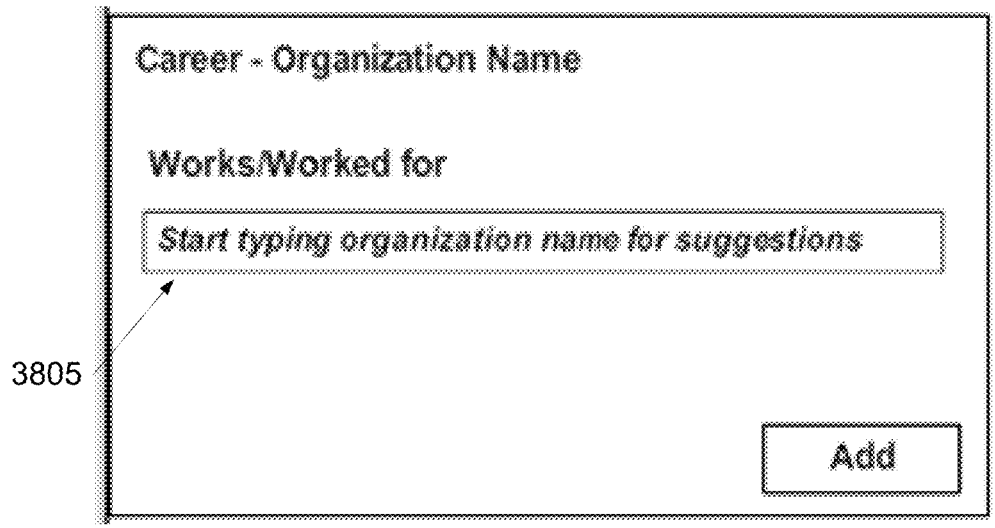
Figure 38C:
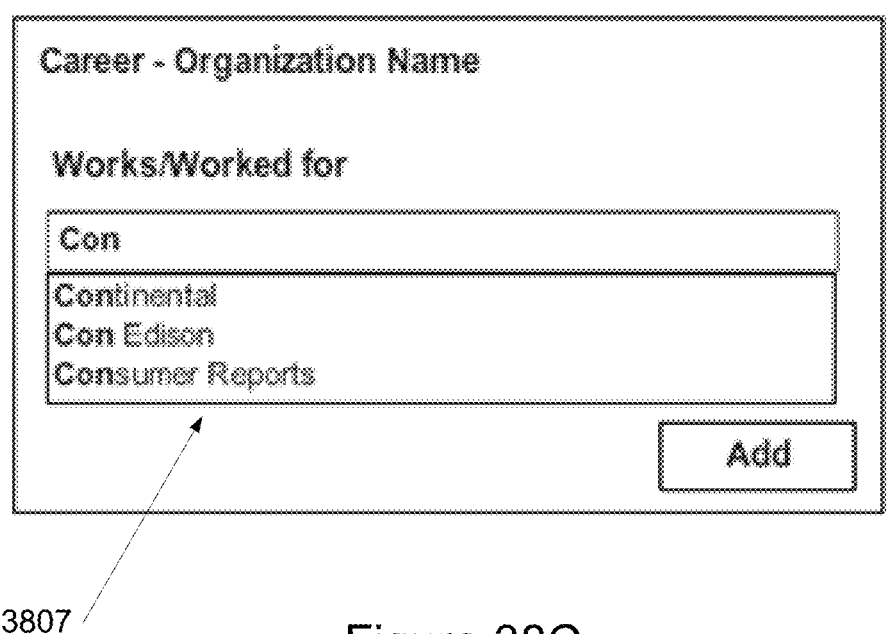

FIG. 38B shows a pop-up 3805 for searching by a person's previous employment. FIG. 38C shows a auto complete suggestion 3807 by a person's previous employment.

Figure 38D:
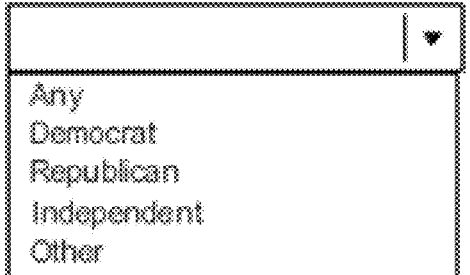
Figure 38E:
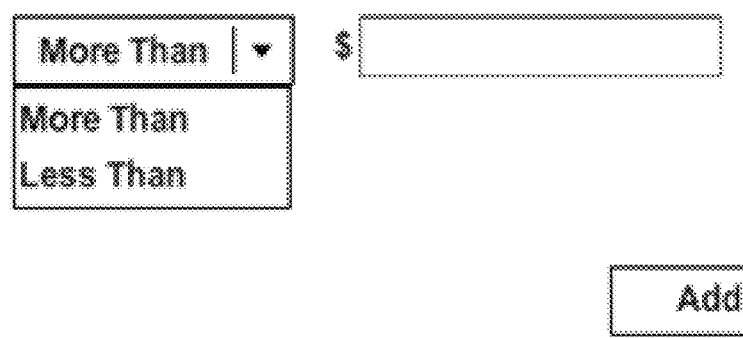

FIG. 38D shows a pop-up for searching by a person's party affiliation with auto complete 3809. In an implementation, when there are less than X items in a criterion, the items of the criterion are displayed as an auto complete listing. For example, since there are fewer possible party affiliations than for some of the criteria of the system, auto complete suggestions for party affiliations can be shown right away, without waiting for the user to begin typing. FIG. 38E shows a pop-up 3811 for searching by a person's donation amount.

Figure 39:
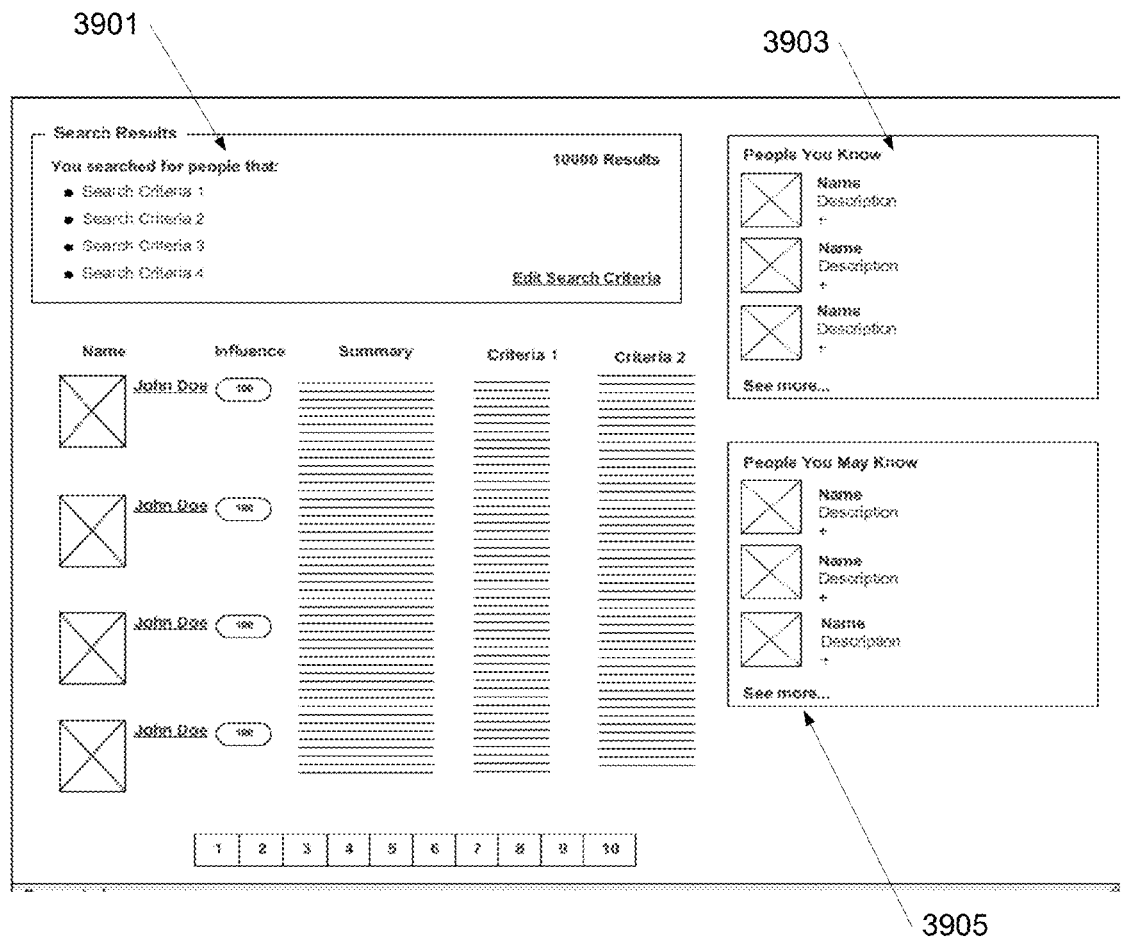
FIG. 39 shows a sample search results page.

FIG. 39 shows a sample search results page. This page displays search results from either a basic or advanced search. The top of the page has a box 3901 that contains all the parameters the user has searched by and number of results. In the case of a simple search, this will be a text string, but for an advanced search this could include several criteria.

Results in the search results page are ordered by relevance, and the information displayed is: name, influence score, executive summary, and then a listing of the relevant criteria. Criteria that is variable for the search results appears in its own column, but criteria that would be the same for all does not appear. For example, a search for athletes or business people would have a header for people type, listing whether each result was an athlete or business person. A search for people associated with the Democratic Party would not have this header as all results would fulfill this criteria. These criteria headings are clickable to change the sort order.

The search results page can also include boxes for "People You Know" 3903 that contains people the user already has a relationship with that fulfill the search criteria, and for "People You May Know" 3905 that contains people the user has a high probability of having a relationship with due to other connections or relationships.

In an implementation, searches made by a user can be saved, which saves the criteria and allows the user to quickly run the search again. These saved searches also become "Custom Lists" which news and updates about people from this search are displayed on the My Connectivity Home Page.

Figure 40:
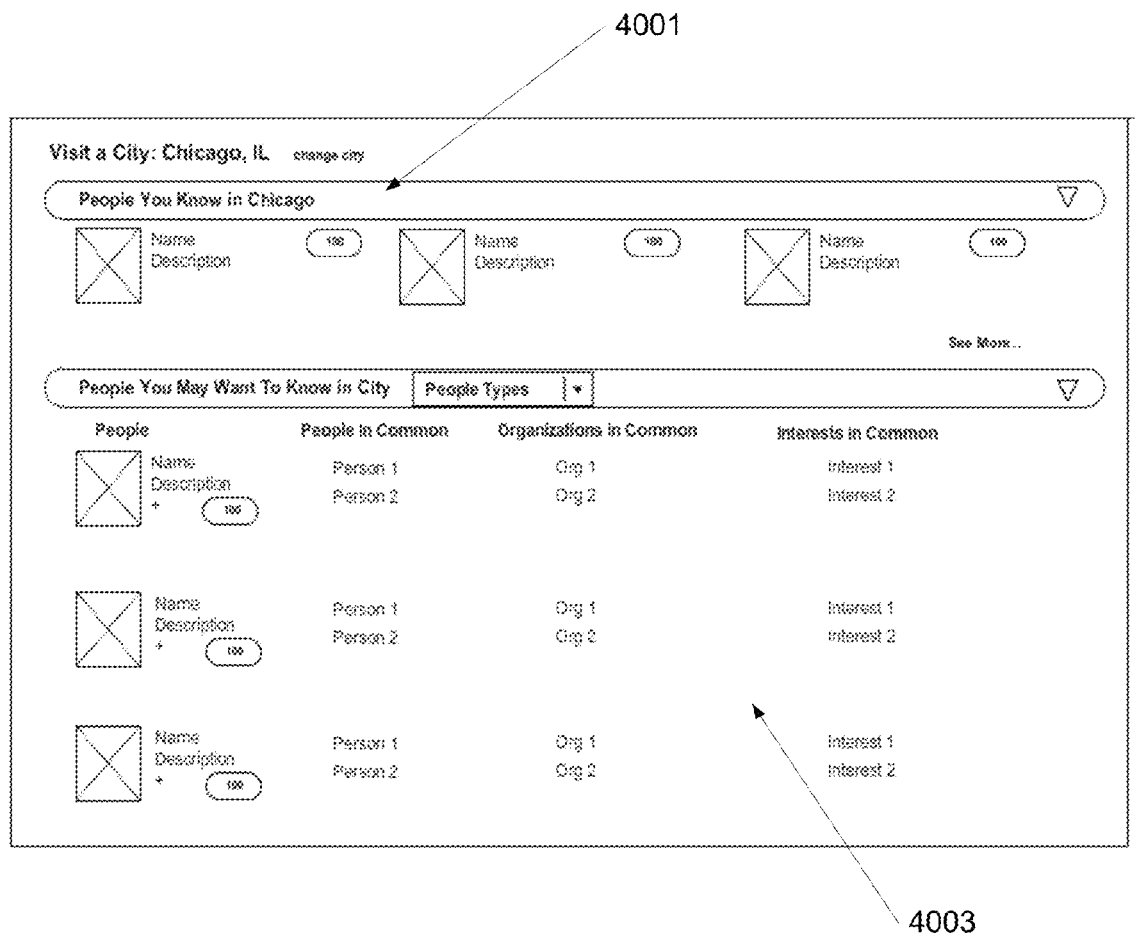
FIG. 40 shows a sample application when visiting a city.

In an implementation, the system has applications. FIG. 40 shows a sample application when visiting a city. The visit a city page is navigated to by clicking on the link through the applications section of the main page header. The system can present to the user, based on a city they might be visiting, people that they might want to contact while there. After entering a city, the page displays a list 4001 of people that the user knows who are located in that city. The page also displays a list of people the user may want to contact 4003 based on common relationships, organizations, or interest. This part also lets the user select specific people types that they want to meet.

In an implementation, the system can be used to show a user people they may know to contact in order to help for a cold call to an organization (e.g., company, charity, non-profit). This page displays people the user may want to contact at a given company. The system generates this list by first displaying people that the user has a relationship with who can make introductions to individuals that work (or have influence) at said company. This list includes further degrees of separation (e.g., second degree or more) organizational connections (e.g., people who work with another company that does business with the target company). The page then lists people that the user does not know that work at the company, and may be receptive to a cold call from the user due to common relationships, organizations, and interests. The people with the most connections are listed first in descending order. This part of the page has headings for person name/description, people in common, organizations in common, and interests in common.

Figure 41:
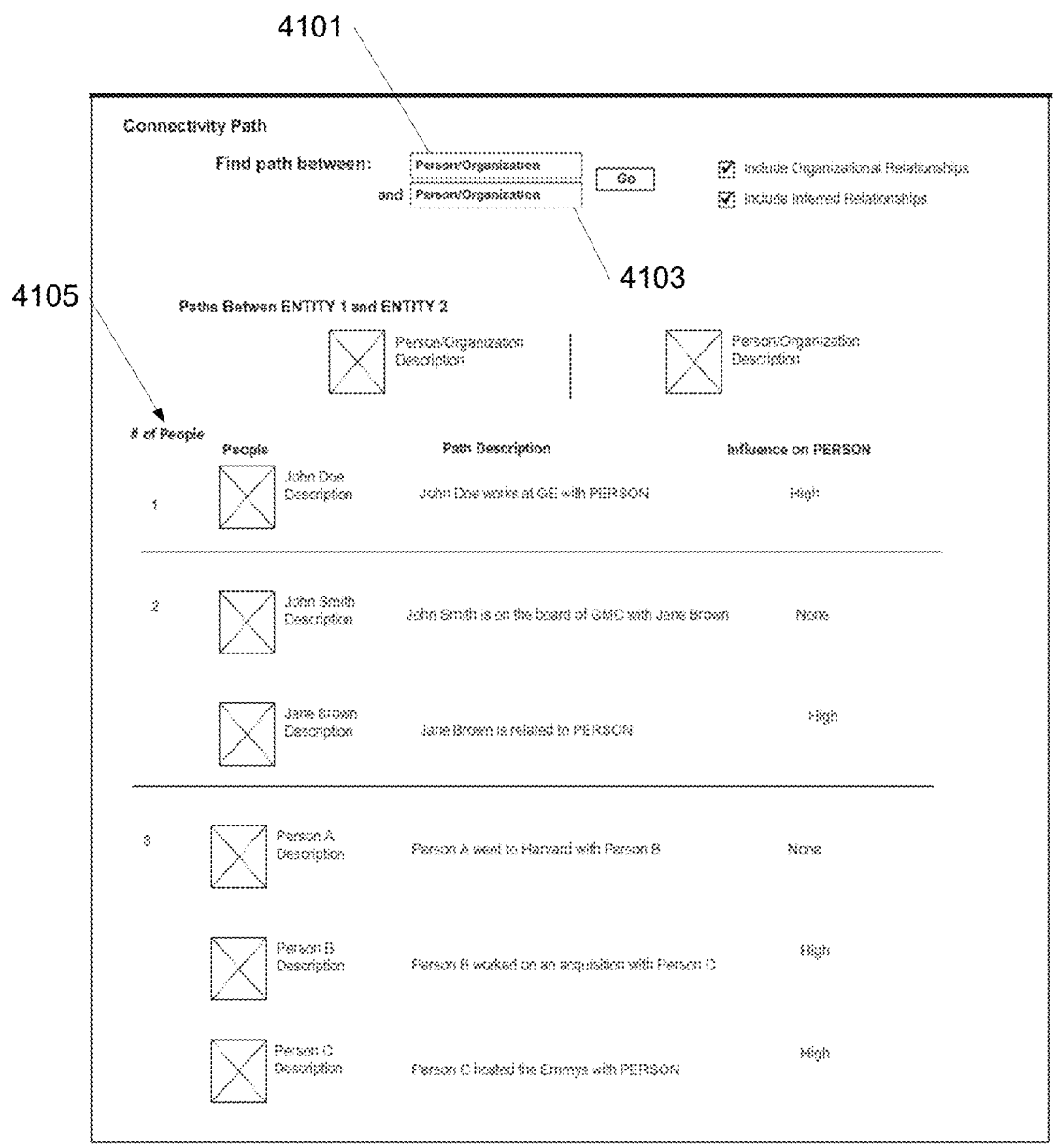
FIG. 41 shows a sample application for a user to find a path between two entities of the system.

FIG. 41 shows a sample application for a user to find a path between two entities of the system. The find a path page can be navigated to by clicking the link through the applications section of the main page header. The system finds paths of connectivity between any two entities (e.g., persons, organizations, or others) that the user selects (which can include the user themselves). The user enters the two entities into the boxes 4101 and 4103 at the top of the page, and then selects "Go." The system can even find paths including organizational relationships and inferred relationships in the paths. The system then displays the paths of connectivity listed in order of increasing number of entities (or degrees of separation) between the two things 4105 that are being connected. The system displays details about: number of people/entities in the path, a path description, and the amount of influence that person or organization has on the next one in the path as well as that specific connection.

Figure 42:
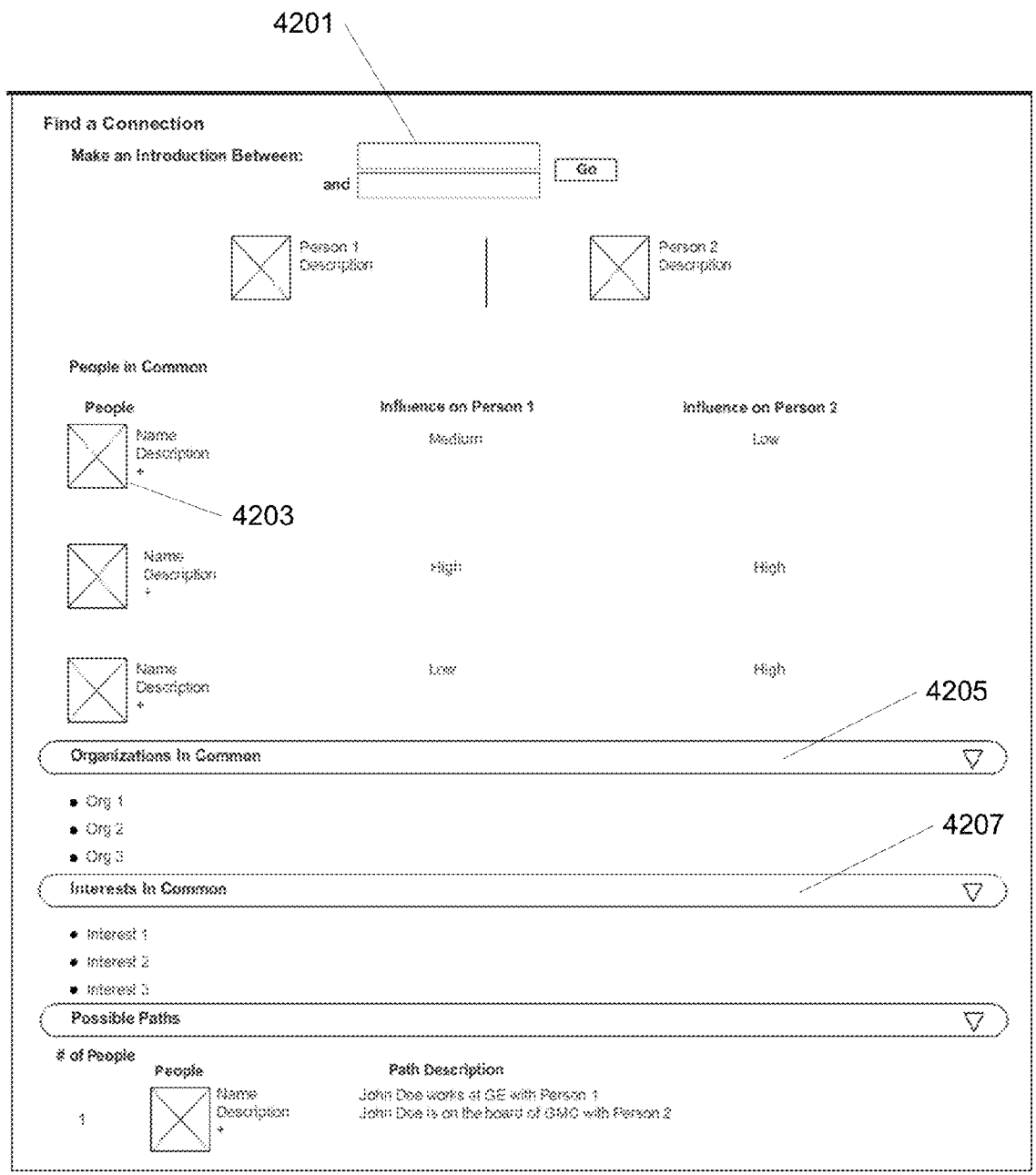
FIG. 42 shows a sample application for a user to introduce one person to another.

FIG. 42 shows a sample application for a user to introduce one person to another. The introduce people page can be navigated to by selecting the link on the applications section of the page header. This page is similar to the find a path page, but available entities in this list are limited to person entities. The user enters the names of two people in the boxes 4201 at the top of the page (can be the user), and after the user clicks "Go" the system displays information about the common links between the two people. The system firsts lists 4203 people they have in common, including name, description, and the amount of influence that person has on each of the selected people. The page then lists organizations and interests 4205 and 4207 they have in common. Another list 4207 shows possible paths between the two, much like the find a path page.

Figure 43:
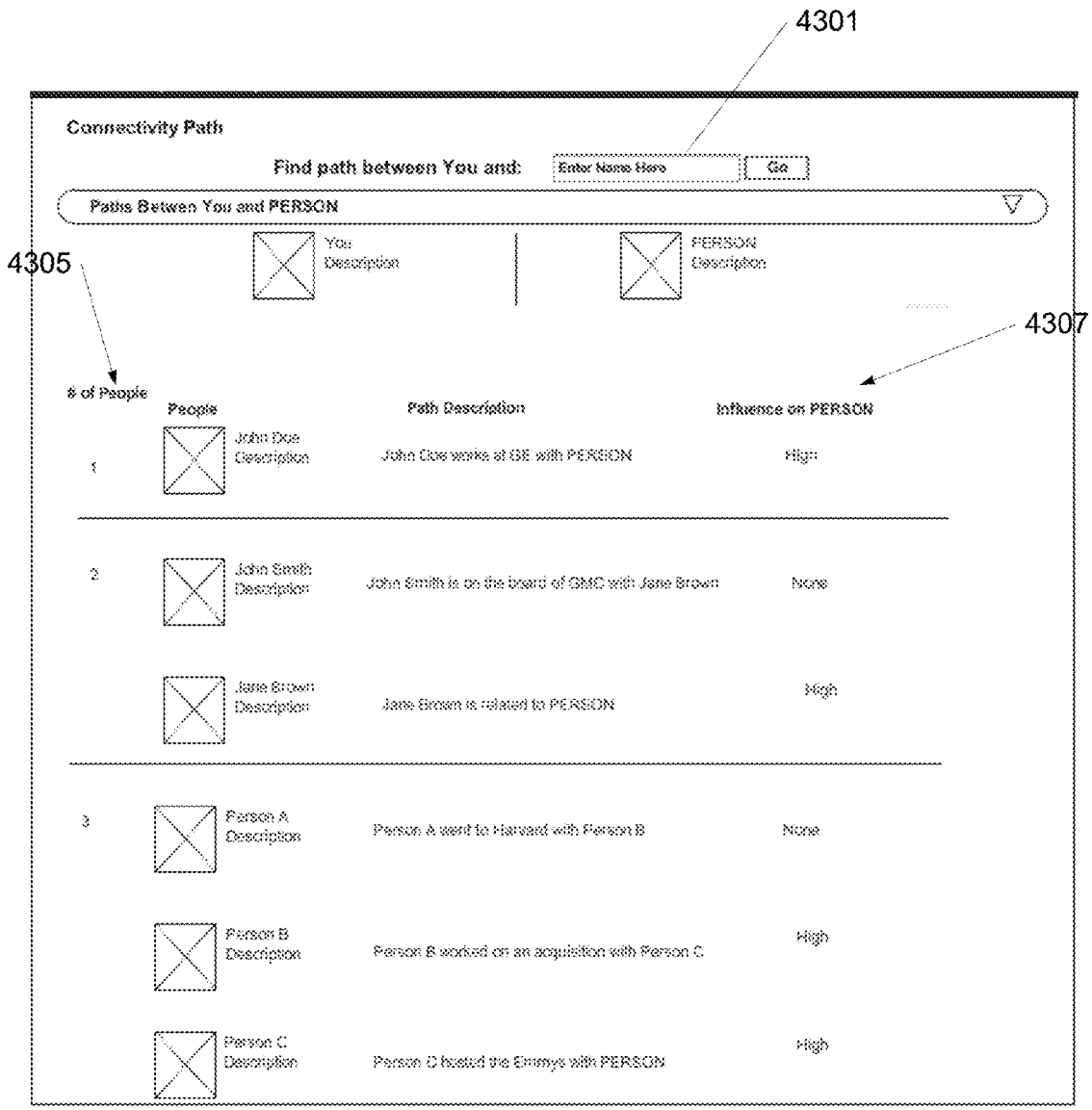
FIG. 43 shows a sample screen of results for connectivity paths.

FIG. 43 shows a sample screen of results for connectivity paths. The system displays possible paths between the user and a selected system-provided node. The user enters the information about the person entity in box 4301. The system sorts the results by the number of people between the user and the selected system-provided node. When the system organizes the information, the system uses the number of people between the user and the system-provided node is one less than the degrees of separation between the user and the target system-provided node 4305 as a default sort. For example, for the search result, there is one person ("John Doe") between the user and the system-provided node. This makes a second degree connection between the user and the target system-provided node. In another implementation, when the user can sort the paths by the ones with the strongest connections first (or highest influence). This can be done by clicking on the results list header for influence 4307. In an implementation, the applications page includes links to the advanced people search or a link to the cold call page.

Figure 44:
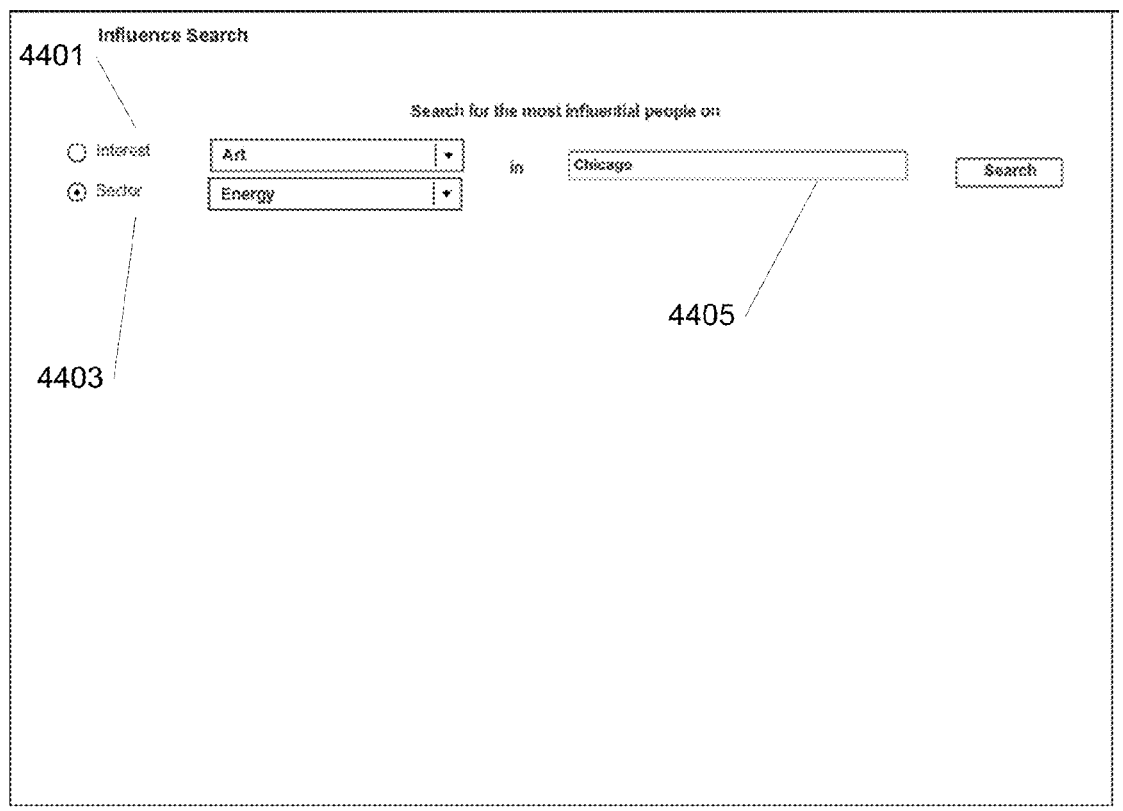
FIG. 44 shows a screen of the system for an influence search.

In an implementation, the system can display the influence of a person is a sector. This algorithm is similar to the power number algorithm, but as applied to a particular domain. Some domains can be concrete things like an industry (e.g., textiles, personal computers, tablets) or a geographical area, or something more abstract like concepts (e.g., music, the art world). This number is displayed in the information section of a person's power page. FIG. 44 shows a screen of the system for an influence search. In this implementation, drop-down boxes are used to select a sector 4401 or interest 4403 to search, and the search is further limited according to a geographical location 4405.

In an implementation, the system tracks contributions of money. These contributions can come from various one entity to another entity. For example, the system tracks political contributions from a person to a politician. In another example, the system tracks donations from a company to a charity. In yet another example, the system tracks capital contribution made by an investor to a company (e.g., purchasing stock, contributing capital for a partnership).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
    providing a social graph, wherein the social graph comprises:
       a first type of node, referred to as a user-provided node, and a first type of edge, referred to as a user-provided edge; and a second type of node, referred to as a system-provided node, and a second type of edge, referred to as a system-provided edge;

using at least one electronic processor, managing the social graph comprising:

allowing system-provided nodes to be coupled to other system-provided nodes by system-provided edges, wherein system-provided nodes and system-provided edges include information gathered by the system;

allowing user-provided nodes to be coupled to system-provided nodes by user-provided edges include information supplied by users of the system;

disallowing user-provided nodes from being coupled to other user-provided nodes using system-provided edges;

disallowing user-provided nodes from being coupled to system-provided nodes using system-provided edges; and disallowing system-provided nodes from being coupled to other system-provided nodes using user-provided edges;

allowing a first user, represented by a first user-provided node, at a first user device to provide their connections to at least two entities represented by a first and second system-provided nodes;

coupling in the social graph using first and second user-provided edges to the first and second system-provided nodes;

determining a third system-provided node is coupled to the first or second system-provided nodes;

displaying to the first user at the first user device a first entity represented by the third system-provided node, wherein the third system-provided node is coupled to the first user-provided node in the social graph by two or more degrees of separation;

allowing the first user to select the first entity and a second entity tracked in the social graph that are displayed on a screen of the first user device, wherein the first user at the first user device is allowed to at least one of retrieve or query information stored by the system;

aggregating a set of paths from the social graph, wherein each path of the set of paths comprise a plurality of entities, the first entity in a first position of the path, and the second entity in a last position of the path;

formatting the set of paths by a strength of each path relative to each other path in the set of paths; and displaying the formatted set of paths on the screen of the first user device.

2. The method of claim 1 wherein the first and second entities are represented by system-provided nodes in the social graph.

3. The method of claim 1 wherein the strength of each path relative to each other path in the set of paths is based on a length of each path.

4. The method of claim 1 wherein the displaying to the first user the first entity comprises displaying a plurality of entities, each entity coupling the first user-provided node to the third system-provided node.

5. The method of claim 1 wherein at least one system-provided edge couples the first or second system-provided nodes to the third system-provided node.

6. The method of claim 5 wherein the first system-provided edge represents a familial relationship, an employment relationship, or a board member relationship.

7. The method of claim 5 wherein the first system-provided edge comprises a strength of the first system-provided edge.

8. The method of claim 1 wherein the first entity represented by the third system-provided node comprises an organization.

9. The method of claim 1 wherein the first entity represented by the third system-provided node comprises a person.

10. The method of claim 1 wherein the displaying to the first user comprises displaying an executive summary of the first entity.

11. A method comprising:

providing a social graph, wherein the social graph comprises:

a first type of node, referred to as a user-provided node, and a first type of edge, referred to as a user-provided edge; and a second type of node, referred to as a system-provided node, and a second type of edge, referred to as a system-provided edge;

using at least one electronic processor, managing the social graph comprising:

allowing system-provided nodes to be coupled to other system-provided nodes by system-provided edges, wherein system-provided nodes and system-provided edges include information gathered by the system;

allowing user-provided nodes to be coupled to system-provided nodes by user-provided edges, wherein user provided nodes include information supplied by users of the system;

disallowing user-provided nodes from being coupled to system-provided nodes using system-provided edges; and disallowing user-provided nodes from being coupled to other user-provided nodes using system-provided edges;

allowing a first user, represented by a first user-provided node, at a first device to provide their connections to at least two entities represented by a first and second system-provided nodes;

coupling in the social graph using first and second user-provided edges to the first and second system-provided nodes;

determining the first user has obtained a new connection to a first entity, represented by a third system-provided node;

displaying to the first user at the first user device the first entity represented by the third system-provided node, wherein the third system-provided node is displayed on a screen of the first user device, the third system-provided node is coupled to the first user-provided node in the social graph by two or more degrees of separation, and the first user at the first user device is allowed to at least one of retrieve or query information stored by the system;

receiving unfiltered information from an on-line source comprising a plurality of news events;

filtering the unfiltered information to obtain information on entities;

filtering the unfiltered information to obtain filtered information on entities;

retrieving a plurality of ontology data structures from an ontology database, wherein each ontology data structure of the plurality of ontology data structures includes a method of representing a relationship in an unstructured data format to a data format of the social graph and the data format of the social graph comprises information represented by at least one system-provided edge and at least two system-provided nodes;

selecting ontology data structures from the plurality of ontology data structures to represent the filtered information on entities; and creating system-provided edges in the social graph to represent the filtered information on entities based on the selected ontology data structures.

12. The method of claim 11 wherein the ontology data structures specify creating system-provided nodes but not user-provided nodes.

13. The method of claim 11 wherein the managing the social graph further comprises disallowing system-provided nodes from being coupled to other system-provided nodes using user-provided edges.

14. The method of claim 11 wherein the third system-provided node is coupled to one of the at least two system-provided nodes, but not the other system-provided node.

15. The method of claim 11 wherein the managing the social graph further comprises:

disallowing the first user from viewing a second user-provided node in the system.

16. The method of claim 11 wherein the first and second types of nodes are stored in a single social graph.

17. The method of claim 11 wherein managing the social graph further comprises:

allowing a plurality of users to provide a first information stored in the social graph structure of the system, wherein the first information from each user of the plurality of users is associated with a user-provided node representing the specific user; and disallowing the plurality of users from providing a second information stored in the social graph structure of the system, wherein the second information from each user of the plurality of users is associated with a user-provided node other than the user.

18. The method of claim 11 wherein managing the social graph further comprises:

allowing a plurality of users to provide a first information stored in the social graph structure of the system, wherein the first information from each user of the plurality of users is associated with a user-provided node; and disallowing the plurality of users from providing a second information stored in the social graph structure of the system, wherein the second information from each user of the plurality of users is associated with a system-provided node.

* * * * *